(12) United States Patent
Xu et al.

(10) Patent No.: US 11,921,968 B2
(45) Date of Patent: Mar. 5, 2024

(54) METHOD FOR INTERACTION BETWEEN DEVICES BASED ON POINTING OPERATION, AND ELECTRONIC DEVICE

(71) Applicant: Huawei Technologies Co., Ltd., Shenzhen (CN)

(72) Inventors: Jie Xu, Shanghai (CN); Jiayu Long, Shenzhen (CN); Tong Yang, Beijing (CN); Jianzhong Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/040,471

(22) PCT Filed: Jul. 28, 2021

(86) PCT No.: PCT/CN2021/108941
§ 371 (c)(1),
(2) Date: Feb. 3, 2023

(87) PCT Pub. No.: WO2022/028290
PCT Pub. Date: Feb. 10, 2022

(65) Prior Publication Data
US 2023/0289022 A1 Sep. 14, 2023

(30) Foreign Application Priority Data
Aug. 5, 2020 (CN) .......................... 202010781046.7

(51) Int. Cl.
*G06F 3/048* (2013.01)
*G06F 1/16* (2006.01)
(Continued)

(52) U.S. Cl.
CPC .......... *G06F 3/0481* (2013.01); *G06F 1/1694* (2013.01); *G06F 3/0346* (2013.01); *G06V 40/161* (2022.01)

(58) Field of Classification Search
CPC .... G06F 3/0481; G06F 3/0346; G06F 1/1694; G06V 40/161
See application file for complete search history.

(56) References Cited

U.S. PATENT DOCUMENTS 7,688,307 B1 * 3/2010 Tsyrganovich ..... G06F 3/03543
345/157
11,314,345 B2 * 4/2022 Wang ..................... G08C 17/00
(Continued)

FOREIGN PATENT DOCUMENTS

CN 108563387 A 9/2018

*Primary Examiner* — Liliana Cerullo
(74) *Attorney, Agent, or Firm* — Slater Matsil, LLP

(57) ABSTRACT

A method for interaction between devices based on a pointing operation and an electronic device. The electronic device may be a mobile phone or the like. In the method, a pointing operation performed by a user from a handheld device to a target device is detected via an acceleration sensor, a gyroscope, an IMU, a camera, or the like of the handheld device, and a wireless positioning function of the handheld device is triggered. When it is identified that an axis of the handheld device intersects or approximately intersects with the target device, at least one type of feedback such as visual feedback, sound feedback, and vibration may be provided on the handheld device and/or the target device, login account information and device information of the target device are transmitted to the handheld device, and a target device control window is displayed on the handheld device.

20 Claims, 45 Drawing Sheets

(51) Int. Cl.
  *G06F 3/0346*  (2013.01)
  *G06F 3/0481*  (2022.01)
  *G06V 40/16*   (2022.01)

(56) References Cited

U.S. PATENT DOCUMENTS

2014/0085341 A1* 3/2014 Shin .................. G06F 1/1694
                                             345/659
2015/0326704 A1  11/2015 Ko et al.
2015/0346834 A1* 12/2015 Martinez Fernandez ...................
                                             G06F 3/017
                                             340/12.5

* cited by examiner

METHOD FOR INTERACTION BETWEEN DEVICES BASED ON POINTING OPERATION, AND ELECTRONIC DEVICE

CROSS-REFERENCE TO RELATED APPLICATIONS

This application is a National Stage of International Application No. PCT/CN2021/108941, filed on Jul. 28, 2021, which claims priority to Chinese Patent 202010781046.7, filed on Aug. 5, 2020. Both of the aforementioned applications are hereby incorporated by reference in their entireties. The disclosures of the aforementioned applications are hereby incorporated by reference in their entireties.

TECHNICAL FIELD

This application relates to the field of electronic technologies, and in particular, to a method for interaction between devices based on a pointing operation, and an electronic device.

BACKGROUND

In an environment of a large quantity of terminals, each user may have different types of electronic devices such as a smartphone, a personal computer, a smart television, a tablet, and a sound box. In a home scenario, a user may also have a plurality of home devices, such as a smart audio and video device, a router, a wireless fidelity (wireless fidelity, Wi-Fi) box, a smart cleaning device, a smart kitchen electrical device, and a smart lighting system. With development of technologies, in a scenario of internet of everything, a user can control more and more devices, and there is an increasing requirement for interconnection between a plurality of devices.

In a process in which a plurality of devices are interconnected and interact with each other, a user usually needs to select one or more specific target devices, and then performs different operations such as device discovery, pairing, data transmission, and projection on the selected target devices. This process is complex, includes many interaction processes, and has poor user experience.

SUMMARY

This application provides a method for interaction between devices based on a pointing operation, and an electronic device. The method helps a user select and control a distant device based on a pointing operation of the user, simplifies a process of an interaction operation between devices, and improves user experience.

According to a first aspect, a method for interaction between devices is provided, and is applied to a first electronic device. The method includes: obtaining an acceleration of the first electronic device in a first axis direction, an acceleration of the first electronic device in a second axis, and an acceleration of the first electronic device in a third axis, where the first axis is parallel to a long side of the first electronic device, the second axis is parallel to a short side of the first electronic device, and the third axis is perpendicular to a plane determined by the first axis and the second axis; determining that in a motion process in which a user holds the first electronic device to move from a first location as a start location to a second location, the acceleration in the first axis direction is greater than or equal to a first threshold or duration in which the acceleration in the first axis direction is greater than or equal to the first threshold is greater than or equal to first preset duration, the acceleration in the second axis direction is less than or equal to a second threshold, and the acceleration in the third axis direction is less than or equal to a third threshold; detecting that at the second location, the first axis of the first electronic device intersects with a second electronic device, or the first axis of the first electronic device approximately intersects with a second electronic device within a preset precision range; receiving login account information and device information of the second electronic device that are sent by the second electronic device; and displaying a first window based on the login account information and the device information of the second electronic device, where the first window displays an interface used for controlling the second electronic device.

Optionally, the pointing operation of the user may be described as a pointing operation that the user holds the first electronic device to move from the first location as the start location to the second location, and at the second location, the axis on which the long side of the first electronic device is located intersects or approximately intersects with one or more other devices. Herein, the intersection may be understood as that another device exactly exists in a direction pointed to by the user. The approximate intersection may be understood as that another device exists in a preset precision range in a direction pointed to by the user. Both cases may be understood as that the pointing operation of the user is detected.

A coordinate system O-XYZ is established on the first electronic device in a process of determining the pointing operation that the user holds the first electronic device to point to the second electronic device. Specifically, in the coordinate system O-XYZ, a center of gravity of the first electronic device is used as a coordinate origin O, a straight line on which a long frame of the first electronic device that passes through the coordinate origin O is located is a Y axis, namely, the first axis; a straight line on which a short frame of the first electronic device is located is an X axis, namely, the second axis; and a straight line perpendicular to the ground or an XOY plane is a Z axis, namely, the third axis.

It should be understood that an axis of the first electronic device is related to an antenna layout of the first electronic device. When an antenna is arranged at a front-end frame of the first electronic device, the user may point the axis on which the long side is located to the second electronic device. Alternatively, when an antenna is arranged inside a housing of the first electronic device, the first electronic device may be erected in a similar manner to a photographing posture, and a normal perpendicular to a display of the first electronic device is used as an axis, so that the axis on which the normal is located points to the second electronic device. This is not limited in this embodiment of this application.

In a possible implementation, the pointing operation of the user may be identified via one or more sensors of the first electronic device, a camera of the first electronic device, or the like. In descriptions of the subsequent embodiments, the pointing operation of the user may be referred to as a "direction pointing operation".

Optionally, the sensor of the first electronic device may include an acceleration sensor, a gyroscope, a magnetometer sensor (magnetometer sensor, M-sensor), an inertial measurement unit (inertial measurement unit, IMU), and the like. The camera of the first electronic device is not limited to a front-facing camera or a rear-facing camera of the first electronic device. Alternatively, the camera of the first electronic device is not limited to one or more of a primary camera, a wide-angle camera, and a long-focus camera of the first electronic device. The pointing operation of the user is identified based on a picture obtained by the camera. This is not limited in embodiments of this application.

With reference to the first aspect, in some implementations of the first aspect, the obtaining an acceleration of the first electronic device in a first axis direction, an acceleration of the first electronic device in a second axis, and an acceleration of the first electronic device in a third axis includes: obtaining the acceleration in the first axis direction, the acceleration in the second axis, and the acceleration in the third axis via one or more of an acceleration sensor, an inertial measurement unit IMU, and a gyroscope.

It should be understood that, in a process in which an arm of the user moves forward, the first electronic device accelerates along a straight line on which the Y axis is located, and the acceleration sensor of the first electronic device detects that an acceleration of the first electronic device along the straight line on which the Y axis is located is greater than or equal to a first preset threshold $a_A$. In addition, the acceleration sensor detects that accelerations of the first electronic device along a straight line on which the X axis is located and along a straight line on which the Z axis is located are less than or equal to a second preset threshold $a_B$.

Optionally, accelerations of the first electronic device in different directions may be detected by the IMU of the first electronic device; or accelerations of the first electronic device in different directions may be detected based on a picture collected by the front-facing camera of the first electronic device and an always-on optical flow algorithm. Specifically, the front-facing camera of the first electronic device is used to obtain adjacent frames in the picture, where a two-dimensional vector field of a feature point in the adjacent frame in a translation process indicates a velocity field of a three-dimensional motion of an object point by using a two-dimensional image. That is, an image change formed by motion of the object point within a specific time interval may be reflected based on the velocity field of the three-dimensional motion of the object point, to determine a motion direction and a motion rate of the object point on the image, and further determine whether a motion track of the first electronic device is a straight line or a quasi-linear line.

In a possible implementation, in an operation process in which the user points to the second electronic device by using the first electronic device, the first electronic device may guide, in different manners such as a guide icon, a sound feedback, and a vibration feedback, the user to perform a correct pointing operation, so as to control the second electronic device by using the pointing operation in this embodiment of this application.

Optionally, the sound feedback may be sent by the first electronic device, or may be sent by the pointed second electronic device. For example, the first electronic device prompts the user in a voice manner "please move rightward".

Optionally, the vibration feedback may be sent by the first electronic device, to be more quickly and more sensitively perceived by the user. It should be understood that this is not limited in this embodiment of this application.

Alternatively, after the user successfully points to the second electronic device by using the first electronic device, a feedback may be further provided on the first electronic device or the pointed second electronic device. The feedback is used to notify the user that the pointing operation succeeds. The feedback information may include one or more of a visual feedback, a sound feedback, a vibration feedback, and the like. For example, after the user successfully points to a sound box by using the first electronic device, the first electronic device may vibrate to notify the user that the pointing operation is completed.

It should be understood that, after the user successfully points to the second electronic device by using the first electronic device, the second electronic device may transmit current login account information and device information to the first electronic device, to display a control window of the second electronic device on the first electronic device.

It should be further understood that, in a process of determining whether the first electronic device points to the second electronic device, when it is identified that an axis of the first electronic device and a location of the second electronic device fall within a preset range, the second electronic device pointed to by the user may be determined. Specifically, when it is identified that the axis of the first electronic device basically intersects with the physical location of the second electronic device with specific predetermined precision, or it is identified that the first electronic device is aligned with the second electronic device, the second electronic device pointed to by the user may be determined, that is, the feedback may be provided on the first electronic device or the pointed second electronic device, the login account information and the device information of the second electronic device are transmitted to the first electronic device, and the control window of the second electronic device or an interface related to the second electronic device is displayed on the first electronic device.

In conclusion, according to the method for interaction across devices based on a pointing operation provided in this embodiment of this application, the user may point to the second electronic device by using the first electronic device, and detect the pointing operation of the user via one or more sensors such as the acceleration sensor, the gyroscope, and the IMU, and/or the camera of the first electronic device, to trigger the wireless positioning function of the first electronic device. The first electronic device determines a distance between the first electronic device and another device, and a location and a direction of the another device based on the wireless positioning function. When it is identified that the axis of the first electronic device intersects or basically intersects with the physical location of the second electronic device based on predetermined precision, at least one type of feedback such as the visual feedback, the sound feedback, and the vibration may be provided on the first electronic device and/or the second electronic device, the login account information and the device information of the second electronic device are transmitted to the first electronic device, and the control window of the second electronic device is displayed on the first electronic device. The user can control the second electronic device on the control window on the first electronic device. When it is identified that the axis of the first electronic device does not intersect with the physical location of the second electronic device, at least one guidance manner such as visual guidance, sound guidance, and vibration may be provided on the first electronic device and/or the second electronic device, to guide the user to perform a correct pointing operation, and further display the control window of the second electronic device on the first electronic device and further implement a control function for the second electronic device.

With reference to the first aspect and the foregoing implementations, in some implementations of the first aspect, before the detecting that at the second location, the first axis of the first electronic device intersects with a second electronic device, or the first axis of the first electronic device approximately intersects with a second electronic device within a preset precision range, the method further includes: collecting a picture in the motion process by using the camera of the first electronic device; and determining that the picture collected at the first location by the first electronic device includes facial feature information of the user, and the picture collected at the second location does not include the facial feature information of the user.

Optionally, the first electronic device may detect, based on the image obtained by the camera, that the first electronic device is far away from the user's body or far away from the user's body. Specifically, the camera of the first electronic device may obtain an image in real time, and perform facial feature detection based on the obtained image. Within a specific time period, the first electronic device first detects face information in the obtained image, and determines that the first electronic device is in a state of being close to the user's body; and then, detects no face information in the obtained image, and determines that the first electronic device is in a state of being far away from the user's body. When the foregoing change process occurs, the first electronic device may be determined to gradually change from being close to the user's body to being far away from the user's body.

With reference to the first aspect and the foregoing implementations, in some implementations of the first aspect, before the detecting that at the second location, the first axis of the first electronic device intersects with a second electronic device, or the first axis of the first electronic device approximately intersects with a second electronic device within a preset precision range, the method further includes: collecting a magnetic induction intensity in the motion process by using a magnetometer sensor of the first electronic device; and determining that the magnetic induction intensity collected at the first location by the first electronic device is greater than or equal to a fourth threshold, the magnetic induction intensity collected at the second location is less than or equal to a fifth threshold, and the fourth threshold is greater than the fifth threshold.

Optionally, the first electronic device may detect, by using the magnetometer sensor, that the first electronic device is far away from the user's body or close to the user's body. Because a human body is a magnetic field, when the first electronic device is far away from or close to the human body, magnetic field strength detected by the magnetometer sensor changes significantly. Therefore, it may be determined, based on the magnetic field strength detected by the magnetometer sensor, that the first electronic device is in a state of being far away from the user's body or close to the user's body.

With reference to the first aspect and the foregoing implementations, in some implementations of the first aspect, before the detecting that at the second location, the first axis of the first electronic device intersects with a second electronic device, or the first axis of the first electronic device approximately intersects with a second electronic device within a preset precision range, the method further includes: determining that duration in which the first electronic device hovers at the second location is greater than or equal to second preset duration.

Specifically, when the IMU of the first electronic device detects that the first electronic device stops acceleration, and duration in which the first electronic device hovers reaches the second preset duration $t_{dwell}$, it may be determined that the user points to the second electronic device.

When the pointing operation is detected, the first electronic device is triggered to determine, by using a wireless positioning technology, a location of the device pointed to by the user. In this process, with reference to data collected by a plurality of sensors, it may be more accurately determined that the user performs the pointing operation.

With reference to the first aspect and the foregoing implementations, in some implementations of the first aspect, when the acceleration in the first axis direction is greater than or equal to the first threshold, the method further includes: displaying first prompt information. The first prompt information is used to guide the user to continue to accelerate along the first axis direction, and the first prompt information includes one or more of a text, an icon, a sound, and vibration.

It should be understood that, in a process in which the user points to the second electronic device, a hand-eye separation phenomenon, namely, a case in which eyes cannot see an interface of the first electronic device, occurs. Therefore, a prompt manner of any one of the foregoing prompt information (the first prompt information, second prompt information, third prompt information, fourth prompt information, and the like) is not limited in this embodiment of this application. For example, the prompt manner may be a visual or non-visual prompt that can be identified by the user and has a difference, for example, a plurality of prompt manners such as a different interface prompt, a vibration, an indicator, or a voice.

In a possible implementation, in the operation process in which the user points to the second electronic device by using the first electronic device, prompt information may be displayed on the first electronic device. The prompt information is used to guide the user to perform a correct pointing operation, so as to control the second electronic device by using the pointing operation in this embodiment of this application.

Optionally, the prompt information may be displayed in a window displayed on the first electronic device, or may be displayed on the first electronic device in a form of an icon, or may guide the user to perform the correct pointing operation in another visual guidance manner, for example, an arrow, so as to control the second electronic device by using the pointing operation in this embodiment of this application. Optionally, a display location of the arrow or the icon may change based on different current locations of the user.

With reference to the first aspect and the foregoing implementations, in some implementations of the first aspect, when the duration in which the acceleration in the first axis direction is greater than or equal to the first threshold is greater than or equal to the first preset duration, the method further includes: displaying second prompt information. The second prompt information is used to prompt the user that acceleration duration in the first axis direction reaches the first preset duration, and the second prompt information includes one or more of a text, an icon, a sound, and vibration.

With reference to the first aspect and the foregoing implementations, in some implementations of the first aspect, when the duration in which the first electronic device hovers at the second location is greater than or equal to the second preset duration, the method further includes: displaying third prompt information. The third prompt information is used to indicate the first electronic device to detect whether the first axis intersects with the second electronic device at the second location, and the third prompt information includes one or more of a text, an icon, a sound, and vibration.

With reference to the first aspect and the foregoing implementations, in some implementations of the first aspect, after the detecting that at the second location, the first axis of the first electronic device intersects with a second electronic device, or the first axis of the first electronic device approximately intersects with a second electronic device within a preset precision range, the method further includes: displaying fourth prompt information. The fourth prompt information is used to indicate that the first electronic device points to the second electronic device, and the fourth prompt information includes one or more of a text, an icon, a sound, and vibration.

In a possible implementation, to accurately identify the pointing operation of the user and reduce an accidental touch rate, in this embodiment of this application, the first electronic device may be triggered to detect the pointing operation of the user only in a preset scenario. The preset scenario includes: The first electronic device is in a screen-on state; and/or the first electronic device is in an unlocked state; and/or the first electronic device displays a main interface; and/or it is detected that there is a specific angle between a direction of the normal perpendicular to the display of the first electronic device and the ground. That there is the specific angle between the direction of the normal of the display of the first electronic device and the ground may be understood as that the direction of the normal of the display is not perpendicular to the ground.

In still another possible implementation, when the IMU of the first electronic device detects that the first electronic device stops acceleration, and the duration in which the first electronic device hovers reaches the second preset duration $t_{dwell}$, the third prompt information may appear on the first electronic device. The third prompt information is used to prompt the user of the pointed second electronic device, and when at least two devices are detected in a direction pointed by the user, the third prompt information may be information about the at least two devices displayed by the user. The user may select the second electronic device from the at least two devices.

Alternatively, optionally, in this case, the fourth prompt information may also appear on the pointed device, to prompt a correct pointing operation that the user points to the device. For example, if the user points to a smart screen by using the first electronic device, because the user watches the smart screen in a pointing process, a pop-up window may appear on the smart screen. The pop-up window includes the fourth prompt information used to indicate a correct pointing operation required to be performed by the user to control the smart screen.

Guidance and feedback of the pointing operation are performed on the first electronic device and the pointed second electronic device in visual and non-visual prompt manners, to improve a success rate of the pointing operation and improve user experience.

The preset scenario is set to specify that the first electronic device can identify whether the user performs the pointing operation only when one preset scenario is met or a plurality of scenarios are met at the same time. For example, the first electronic device identifies whether the user performs the pointing operation only when the first electronic device is in the screen-on state and/or the unlocked state; or the first electronic device is limited to identify whether the user performs the pointing operation only when the first electronic device displays the main interface; or the first electronic device is limited to identify whether the user performs the pointing operation only when the first electronic device is in the screen-on state and the unlocked state and displays the main interface of the first electronic device. Setting of the preset scenario can improve accuracy of identifying the pointing operation of the user, avoid detection in a possible scenario in which the user only hands over the first electronic device to another person, and reduce an accidental touch rate and improve user experience.

With reference to the first aspect and the foregoing implementations, in some implementations of the first aspect, the detecting that at the second location, the first axis of the first electronic device intersects with a second electronic device, or the first axis of the first electronic device approximately intersects with a second electronic device within a preset precision range includes: detecting, via a positioning component, that at the second location, the first axis of the first electronic device intersects with the second electronic device, or the first axis of the first electronic device approximately intersects with the second electronic device within the preset precision range. The positioning component is an independently disposed positioning sensor, or the positioning component is a positioning chip disposed on the first electronic device and the second electronic device, and the positioning chip includes any one of a Bluetooth positioning chip, an ultra-wideband UWB positioning chip, or a wireless fidelity Wi-Fi positioning chip.

In a possible implementation, in a home scenario, at least three fixed positioning components may be disposed, the three positioning components are ensured to be in a power-on working state, and the at least three positioning components may communicate with the first electronic device of the user.

Optionally, the positioning component may be a sensor having a positioning function, a structure having a positioning function, or the like. For example, the sensor may be a laser sensor, an infrared sensor, or the like. The structure having the positioning function may be a positioning chip. For example, the structure having the positioning function may be a Bluetooth positioning chip, an ultra-wideband UWB positioning chip, a wireless fidelity Wi-Fi positioning chip, or the like.

Optionally, in addition to the foregoing listed positioning component pre-arranged in the home scenario, the positioning component may be disposed on a device such as a smart television (smart screen), an air conditioner, a sound box, or a router in the home scenario. For example, if the device such as the smart screen, the air conditioner, or the sound box has a UWB chip, the at least three fixed positioning components do not need to be additionally arranged in the home scenario, and a positioning function of any device in the home scenario may be implemented through interaction between the first electronic device and the device such as the smart screen, the air conditioner, or the sound box. For a specific positioning algorithm, refer to a process described subsequently. It should be understood that a quantity and an implementation form of the positioning component are not limited in this embodiment of this application.

According to the foregoing solution, as the first electronic device, the first electronic device may detect, by using the three positioning components arranged in the home scenario, the second electronic device pointed to by the user, or the first electronic device detects, by using the positioning chip, the second electronic device pointed to by the user. Further, after detecting a direction pointing shortcut gesture of the user, the second electronic device may be controlled by the first electronic device of the user.

With reference to the first aspect and the foregoing implementations, in some implementations of the first aspect, when the first axis of the first electronic device intersects or approximately intersects with one or more of the second electronic devices, the method further includes: displaying a second window, where the second window includes information about the one or more of the second electronic devices; detecting a first operation in the second window; and displaying the first window by the first electronic device in response to the first operation.

According to the foregoing process, for a plurality of adjacent second electronic devices, the first electronic device can identify a plurality of devices pointed to by the user, or when the user expects to control the plurality of adjacent devices, the first electronic device can display cards of the plurality of devices for the user, so that the user selects at least one of the second electronic devices according to a requirement of the user. This design is more user-friendly, can better meet different requirements of users, and improves user experience.

With reference to the first aspect and the foregoing implementations, in some implementations of the first aspect, the method further includes: detecting a second operation in the first window; and sending a control instruction to the second electronic device by the first electronic device in response to the second operation, where the control instruction is used to control behavior of the second electronic device.

In a possible case, the second threshold is equal to the third threshold.

According to a second aspect, a first electronic device is provided, including: a processor and a memory. The memory stores one or more instructions, and when the one or more instructions are executed by the processor, the electronic device is enabled to perform the following steps: obtaining an acceleration in a first axis direction, an acceleration in a second axis, and an acceleration in a third axis, where the first axis is parallel to a long side of the first electronic device, the second axis is parallel to a short side of the first electronic device, and the third axis is perpendicular to a plane determined by the first axis and the second axis; determining that in a motion process in which a user holds the first electronic device to move from a first location as a start location to a second location, the acceleration in the first axis direction is greater than or equal to a first threshold or duration in which the acceleration in the first axis direction is greater than or equal to the first threshold is greater than or equal to first preset duration, the acceleration in the second axis direction is less than or equal to a second threshold, and the acceleration in the third axis direction is less than or equal to a third threshold; detecting that at the second location, the first axis of the first electronic device intersects with a second electronic device, or the first axis of the first electronic device approximately intersects with a second electronic device within a preset precision range; receiving login account information and device information of the second electronic device that are sent by the second electronic device; and displaying a first window based on the login account information and the device information of the second electronic device, where the first window displays an interface used for controlling the second electronic device.

With reference to the second aspect, in some implementations of the second aspect, when the one or more instructions are executed by the processor, the electronic device is enabled to perform the following step: obtaining the acceleration in the first axis direction, the acceleration in the second axis, and the acceleration in the third axis via one or more of an acceleration sensor, an inertial measurement unit IMU, and a gyroscope.

With reference to the second aspect and the foregoing implementations, in some implementations of the second aspect, when the one or more instructions are executed by the processor, the electronic device is enabled to perform the following steps: collecting a picture in the motion process by using a camera of the first electronic device; and determining that the picture collected at the first location includes facial feature information of the user, and the picture collected at the second location does not include the facial feature information of the user.

With reference to the second aspect and the foregoing implementations, in some implementations of the second aspect, when the one or more instructions are executed by the processor, the electronic device is enabled to perform the following steps: collecting a magnetic induction intensity in the motion process by using a magnetometer sensor of the first electronic device; and determining that the magnetic induction intensity collected at the first location is greater than or equal to a fourth threshold, the magnetic induction intensity collected at the second location is less than or equal to a fifth threshold, and the fourth threshold is greater than the fifth threshold.

With reference to the second aspect and the foregoing implementations, in some implementations of the second aspect, when the one or more instructions are executed by the processor, the electronic device is enabled to perform the following step: determining that duration in which the first electronic device hovers at the second location is greater than or equal to second preset duration.

With reference to the second aspect and the foregoing implementations, in some implementations of the second aspect, when the acceleration in the first axis direction is greater than or equal to the first threshold, and the one or more instructions are executed by the processor, the electronic device is further configured to perform the following step: displaying first prompt information, where the first prompt information is used to guide the user to continue to accelerate along the first axis direction, and the first prompt information includes one or more of a text, an icon, a sound, and vibration.

With reference to the second aspect and the foregoing implementations, in some implementations of the second aspect, when the duration in which the acceleration in the first axis direction is greater than or equal to the first threshold is greater than or equal to the first preset duration, and the one or more instructions are executed by the processor, the electronic device is further configured to perform the following step: displaying second prompt information, where the second prompt information is used to prompt the user that acceleration duration in the first axis direction reaches the first preset duration, and the second prompt information includes one or more of a text, an icon, a sound, and vibration.

With reference to the second aspect and the foregoing implementations, in some implementations of the second aspect, when the duration in which the first electronic device hovers at the second location is greater than or equal to the second preset duration, and the one or more instructions are executed by the processor, the electronic device is further configured to perform the following step: displaying third prompt information, where the third prompt information is used to indicate the first electronic device to detect whether the first axis intersects with the second electronic device at the second location, and the third prompt information includes one or more of a text, an icon, a sound, and vibration.

With reference to the second aspect and the foregoing implementations, in some implementations of the second aspect, when the one or more instructions are executed by the processor, the electronic device is enabled to perform the following step: displaying fourth prompt information, where the fourth prompt information is used to indicate that the first electronic device points to the second electronic device, and the fourth prompt information includes one or more of a text, an icon, a sound, and vibration.

With reference to the second aspect and the foregoing implementations, in some implementations of the second aspect, when the one or more instructions are executed by the processor, the electronic device is enabled to perform the following step: detecting, via a positioning component, that at the second location, the first axis of the first electronic device intersects with the second electronic device, or the first axis of the first electronic device approximately intersects with the second electronic device within the preset precision range. The positioning component is an independently disposed positioning sensor, or the positioning component is a positioning chip disposed on the first electronic device and the second electronic device. The positioning chip includes any one of a Bluetooth positioning chip, an ultra-wideband UWB positioning chip, or a wireless fidelity Wi-Fi positioning chip.

With reference to the second aspect and the foregoing implementations, in some implementations of the second aspect, when the first axis of the first electronic device intersects or approximately intersects with one or more of the second electronic devices, and the one or more instructions are executed by the processor, the electronic device is further configured to perform the following steps: displaying a second window, where the second window includes information about the one or more of the second electronic devices; detecting a first operation in the second window; and displaying the first window by the first electronic device in response to the first operation.

With reference to the second aspect and the foregoing implementations, in some implementations of the second aspect, when the one or more instructions are executed by the processor, the electronic device is enabled to perform the following steps: detecting a second operation in the first window; and sending a control instruction to the second electronic device by the first electronic device in response to the second operation, where the control instruction is used to control behavior of the second electronic device.

With reference to the second aspect and the foregoing implementations, in some implementations of the second aspect, the second threshold is equal to the third threshold.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by executing corresponding software by hardware. The hardware or the software includes one or more modules or units corresponding to the foregoing function, for example, a display module or unit, a detection module or unit, or a processing module or unit.

According to a fourth aspect, this application provides an electronic device. The electronic device includes: a touchscreen, where the touchscreen includes a touch-sensitive surface and a display; a positioning chip; one or more cameras; one or more processors; one or more memories; a plurality of applications; and one or more computer programs. The one or more computer programs are stored in the memory. The one or more computer programs include instructions. When the instructions are executed by the one or more processors, the electronic device is enabled to perform the method for interaction between devices based on the pointing operation in any possible implementation of any one of the foregoing aspects.

According to a fifth aspect, this application provides an electronic device, including one or more processors and one or more memories. The one or more memories are coupled to the one or more processors. The one or more memories are configured to store computer program code. The computer program code includes computer instructions. When the one or more processors execute the computer instructions, the electronic device is enabled to perform the method for interaction between devices based on the pointing operation in any possible implementation of any one of the foregoing aspects.

According to a sixth aspect, this application provides a computer storage medium, including computer instructions. When the computer instructions are run on an electronic device, the electronic device is enabled to perform the method for interaction between devices based on the pointing operation in any possible implementation of any one of the foregoing aspects.

According to a seventh aspect, this application provides a computer program product. When the computer program product runs on an electronic device, the electronic device is enabled to perform the method for interaction between devices based on the pointing operation in any possible implementation of any one of the foregoing aspects.

DETAILED DESCRIPTION OF ILLUSTRATIVE EMBODIMENTS

The following describes the technical solutions in embodiments of this application with reference to the accompanying drawings in embodiments of this application. In the descriptions of embodiments of this application, "/" represents "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features.

A method provided in embodiments of this application is applied to an electronic device, for example, a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
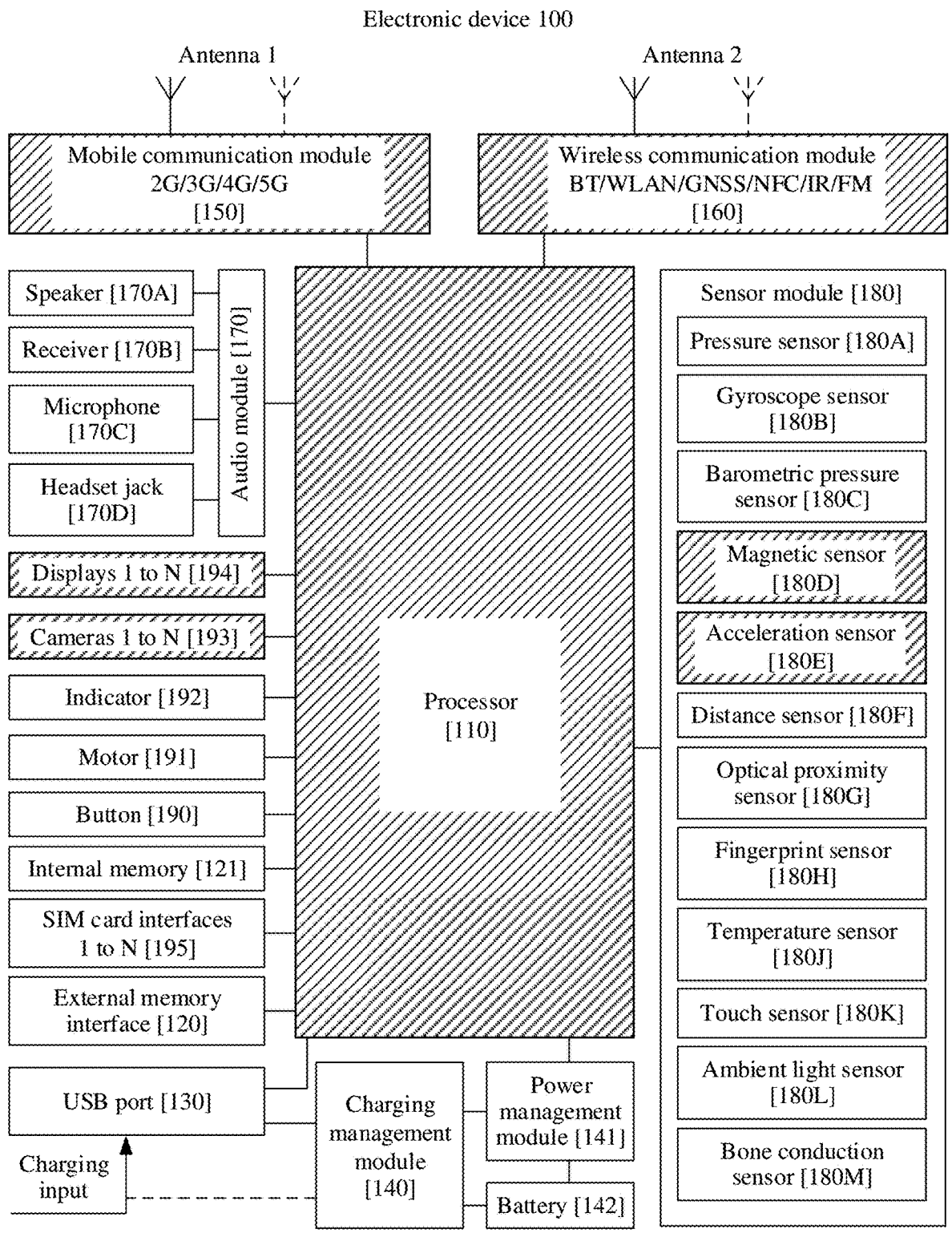
FIG. 1 is a schematic diagram of an example of a structure of an electronic device according to an embodiment of this application.

For example, FIG. 1 is a schematic diagram of a structure of an electronic device 100. The electronic device 100 may include a processor no, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor no is a cache memory. The memory may store instructions or data just used or cyclically used by the processor 110. If the processor no needs to use the instructions or the data again, the processor may directly invoke the instructions or the data from the memory. This avoids repeated access, reduces waiting time of the processor 110, and improves system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronous serial bus, including a serial data line (serial data line, SDA) and a serial clock line (serial clock line, SCL). In some embodiments, the processor no may include a plurality of groups of I2C buses. The processor no may be separately coupled to the touch sensor 180K, a charger, a flash, the camera 193, and the like through different I2C bus interfaces. For example, the processor no may be coupled to the touch sensor 180K through the I2C interface, so that the processor no communicates with the touch sensor 180K through the I2C bus interface, to implement a touch function of the electronic device 100.

The I2S interface may be used to perform audio communication. In some embodiments, the processor no may include a plurality of groups of I2S buses. The processor no may be coupled to the audio module 170 through the I2S bus, to implement communication between the processor no and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used to perform asynchronous communication. The bus may be a two-way communication bus. The bus converts to-be-transmitted data between serial communication and parallel communication. In some embodiments, the UART interface is usually used to connect the processor no to the wireless communication module 160. For example, the processor no communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be used to connect the processor no to a peripheral component such as the display 194 or the camera 193. The MIPI interface includes a camera serial interface (camera serial interface, CSI), a display serial interface (display serial interface, DSI), and the like. In some embodiments, the processor no communicates with the camera 193 through the CSI interface, to implement a photographing function of the electronic device 100. The processor no communicates with the display 194 through the DSI interface, to implement a display function of the electronic device 100.

The GPIO interface may be configured by software. The GPIO interface may be configured as a control signal or a data signal. In some embodiments, the GPIO interface may be used to connect the processor no to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB t e-C port, or the like. The USB port 130 may be used to connect to the charger to charge the electronic device 100, or may be used to transmit data between the electronic device 100 and a peripheral device, or may be used to connect to a headset for playing audio through the headset. The interface may be further used to connect to another electronic device such as an AR device.

It may be understood that an interface connection relationship between the modules illustrated in embodiments of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input through a wireless charging coil of the electronic device boo. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module iso, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that includes wireless communication such as 2G/3G/4G/5G and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor no. In some embodiments, at least some function modules of the mobile communication module 150 may be disposed in a same device as at least some modules of the processor no.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor no, and is disposed in a same device as the mobile communication module 150 or another function module.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor no may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage region and a data storage region. The program storage region may store an operating system, an application required by at least one function (for example, a voice playing function or an image playing function), and the like. The data storage region may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an electrical audio signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or a voice message is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device wo determines pressure intensity based on a change in the capacitance. When a touch operation is performed on the display 194, the electronic device 100 detects intensity of the touch operation through the pressure sensor 180A. The electronic device wo may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The gyroscope sensor 180B may be configured to determine a moving posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device wo jitters, calculates, based on the angle, a distance for which a lens module needs to compensate, and allows the lens to cancel the jitter of the electronic device wo through reverse motion, to implement image stabilization. The gyroscope sensor 180B may also be used in a navigation scenario and a somatic game scenario.

The barometric pressure sensor 180C is configured to measure barometric pressure. In some embodiments, the electronic device wo calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

For example, the optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a flip cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. The display 194 may provide a visual output related to the touch operation. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different regions of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The electronic device wo interacts with a network through the SIM card, to implement functions such as conversation and data communication. In some embodiments, the electronic device wo uses an eSIM, namely, an embedded SIM card. The eSIM card may be embedded into the electronic device 100, and cannot be separated from the electronic device 100.

A software system of the electronic device wo may use a layered architecture, an event-driven architecture, a microkernel architecture, a micro service architecture, or a cloud architecture. In embodiments of this application, an Android system with a layered architecture is used as an example to describe a software structure of the electronic device 100.

Figure 2:
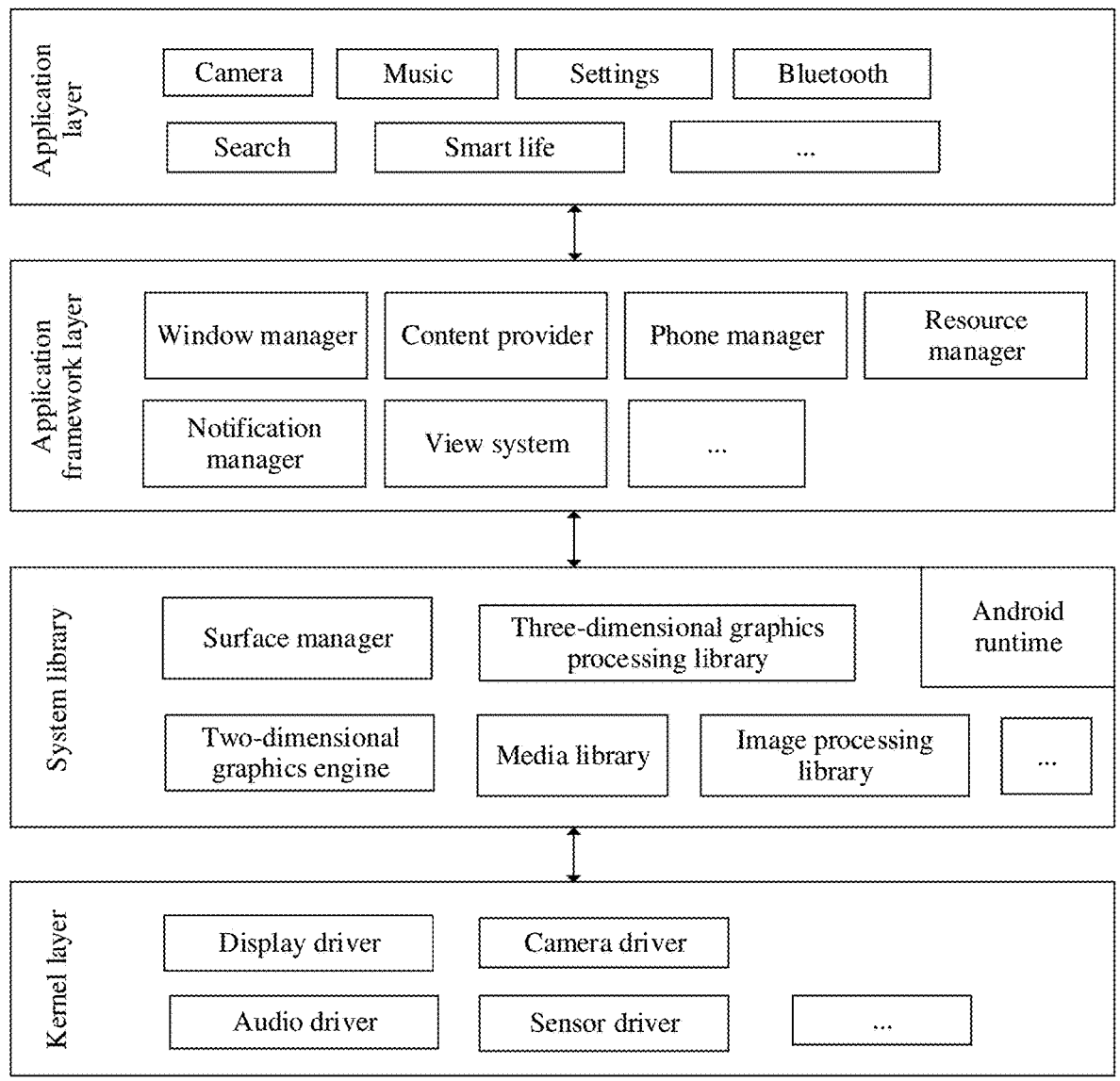
FIG. 2 is a block diagram of an example of a software structure of an electronic device according to an embodiment of this application.

FIG. 2 is a block diagram of an example of a software structure of the electronic device 100 according to an embodiment of this application. In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Music, Settings, Bluetooth, Search, and Smart life.

The application framework layer provides an application programming interface (application programming interface, API) and a programming framework for an application at the application layer. The application framework layer includes some predefined functions. As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmark, a phone book, and the like.

The view system includes visual controls such as a control for displaying text and a control for displaying an image. The view system may be configured to establish an application. A display interface may include one or more views. For example, display including an icon of a camera application on a mobile phone interface may include a view for displaying text and a view for displaying an image.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The displayed notification information may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a core library and a virtual machine. The Android runtime is responsible for scheduling and management of the Android system.

The core library includes two parts: a function that needs to be invoked in Java language, and a core library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (media library), a three-dimensional graphics processing library (for example, an OpenGL ES), and a two-dimensional graphics engine (for example, an SGL). The surface manager is configured to manage a display subsystem and provide fusion of a two-dimensional layer and a three-dimensional layer for a plurality of applications. The media library supports playback and recording in a plurality of commonly used audio and video formats, and static image files. The media library may support a plurality of audio and video coding formats, for example, MPEG-4, H.264, MP3, AAC, AMR, JPG, and PNG. The three-dimensional graphics processing library is configured to implement three-dimensional graphics drawing, image rendering, composition, layer processing, and the like. The two-dimensional graphics engine is a drawing engine for two-dimensional drawing. The image processing library may provide analysis of various image data and provide a plurality of image processing algorithms, for example, may provide processing such as image cutting, image fusion, image blurring, and image sharpening. Details are not described herein.

The kernel layer is a layer between hardware and software. The kernel layer includes at least a display driver, a camera driver, an audio driver, and a sensor driver.

For ease of understanding, in the following embodiments of this application, a mobile phone having the structures shown in FIG. 1 and FIG. 2 is used as an example to describe in detail, with reference to the accompanying drawings and application scenarios, the method for interaction between devices based on a pointing operation provided in embodiments of this application.

Figure 3A:
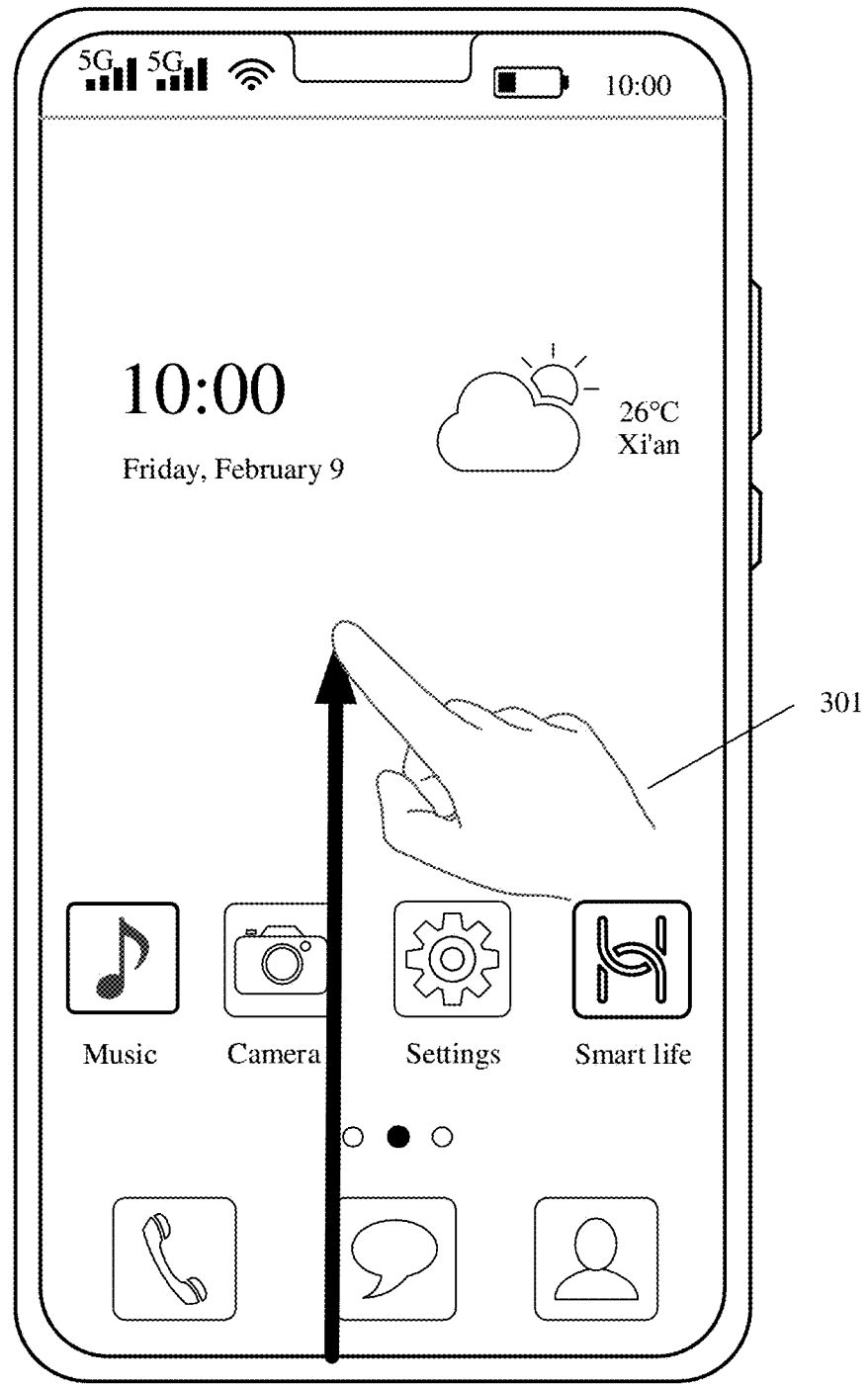
FIG. 3A to FIG. 3D each are a schematic diagram of an example of a graphical user interface for device interconnection according to an embodiment of this application.

FIG. 3A to FIG. 3D each are a schematic diagram of an example of a graphical user interface (graphical user interface, GUI) for device interconnection. A user may discover another electronic device and establish a connection to a target electronic device by using a process shown in FIG. 3A to FIG. 3D. FIG. 3A shows a main interface 301 currently displayed by a mobile phone in an unlocking mode. The main interface 301 displays a plurality of applications (applications, Apps), for example, applications such as Music, Camera, Settings, and Smart life. It should be understood that the main interface 301 may further include more other applications. This is not limited in this embodiment of this application.

As shown in FIG. 3A, the user may perform, on the main interface 301, a sliding operation upwards from a bottom of the mobile phone, for example, a sliding track shown by a black arrow. In response to the sliding operation of the user, the mobile phone opens a control center interface 302 shown in FIG. 3B. The control center interface 302 may include different control menus or control options, for example, different control menus or control options such as "Airplay mirroring", "Airdrop receiving off", "Wireless local area networks (wireless local area networks, WLAN)", "Mute", "Auto-rotate", and "Camera". This is not limited in this embodiment of this application.

Figure 3B:
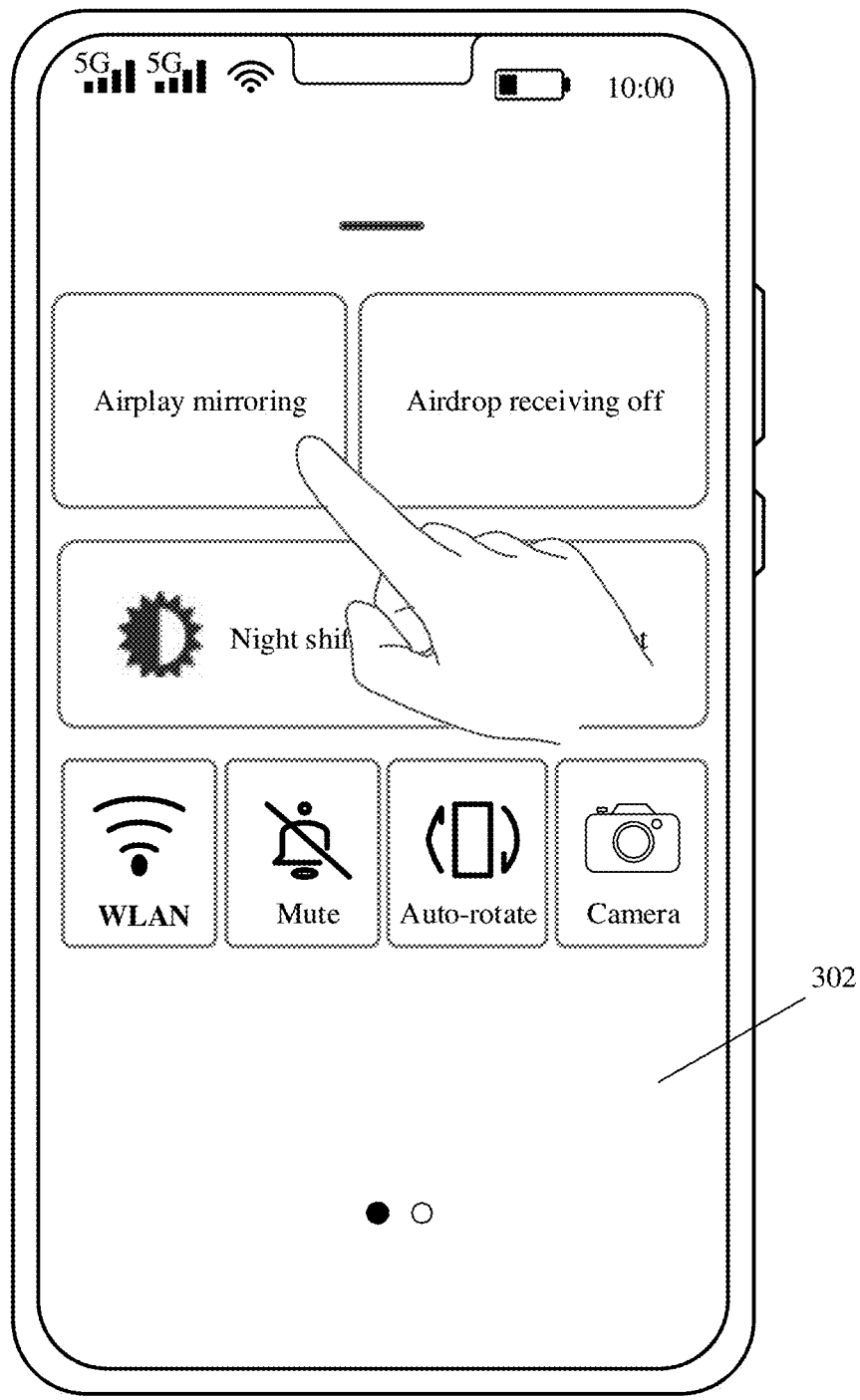
Figure 3C:
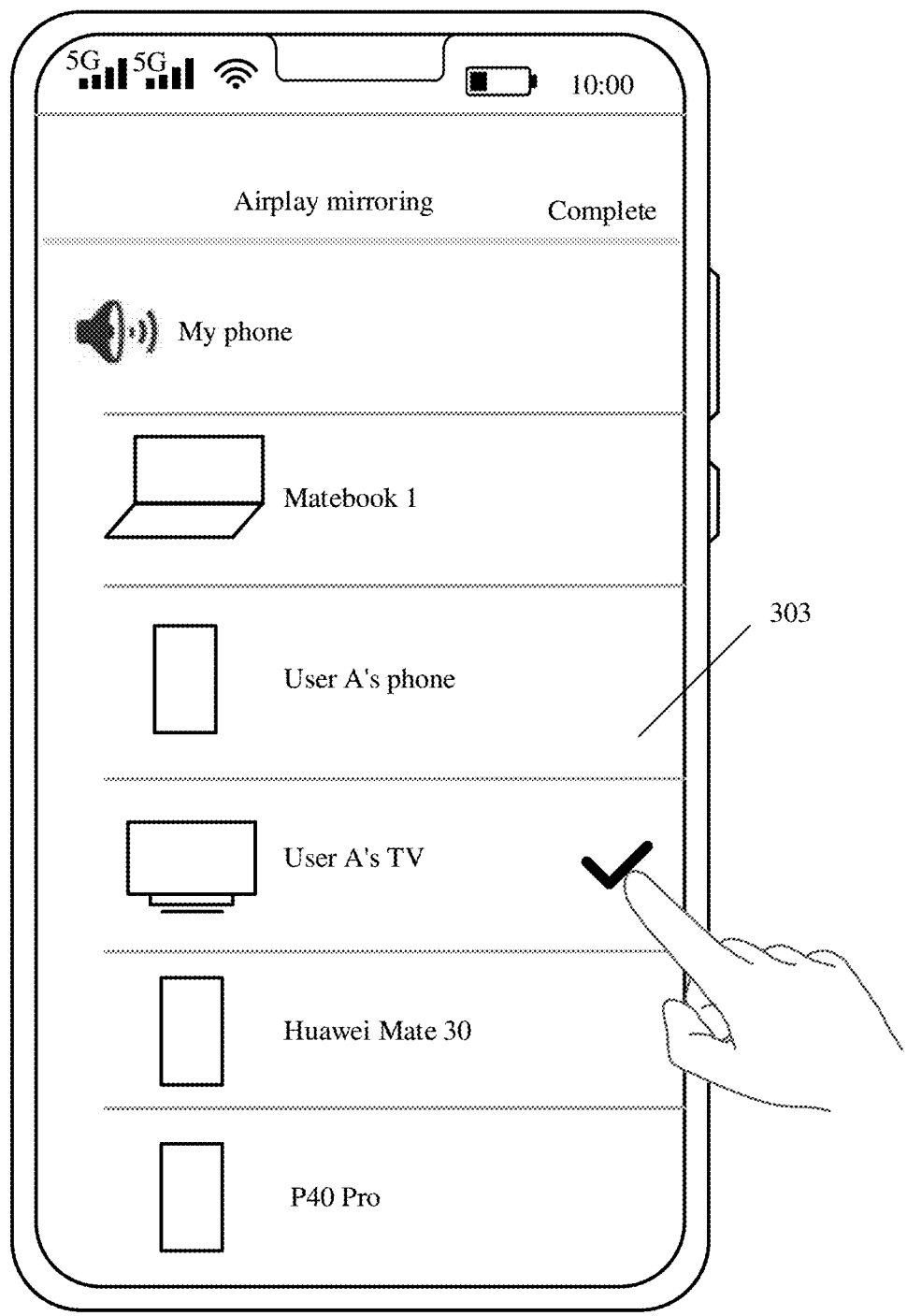
Figure 3D:
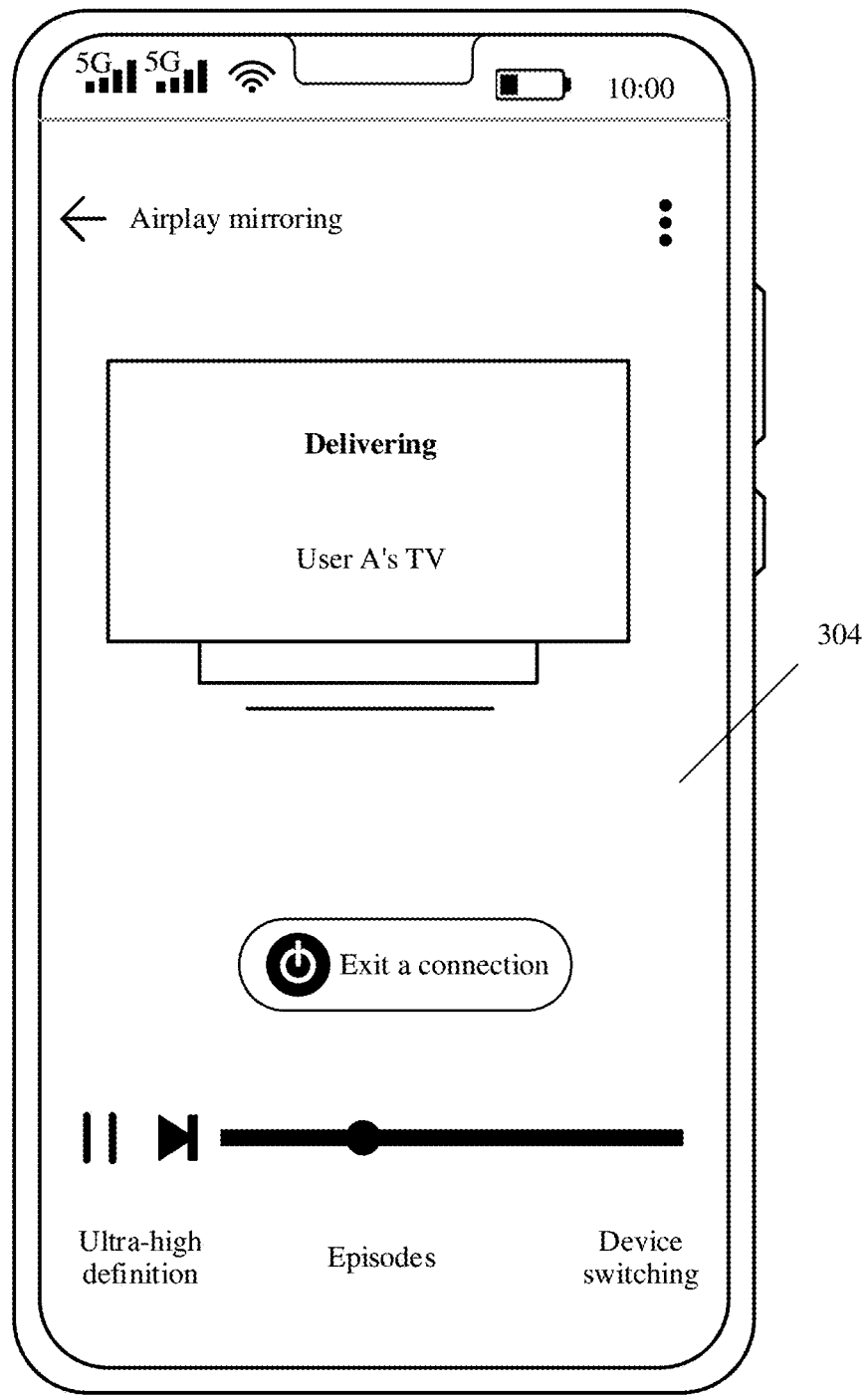

For example, the user may perform an operation, shown in FIG. 3B, of tapping the "Airplay mirroring" option on the control center interface 302. In response to the tap operation of the user, the mobile phone opens an Airplay mirroring details interface 303 shown in FIG. 3C. On the Airplay mirroring details interface 303, a list of devices discovered by the mobile phone may be displayed. It should be understood that the list of devices may include an electronic device that has previously established a connection to the mobile phone, electronic devices registered based on a same user account, electronic devices connected to a same network, an electronic device discovered by scanning by a current device, or the like. This is not limited in this embodiment of this application.

In a home scenario, if the user currently expects the mobile phone to connect to and control a smart television, the user may tap "User A's TV", and the mobile phone opens a control center interface 403 of the smart television. The control center interface 403 may include various menus or buttons used to control the smart television, for example, a connection exit switch, a playback progress bar, a pause button, and an episode selection button. The user may control the smart television in the home scenario by using the menus or buttons of the control center interface 403.

In the foregoing method, device discovery and selection of a plurality of devices are performed on a mobile phone, so that devices that can be controlled by the mobile phone are displayed in a list, and the user may select a device from the list according to a requirement and perform corresponding control. In this process, when a quantity of selectable devices in the list exceeds a specific quantity, the user may perform identification based on a device icon, a device name, and the like, and select a target device from the plurality of devices with reference to a scrolling operation and the like. In a possible case, a device arrangement sequence in the list of devices is related to signal strength of the devices. When a signal is unstable or a location of the user changes, the device arrangement sequence in the list of devices may change, and the user needs to slide for a plurality of times to find a target device, which increases operation costs of the user. In addition, because a system of the mobile phone cannot sense the target device expected by the user, all scanned devices can be displayed to the user, which also increases operation costs of the user and time for selecting the target device. In addition, when the user selects the target device from the list of devices, a misoperation such as an accidental touch is likely to occur.

Figure 4A:
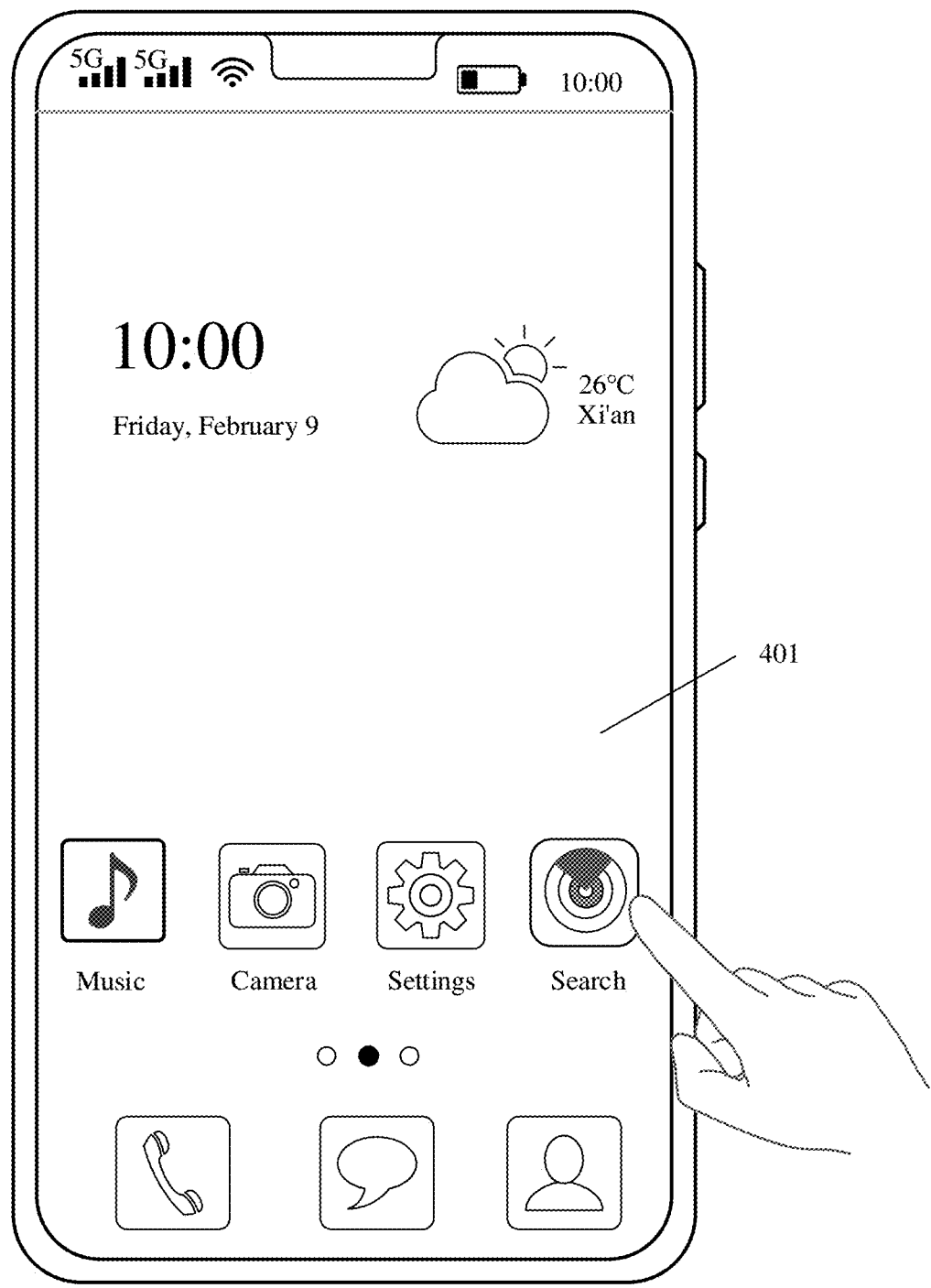
FIG. 4A and FIG. 4B each are a schematic diagram of another example of a graphical user interface for device interconnection according to an embodiment of this application.
Figure 4B:
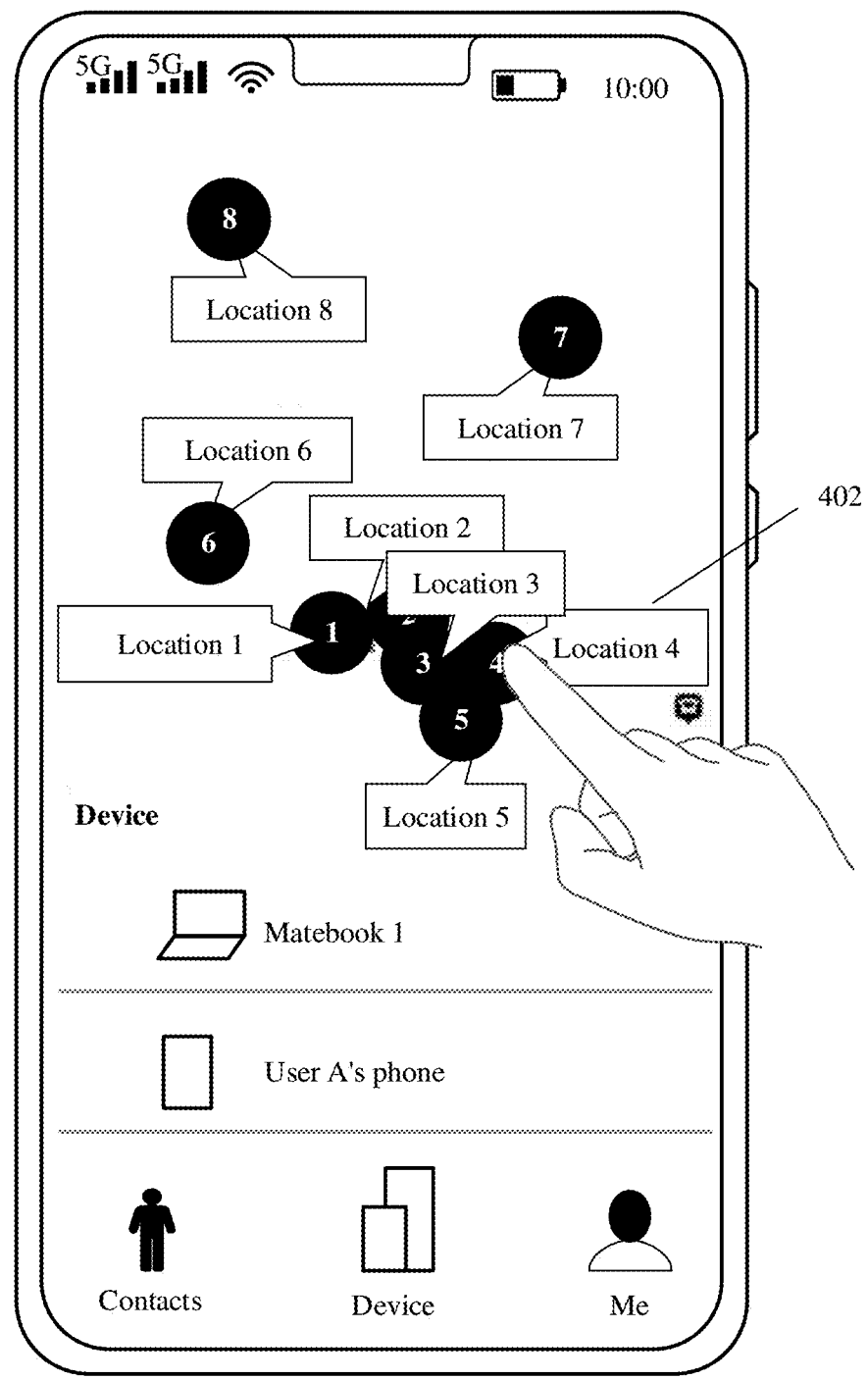

FIG. 4A and FIG. 4B each are a schematic diagram of another example of a graphical user interface for device interconnection. The user may discover another electronic device and establish a connection to a target electronic device by using a process shown in FIG. 4A and FIG. 4B.

FIG. 4A shows a main interface 401 currently displayed by a mobile phone in an unlocking mode. The main interface 401 displays a plurality of applications (applications, Apps), for example, applications such as Music, Camera, Settings, and Search.

As shown in FIG. 4A, the user taps the Search application. In response to the tapping operation of the user, the mobile phone opens a search interface 402 shown in FIG. 4B. On the search interface 402, locations of a plurality of devices may be displayed in a map manner. For example, as shown in FIG. 4B, the mobile phone may find a device 1, a device 2, a device 3, a device 4, and a device 5, and display a location label of each device, to mark a location of each device. The user may tap a location label of a target device, to establish a connection to the target device, or display a control center interface of the target device, to further control the target device.

In a process of displaying the plurality of devices through the map of the Search application, the map needs to occupy most regions of a screen of the mobile phone. In this case, a display region of a list of devices becomes smaller, and fewer electronic devices can be displayed. In addition, in the map, when a distance between devices is short, locations of the plurality of devices overlap, and the user may accidentally touch another device when tapping the target device. Alternatively, in this process, the user needs to select the target device with reference to a complex interaction operation or an auxiliary operation such as zooming or dragging, which increases operation costs of the user and time for selecting the target device.

In still another possible implementation, the user may further contact, by using a near field communication (near field communication, NFC) technology, two devices at places on which NFC patches are pasted, to discover and select the device. In this process, the user needs to bring the mobile phone close to the target device, and discover and select the device by physically touching a specific region. However, not all devices support the NFC function, and the mobile phone and the target device need to display an NFC patch on appearances of the devices, which affects the appearance of the devices to some extent.

In conclusion, in an existing process of device discovery, device connection, or device control, the user needs to perform a complex interaction operation, which increases operation costs of the user and time for selecting the target device. In view of this, embodiments of this application provides a quick device interaction method, to implement discovery, connection, control, or the like between devices while user operations are reduced.

It should be understood that, in descriptions of subsequent embodiments, the mobile phone is used as a handheld device of the user, or is referred to as a "control device", and how to control another electronic device in the home scenario or connect to another electronic device by using the mobile phone is described. The another electronic device may be referred to as a "controlled device". In the home scenario, the handheld device of the user may be a device such as a mobile phone or a tablet that has the structure shown in FIG. 1 and FIG. 2, and the controlled device may include a smart television (smart screen), an air conditioner, a sound box, a personal computer, a router, and the like. Examples are not described herein one by one. The following uses an example in which a mobile phone controls a smart television (smart screen), an air conditioner, and a sound box in a home scenario to describe in detail how to implement a control process between devices in embodiments of this application by using a shortcut gesture.

Figure 5A:
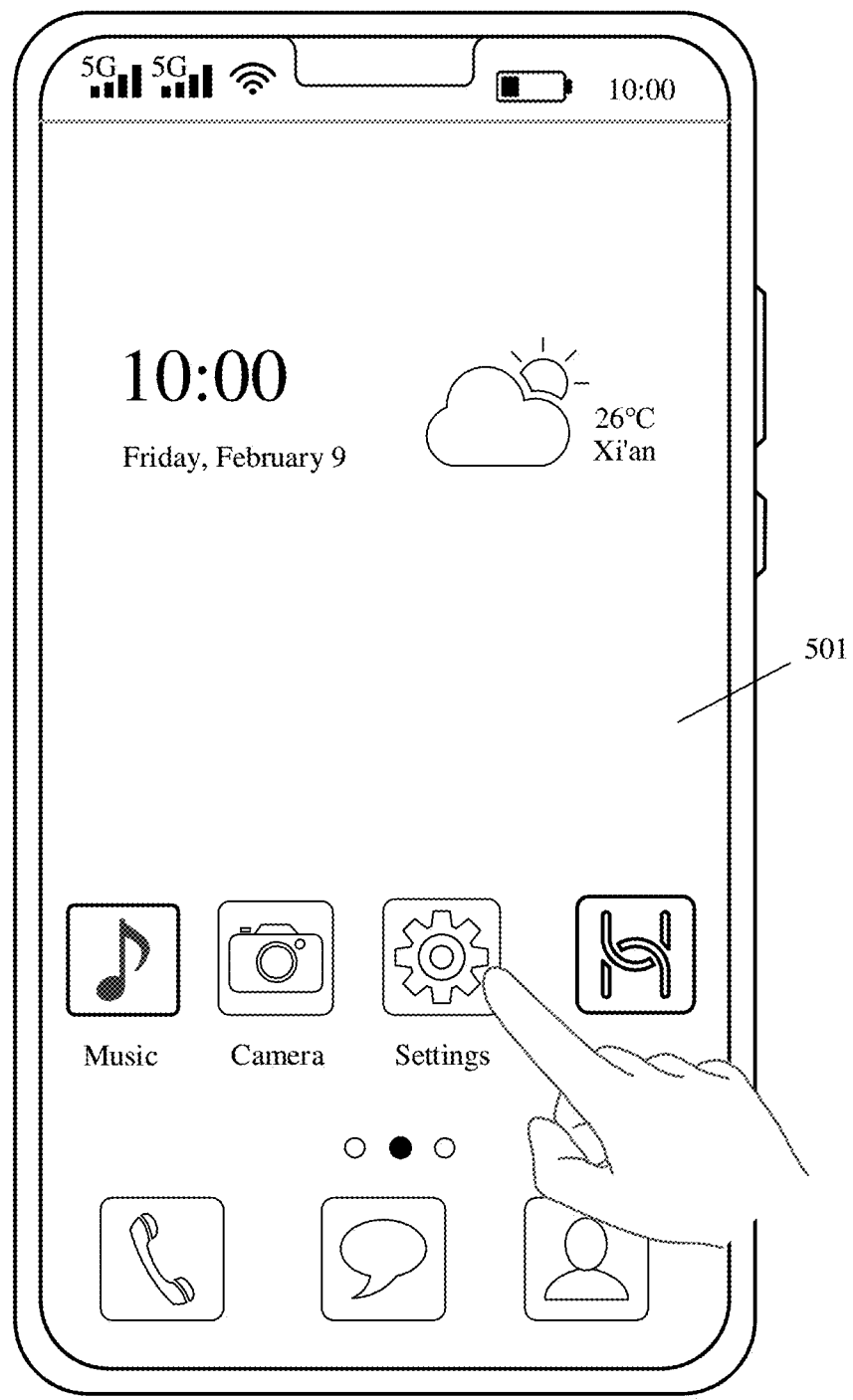
FIG. 5A to FIG. 5C each are a schematic diagram of an example of a graphical user interface for enabling a function of quick interaction between devices according to an embodiment of this application.
Figure 5B:
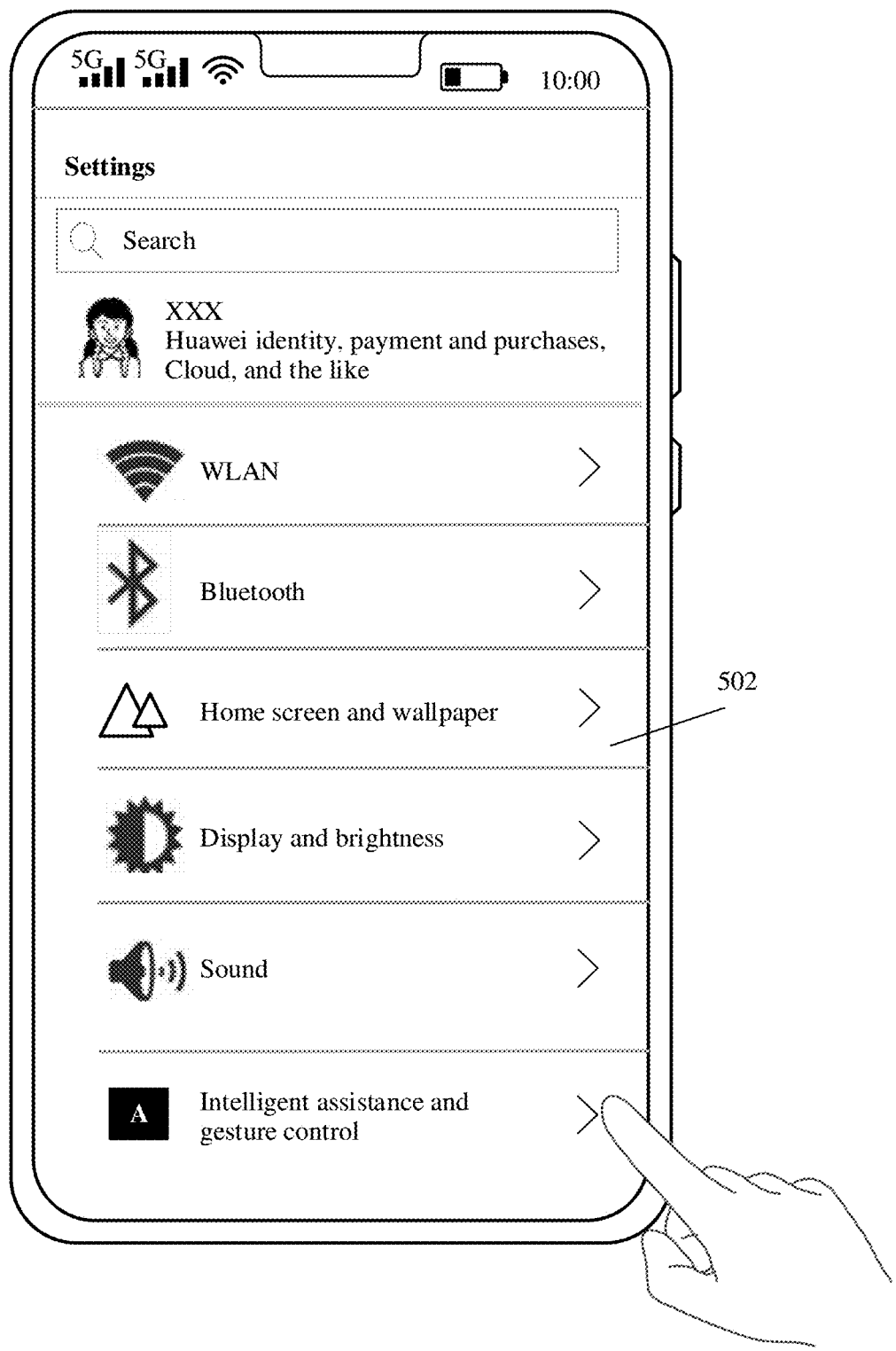
Figure 5C:
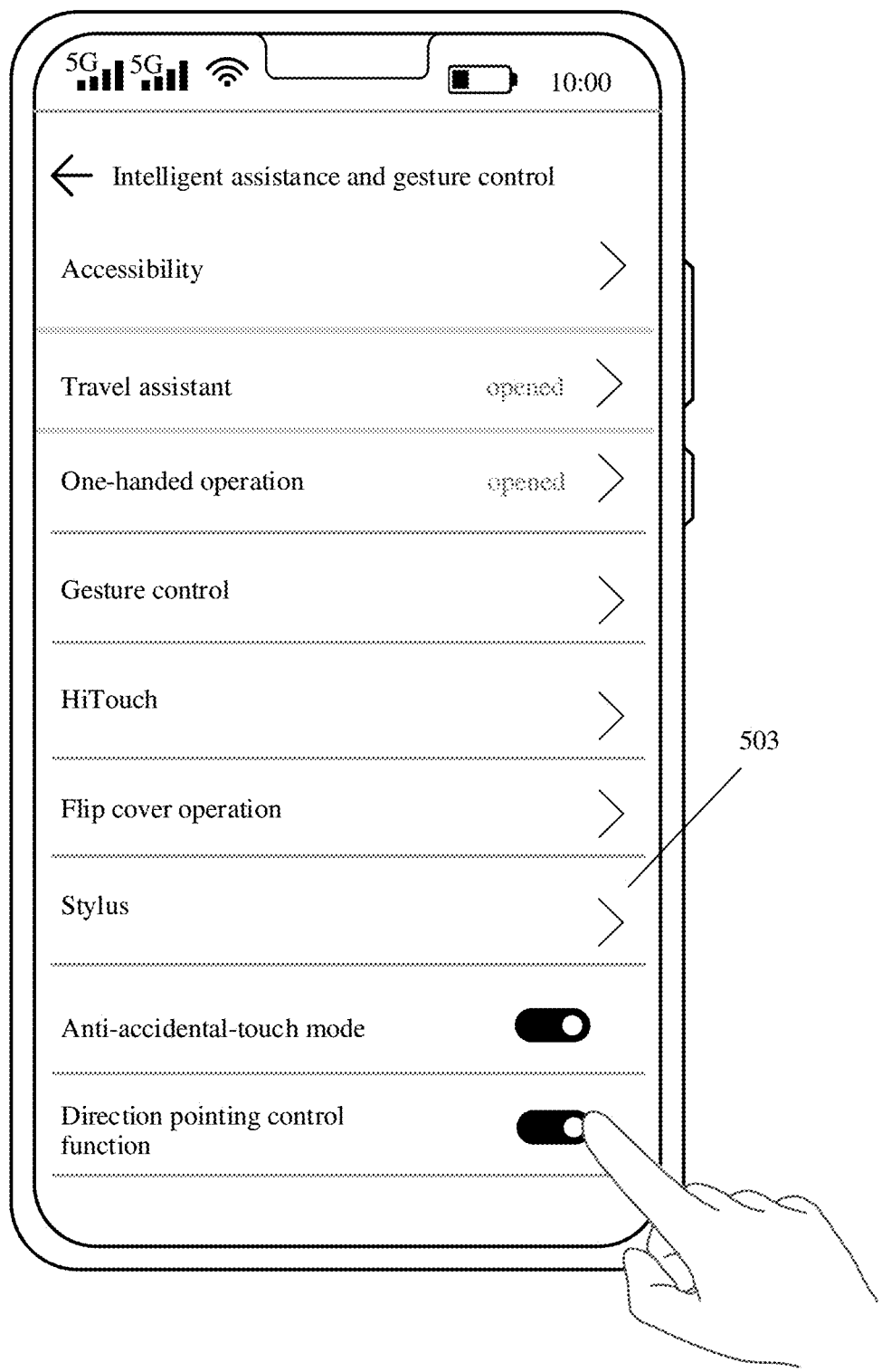

FIG. 5A to FIG. 5C each are a schematic diagram of an example of a graphical user interface for enabling a function of quick interaction between devices according to an embodiment of this application. FIG. 5A shows a main interface 501 currently displayed by the mobile phone in an unlocking mode. A user taps an icon of a Settings application on the main interface 501. In response to the tapping operation of the user, the mobile phone displays a main interface 502 of the Settings application shown in FIG. 5B. Specifically, as shown in FIG. 5B, the main interface 502 of the Settings application includes a plurality of menus used to set a mobile phone network connection, a Bluetooth connection, a main interface and wallpaper, display and brightness, sound, and an intelligent assistance function.

The user taps the intelligent assistance and gesture control menu, and in response to the tapping operation of the user, the mobile phone displays a details interface 503 of intelligent assistance and gesture control shown in FIG. 5C. The interface 503 may further include a plurality of submenus used to implement intelligent control of the mobile phone, for example, a travel assistant submenu, a one-hand operation submenu, a gesture control submenu, a smart screen recognition submenu, a flip cover operation submenu, and a stylus operation submenu. The interface 503 may further include switches for different functions such as an anti-accidental touch mode. It should be understood that a type and a quantity of menus or switches displayed on the interface are not limited in this embodiment of this application. For a function of each menu or switch, refer to implementation of the conventional technology. Details are not described herein again.

In a possible implementation, in this embodiment of this application, a "direction pointing control function" switch may be added to the intelligent assistance and gesture control menu. The user may perform an operation, shown in FIG. 5C, of tapping the "direction pointing control function" switch to enable a function of quick interaction between devices described in this embodiment of this application, that is, to control quick interaction between devices by using the mobile phone.

It should be understood that, the foregoing explains that the "direction pointing control function" switch is enabled in the Settings application, and the "direction pointing control function" switch may be further added in another application. For example, the "direction pointing control function" switch is added in the Smart life application, and the user may enable a function of quick interaction between the devices by using the "direction pointing control function" switch in the Smart life. This is not limited in embodiments of this application.

Alternatively, in addition to enabling the function of quick interaction between the devices in the Settings application and the Smart life application disposed on the mobile phone, the "direction pointing control function" switch may be added to a notification bar of the mobile phone. For example, the user may perform a pull-down operation from the top of the mobile phone on any interface of the mobile phone. In response to the pull-down operation of the user, the mobile phone displays a notification interface 302 shown in FIG. 3B, and the "direction pointing control function" switch is added to the notification interface 302. The user may tap the "direction pointing control function" switch to enable the function of quick interaction between the devices. A manner of enabling the function of quick interaction between the devices is not limited in this embodiment of this application.

According to the method described in FIG. 5A to FIG. 5C, the user enables a function of implementing interaction between devices by using a shortcut gesture provided in embodiments of this application. Before the shortcut gesture is described in detail, as a handheld device of the user, the mobile phone further needs to position devices such as a smart television (smart screen), an air conditioner, a sound box, and a router in a home scenario. In other words, the mobile phone needs to determine a location of each device, so as to perform control more accurately through the shortcut gesture.

In a possible implementation, in a home scenario, at least three fixed positioning components are disposed, and it is ensured that the three positioning components are in a power-on working state, and the at least three positioning components may communicate with the handheld device of the user.

Optionally, the positioning component may be a sensor having a positioning function, a structure having a positioning function, or the like. For example, the sensor may be a laser sensor, an infrared sensor, or the like. The structure having the positioning function may be a chip. For example, the structure having the positioning function may be a Bluetooth module-based positioning structure, an ultra-wideband (ultra-wideband, UWB) wireless sensing capability-based positioning chip, a global positioning system (global positioning system, GPS)-based positioning structure, a wireless fidelity (wireless fidelity, Wi-Fi) module-based positioning structure, or the like.

Optionally, in addition to the foregoing listed positioning component pre-arranged in the home scenario, the positioning component may be disposed on a device such as a smart television (smart screen), an air conditioner, a sound box, or a router in the home scenario. For example, if the device such as the smart screen, the air conditioner, or the sound box has a UWB chip, the at least three fixed positioning components do not need to be additionally arranged in the home scenario, and a positioning function of any device in the home scenario may be implemented through interaction between the mobile phone and the device such as the smart screen, the air conditioner, or the sound box. For a specific positioning algorithm, refer to a process described subsequently. It should be understood that a quantity and an implementation form of the positioning component are not limited in this embodiment of this application.

Figure 6:
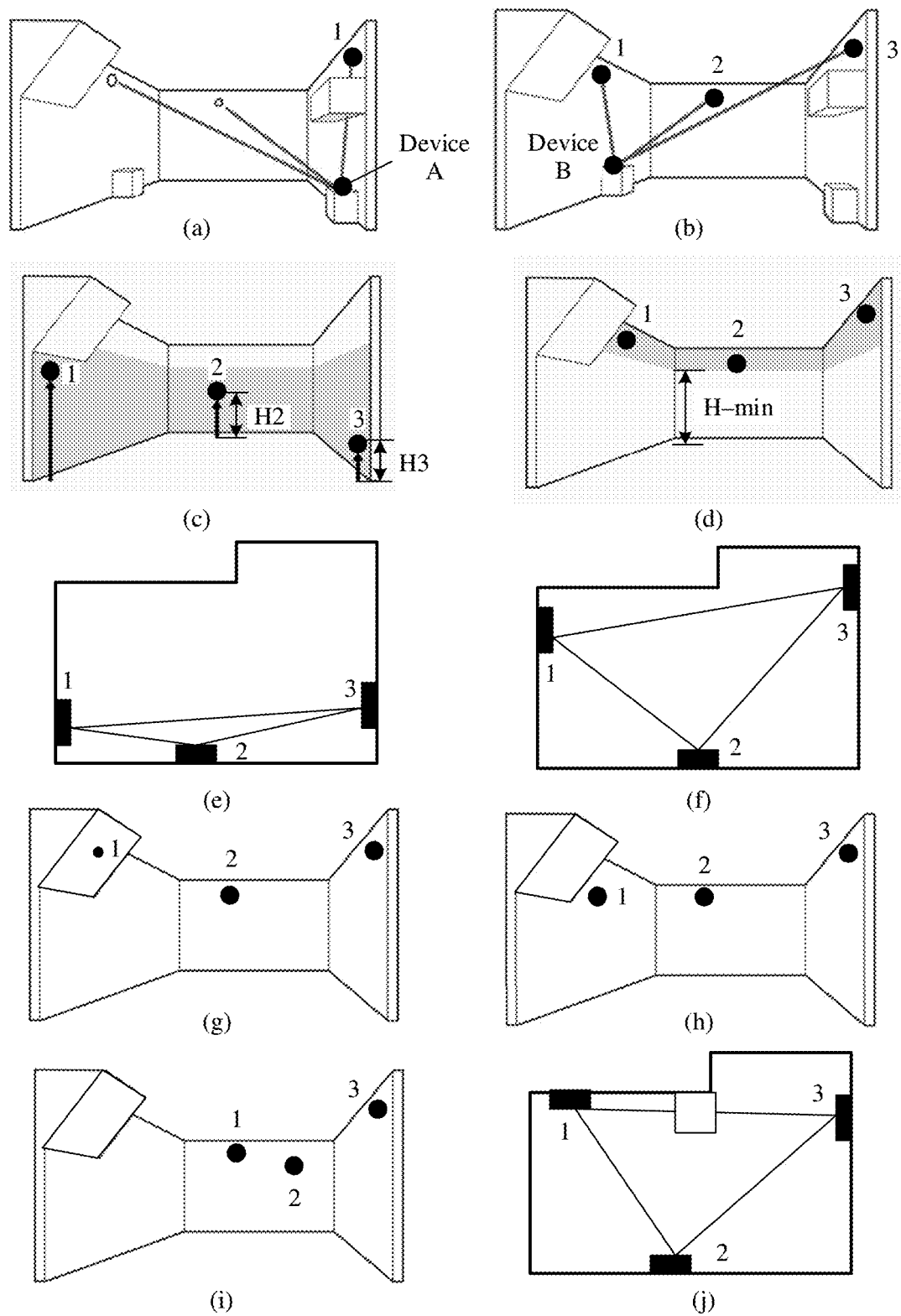
FIG. 6 is a schematic diagram of an example of installation of a positioning component according to an embodiment of this application.

FIG. 6 is a schematic diagram of an example of installation of a positioning component according to an embodiment of this application. Specifically, an installation rule of the positioning component is described by using an example in which three fixed positioning components are disposed in a home scenario. The specific installation rule may include:

(1) Accessibility Communication Rule

Specifically, in an installation process of the positioning component, it is ensured that each positioning component can communicate with any device in the home scenario, so that the mobile phone, as a handheld device, can communicate with each positioning component, and the mobile phone can accurately position a location of each device in the home scenario.

For example, (a) in FIG. 6 shows an incorrect installation manner. There is an obstacle between a positioning component 1 and a device A, which may cause communication between the positioning component 1 and the device A. As a result, the device A in the home scenario cannot be positioned by using the three positioning components. In a process of installing the positioning components, as shown in (b) in FIG. 6, it is ensured that any device B in the home scenario may communicate with the positioning component 1, a positioning component 2, and a positioning component 3 respectively, and there is no obstacle between the device B and any positioning component.

(2) Installation Height Rule of the Positioning Components

Specifically, in the process of installing the positioning components, it is ensured that a height between each positioning component and a plane of the ground is greater than or equal to 2 meters, or is referred to as a minimum installation height H-min. The minimum installation height H-min can ensure that the three positioning components have a larger coverage region, and can locate any device in the home scenario.

For example, (c) in FIG. 6 shows an incorrect installation manner. A height H2 between the positioning component 2 and the plane of the ground, and a height H3 between the positioning component 3 and the plane of the ground are less than 2 meters. Consequently, coverage regions of the three positioning components may be small, and any device in the home scenario cannot be positioned by using the three positioning components. In the process of installing the positioning components, as shown in FIG. 6 (d), it is ensured that heights between the positioning component 1, the positioning component 2, and the positioning component 3 and the plane of the ground are respectively greater than H-min. That is, the positioning component 1, the positioning component 2, and the positioning component 3 are disposed in a shadow region that is greater than H-min away from the plane of the ground.

(3) Large Coverage Rule of the Positioning Components

Specifically, in the process of installing the positioning components, it is ensured that a combined coverage region of the three positioning components can be maximized, that is, devices such as a smart screen, an air conditioner, and a sound box in the entire home scenario are covered as much as possible.

For example, (e) in FIG. 6 shows an incorrect installation manner. An area of a triangular region formed after the positioning component 1, the positioning component 2, and the positioning component 3 are connected is small. As a result, a coverage region of the three positioning components may be small, and any device in the home scenario cannot be positioned by using the three positioning components. In the process of installing the positioning components, as shown in (f) in FIG. 6, it is ensured that the area of the triangular region formed after the positioning component 1, the positioning component 2, and the positioning component 3 are connected is maximized.

(4) Vertical Installation Rule of the Positioning Components

Specifically, in the process of installing the positioning components, it is ensured that the three positioning components are disposed on vertical walls, to avoid disposing the positioning component on a wall that has an inclined angle with the plane of the ground.

For example, (g) in FIG. 6 shows an incorrect installation manner. The positioning component 1 is disposed on an inclined wall. As a result, the coverage region of the three positioning components may be small, and any device in the home scenario cannot be positioned by using the three positioning components. In the process of installing the positioning component, as shown in (h) in FIG. 6, it is ensured that the positioning component 1, the positioning component 2, and the positioning component 3 are all disposed on vertical walls.

(5) Uniform Installation Rule of the Positioning Components

Specifically, in the process of installing the positioning components, it is ensured that three positioning components are disposed on different walls, to avoid disposing two or more positioning components on a same wall.

For example, (i) in FIG. 6 shows an incorrect installation manner. The positioning component 1 and the positioning component 2 are disposed on a same wall. As a result, the coverage region of the three positioning components may be small, and any device in the home scenario cannot be positioned by using the three positioning components. In the process of installing the positioning component, as shown in (h) in FIG. 6, it is ensured that the positioning component 1, the positioning component 2, and the positioning component 3 are all disposed on different walls.

(6) No Obstacle (Wall or Object) Between the Positioning Components

Specifically, the accessibility communication rule described in the rule (i) ensures that there is no obstacle between any device and each positioning component in the home scenario, and communication can be performed. In addition, in the process of installing the positioning components, it should be further ensured that there is no obstacle between the three positioning components, and there is no obstacle between the three positioning components in a direction perpendicular to the plane of the ground and in a direction parallel to the plane of the ground, to further ensure that the coverage region of the three positioning components is as large as possible. As a result, any device in the home scenario can be positioned by using the three positioning components.

For example, (j) in FIG. 6 shows an incorrect installation manner. There is an obstacle between the positioning component 1 and the positioning component 3. It should be ensured that there is no obstacle between the three positioning components.

The foregoing describes six rules for installing the positioning components. It should be understood that in this embodiment of this application, more or fewer rules may be included when it is ensured that the three positioning components can locate any device in the home scenario. This is not limited in embodiments of this application.

After the three positioning components are disposed, connections between the handheld device and the three positioning components need to be further established, so that the handheld device may interact with the three positioning components, to further determine a location of each device in the home scenario, a distance between the handheld device and each device, and the like.

Figure 7A:
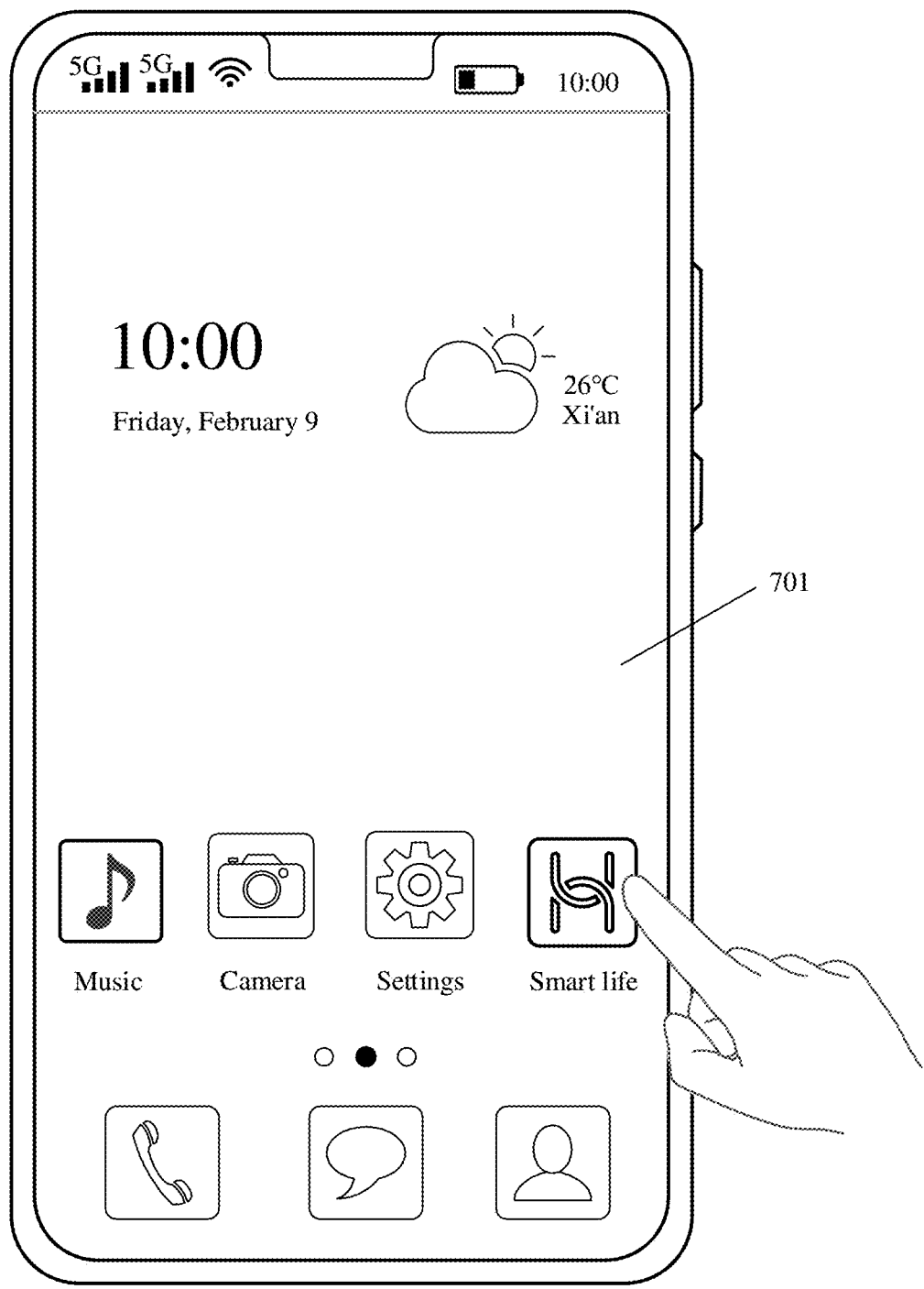
FIG. 7A to FIG. 7F each are a schematic diagram of an example of establishing a connection between a handheld device and a positioning component according to an embodiment of this application.
Figure 7B:
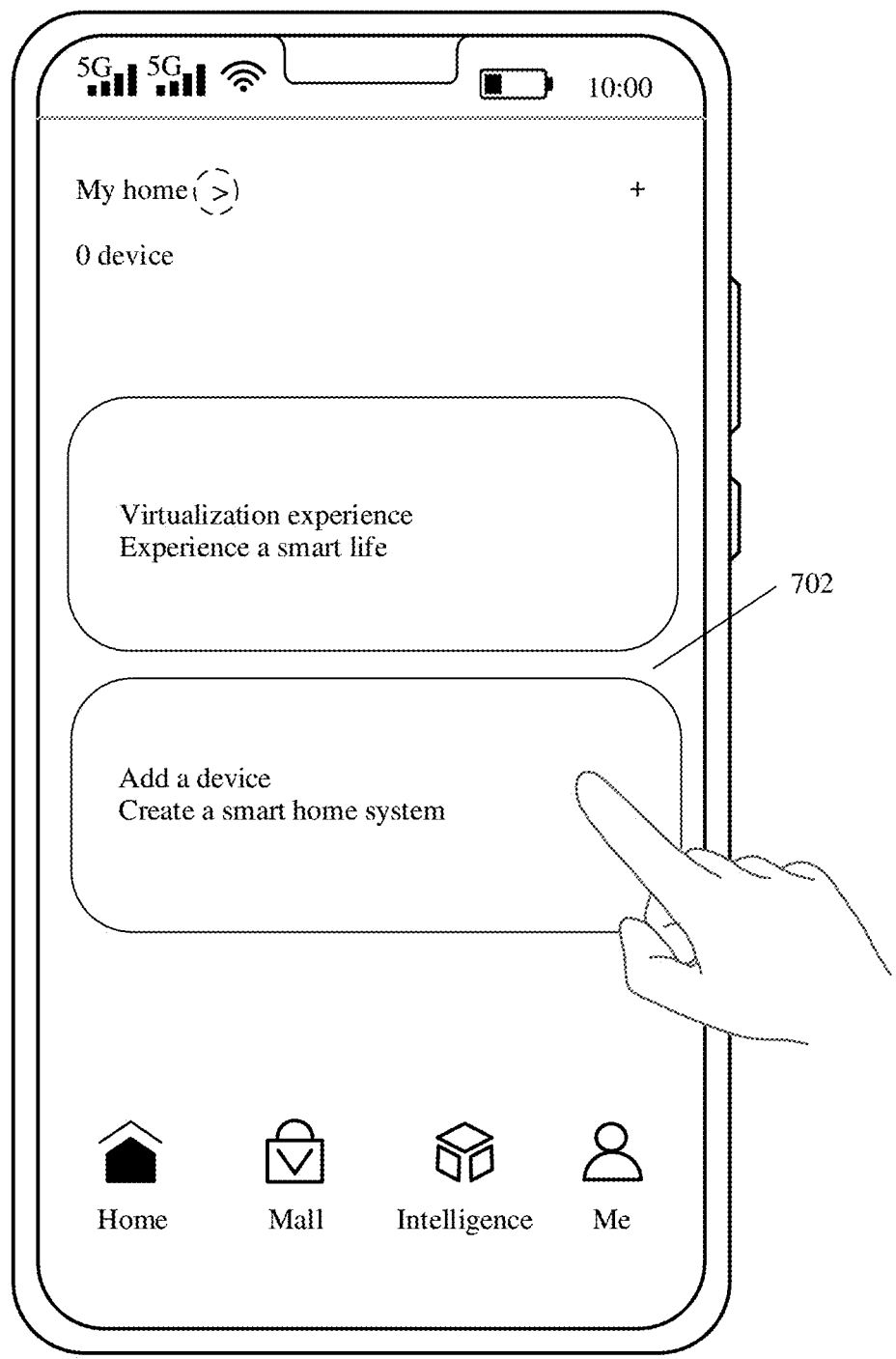

In a possible implementation, the connections may be established between the handheld device and the three positioning components through the Smart life application. For example, FIG. 7A to FIG. 7F each are a schematic diagram of an example of establishing a connection between the handheld device and a positioning component according to an embodiment of this application. FIG. 7A shows a main interface 701 currently displayed by the mobile phone in an unlocking mode. The user taps an icon of the Smart life application on the main interface 701. In response to the tapping operation of the user, the mobile phone displays a main interface 702 of the Smart life application shown in FIG. 7B. Specifically, as shown in FIG. 7B, the main interface 702 of the Smart life application may include a virtual experience menu and an adding device menu, and include function regions such as "Home", "Mall", "Smart", and "Me".

Figure 7C:
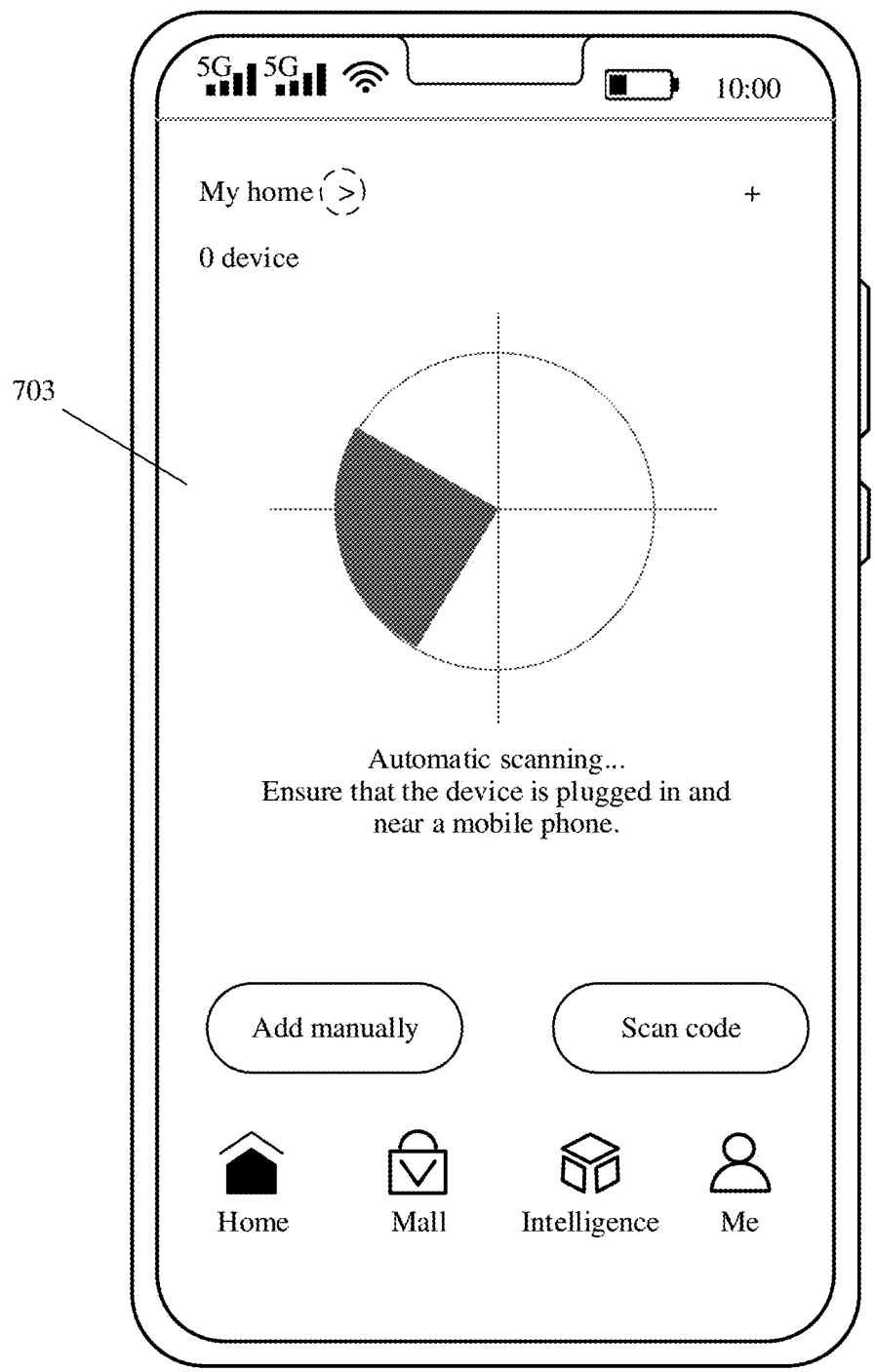

As shown in FIG. 7A, the user taps the "Adding device" menu on the main interface 702 of the Smart life application, and in response to the tapping operation of the user, the mobile phone displays an automatic scanning interface 703 shown in FIG. 7C. Specifically, the mobile phone may automatically scan a surrounding device or component that can be connected. It should be understood that, in the process, it needs to be ensured that the three positioning components disposed in the home scenario are in a working state of being powered on, and can be searched and discovered by the mobile phone.

Optionally, the user may further discover the three positioning components in a manner such as "Manually adding" or "Adding by scanning" on the main interface 702 of the Smart life application. A manner in which the mobile phone discovers the positioning component is not limited in embodiments of this application. Details are not described herein again.

Figure 7D:
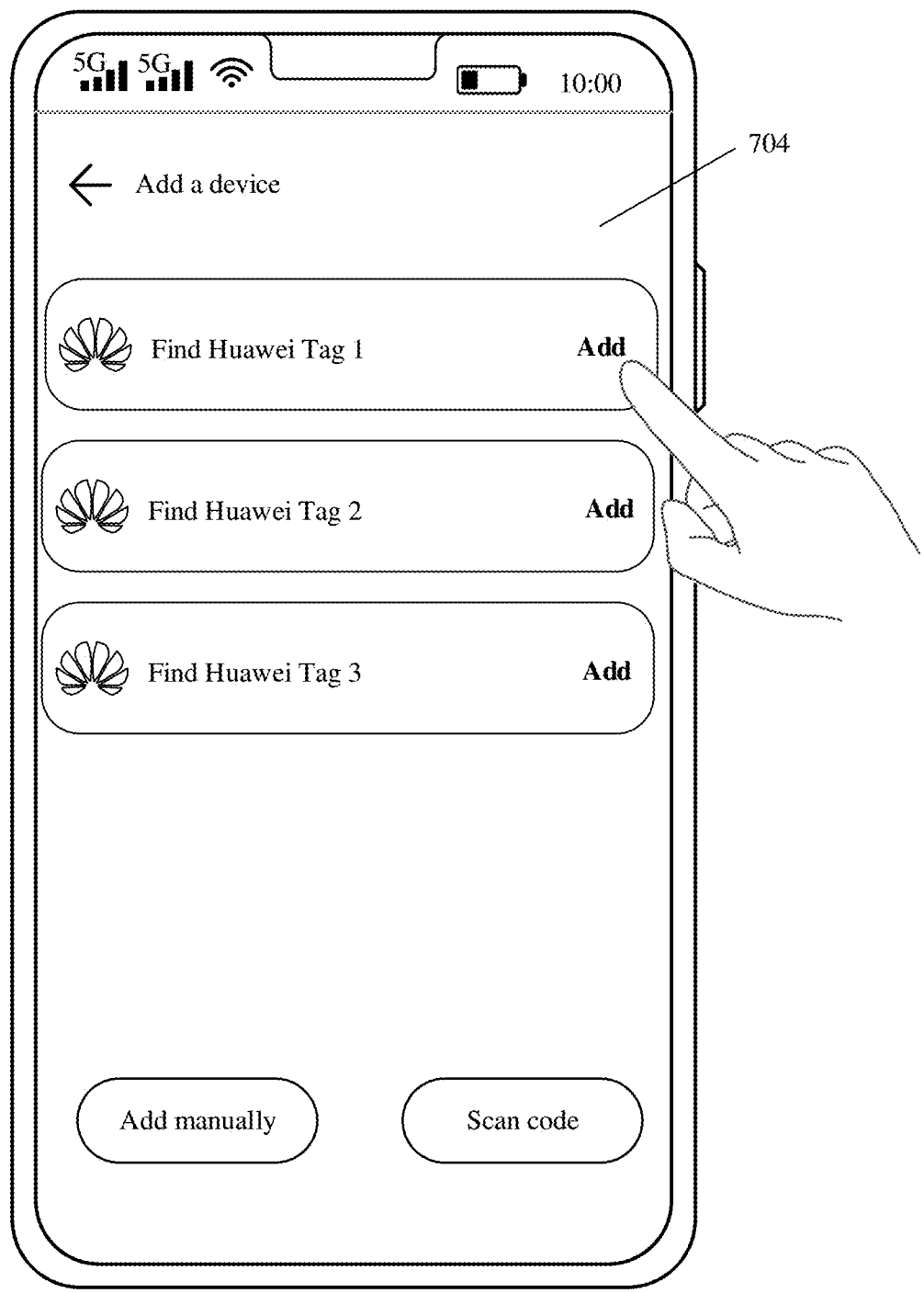

After scanning the three positioning components, the mobile phone may display an interface 704 shown in FIG. 7D. On the interface 704, names of three positioning components may be displayed, for example, Tag 1, Tag 2, and Tag 3. The user taps the positioning component Tag 1, and in response to the tap operation of the user, the Tag 1 may be directly connected to the mobile phone. Alternatively, optionally, the mobile phone may display a network configuration interface 705 shown in FIG. 7E. On the network configuration interface 705, the user may enter a current network name and a password, and tap a "Next" button, so that the mobile phone jumps to a connection success interface 706 shown in FIG. 7F.

Figure 7E:
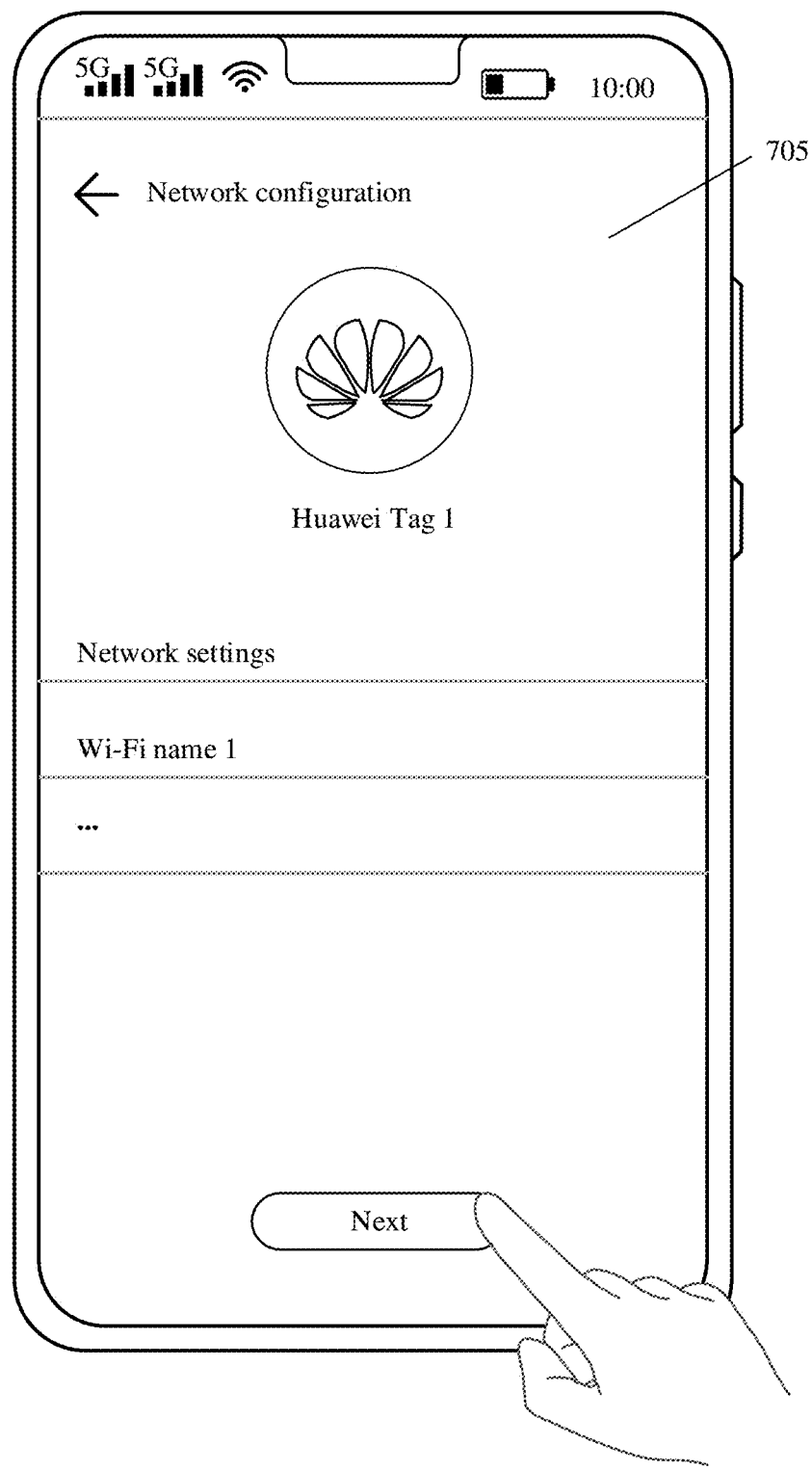
Figure 7F:
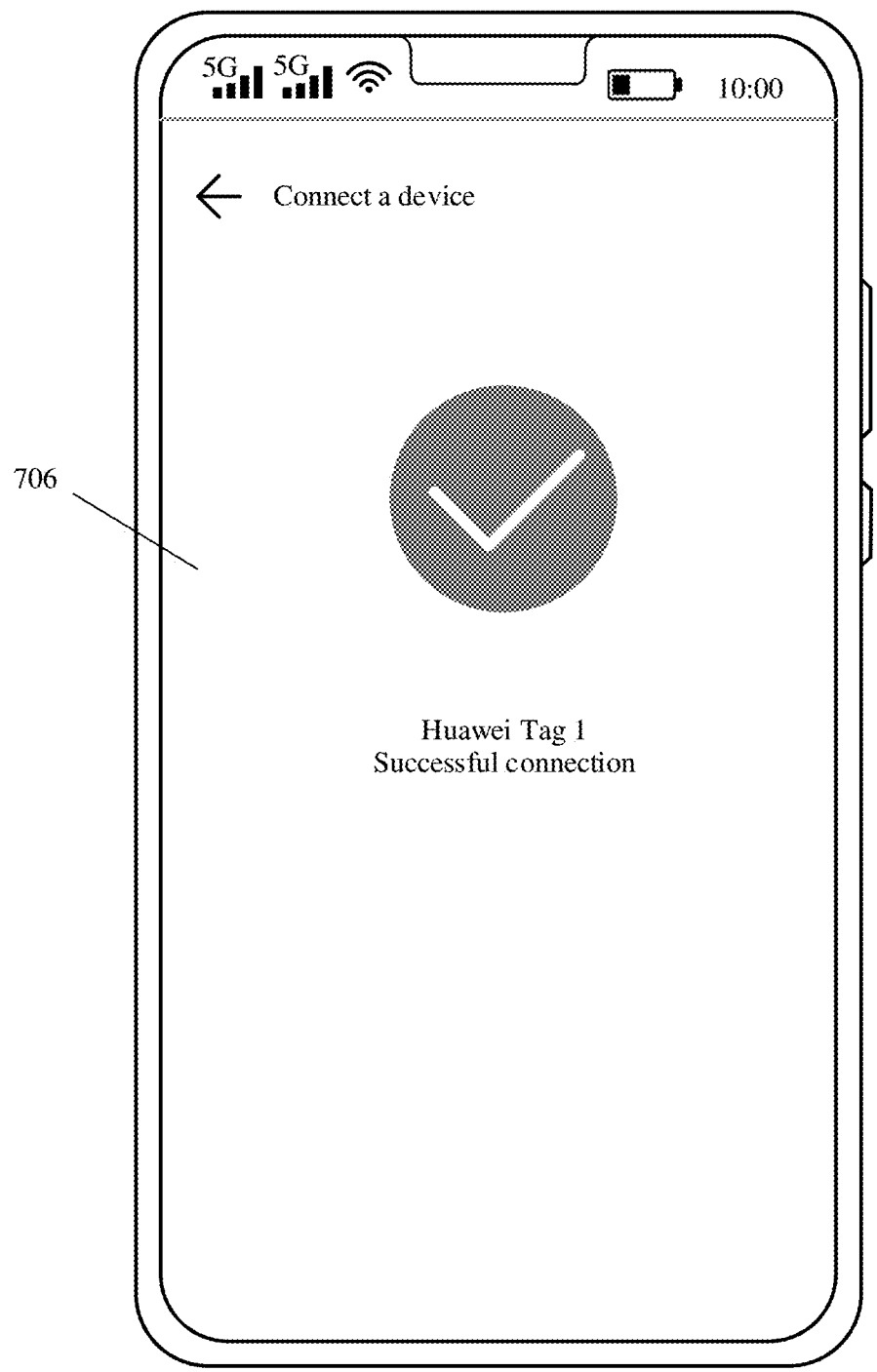

By using the foregoing steps, a connection between the mobile phone and the positioning component 1 is implemented. Similarly, processes shown in FIG. 7D, FIG. 7E, and FIG. 7F are repeated, so that the mobile phone can be connected to the positioning component 2 and the positioning component 3. Alternatively, the mobile phone may be connected to the positioning component by using a shortcut such as "touch". Details are not described in embodiments of this application.

After the three positioning components are arranged in the home scenario, the handheld device may determine a location of each device in the home scenario, a distance between the handheld device and each device, and the like based on the three positioning components.

Figure 8:
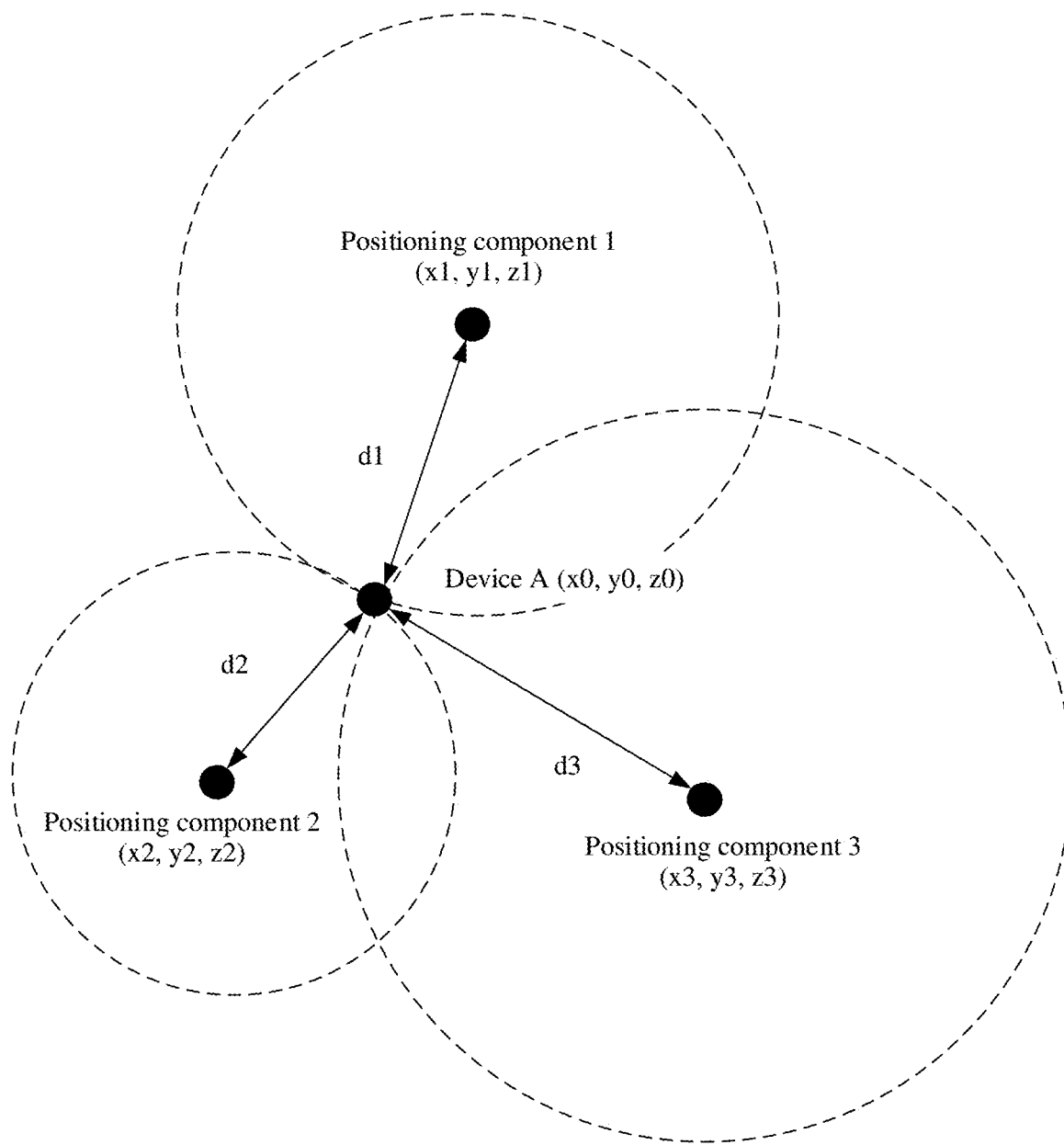
FIG. 8 is a schematic diagram of an example of determining a location of a device in a home scenario according to an embodiment of this application.

FIG. 8 is a schematic diagram of an example of determining a location of a device in a home scenario according to an embodiment of this application. A spatial coordinate system is established in space in which a room is located. For example, the spatial coordinate system is established by using a length, a width, and a height of the room as coordinate axes. A manner of establishing the spatial coordinate system is not limited in this embodiment of this application. It should be understood that a same spatial coordinate system is used when a location of each device in the home scenario is calculated by using the three positioning components.

Spatial coordinates (x1, y1, z1) of a positioning component 1, spatial coordinates (x2, y2, z2) of a positioning component 2, and spatial coordinates (x3, y3, z3) of a positioning component 3 are known, and a distance $d_1$ between a device A and the positioning component 1, a distance $d_2$ between the device A and the positioning component 2, and a distance $d_3$ between the device A and the positioning component 3 can be measured. After the foregoing known parameters are obtained, it is assumed that spatial coordinates of any device A in the home scenario are (x0, y0, z0), and values of x0, y0, and z0 are determined based on the following calculation process.

$$(x1-x0)^2+(y1-y0)^2+(z1-z0)^2=d_1^2$$

$$(x2-x0)^2+(y2-y0)^2+(z2-z0)^2=d_2^2$$

$$(x3-x0)^2+(y3-y0)^2+(z3-z0)^2=d_3^2$$

After $d_1$, $d_2$, and $d_3$ are obtained, a circle is drawn by using a location of the positioning component 1 as a circle center and $d_1$ as a radius, a circle is drawn by using a location of the positioning component 2 as a circle center and $d_2$ as a radius, and a circle is drawn by using a location of the positioning component 3 as a circle center and $d_3$ as a radius. Location coordinates of an intersection point of the three circles are location coordinates of the device A. That is, a location of any device in the home scenario may be determined by using the three positioning components 3. The mobile phone, as a handheld device, may obtain the foregoing known parameters, and determine a location of any device based on the foregoing calculation process.

In conclusion, as the handheld device, the mobile phone can communicate with the three positioning components arranged in the home scenario. To further control another device in the home scenario by using the handheld device of the user based on a direction pointing shortcut gesture of the user, the another device in the home scenario needs to be given a capability of being controlled. The following describes an implementation, with reference to FIG. 9A to FIG. 9E, that the another device in the home scenario can be given the capability of being controlled by the handheld device of the user after detecting the direction pointing shortcut gesture of the user.

Figure 9A:
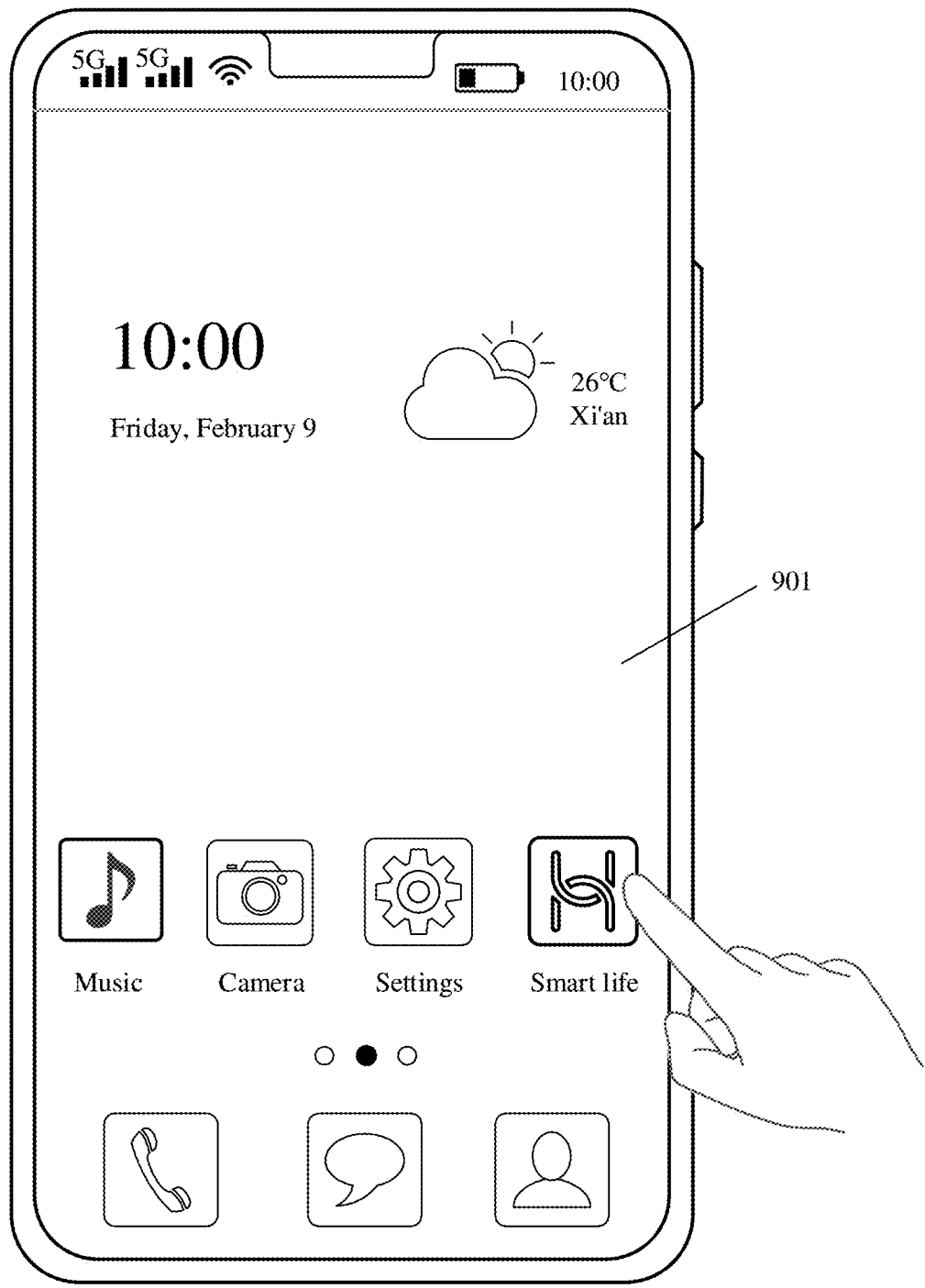
FIG. 9A to FIG. 9E each are a schematic diagram of an example of setting a device in a home scenario according to an embodiment of this application.

FIG. 9A to FIG. 9E each are a schematic diagram of an example of setting a device in a home scenario according to an embodiment of this application. FIG. 9A shows a main interface 901 currently displayed by the mobile phone in an unlocking mode. The user taps an icon of the Smart life application on the main interface 901. In response to the tapping operation of the user, the mobile phone displays a main interface 902 of the Smart life application shown in FIG. 9B.

Optionally, an infrared remote control, my sound box, Huawei router, my air conditioner, and Huawei vision in the home scenario have been added to the main interface 902 of the Smart life application. In other words, cards of a plurality of devices that have been paired with the handheld device may be displayed on the main interface 902 of the Smart life application.

It should be understood that, for a manner of adding a plurality of electronic devices in the home scenario in the life application, refer to a manner in the conventional technology, for example, a plurality of possible manners such as scanning and adding, manual adding, and touching and adding. Details are not described herein again.

In a possible implementation, on the main interface 902 of the Smart life application, the user selects, by using a preset operation, a region in which a card of a device in the home scenario is located, and then points the handheld device to a device corresponding to the region in which the card is located, to activate the device, so as to agree that the device can be controlled by the handheld device when a direction pointing gesture of the user is detected.

Figure 9B:
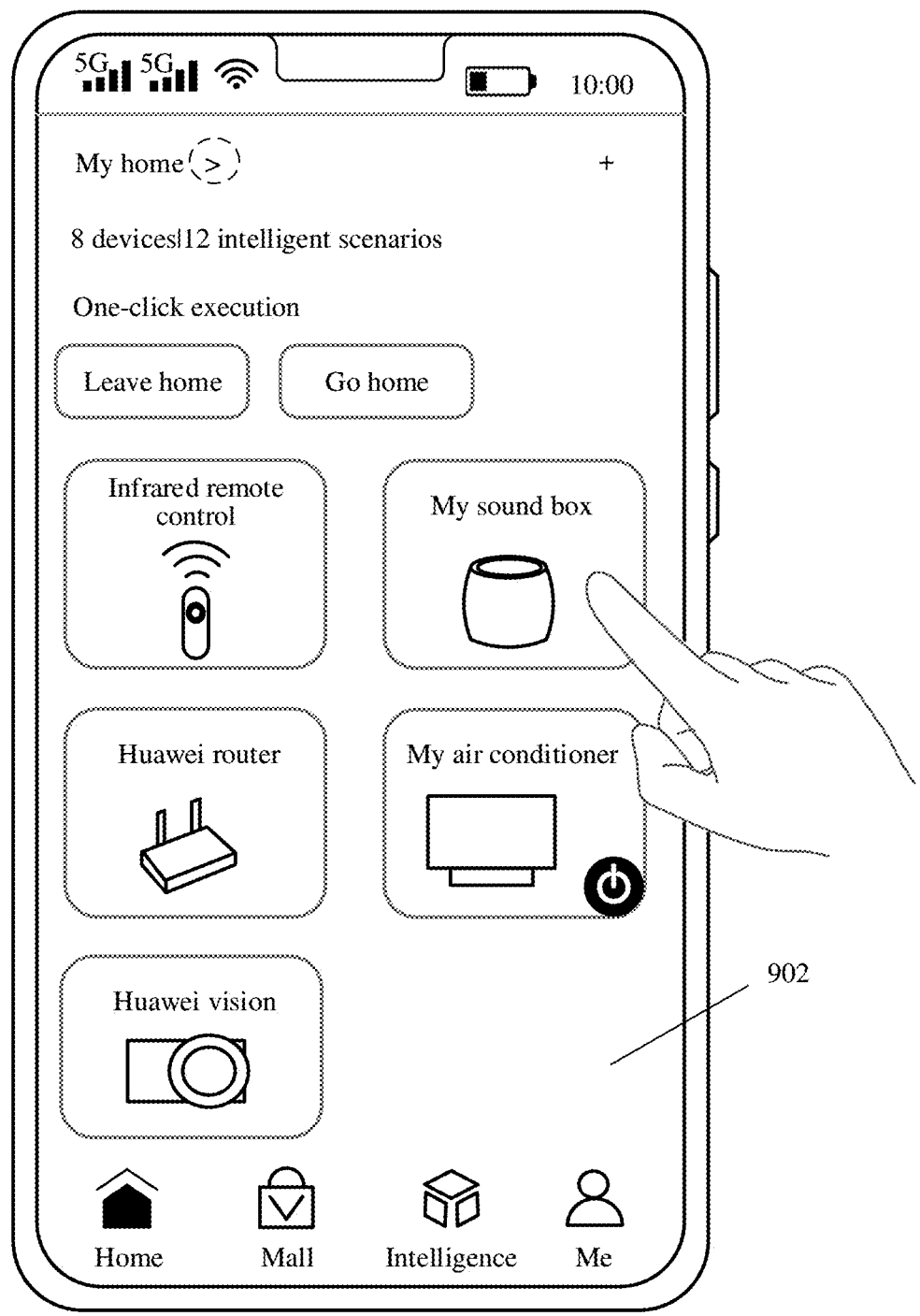

For example, as shown in FIG. 9B, on the main interface 902 of the Smart life application, the user touches and holds a region in which the "My sound box" card is located, and the user uses the mobile phone to point to a location at which the sound box is placed at the same time or within a specific time period.

It should be understood that, the touch and hold operation may trigger activation of the sound box, and then the mobile phone is directed to a location at which the sound box is placed, so that information interaction may be performed between the mobile phone and the sound box, so as to agree that when the mobile phone detects a direction pointing gesture of the user, the sound box may be controlled by the mobile phone.

It should be further understood that, in this process, the user may point the mobile phone to the location where the sound box is placed, so that information interaction may be performed between the mobile phone and the sound box. It may also be understood that, in this case, the mobile phone locates the sound box through the foregoing three connected positioning components, and determines a specific location of the sound box in the home scenario.

Optionally, the manner of triggering activation of the sound box is not limited to operations of touching and holding the region in which the "My sound box" card is located and pointing the mobile phone to the location at which the sound box is placed shown in FIG. 9B, and may be implemented by using another preset operation or gesture such as a sliding operation and an operation of pointing the mobile phone to the location at which the sound box is placed. This is not limited in embodiments of this application.

In another possible implementation, the user may select a region in which a card of a device in the home scenario is located, enter a details interface of the device, and enable a direction pointing control function switch of the device. When a direction pointing gesture of the user is detected, the device may be controlled by the handheld device. It should be understood that, in this implementation, the user may also point the handheld device to a device corresponding to the region in which the card is located, to activate the device. In this case, the mobile phone locates the device by using the foregoing three connected positioning components, determines a specific location of the device in the home scenario, and agrees that when the handheld device detects the direction pointing gesture of the user, the device may be controlled by the handheld device.

Optionally, the user may select, on the main interface 902 of the Smart life application, a region in which a card of a device in the home scenario is located, or select, by using a shortcut entry, a region in which a card of a device in the home scenario is located.

Figure 9C:
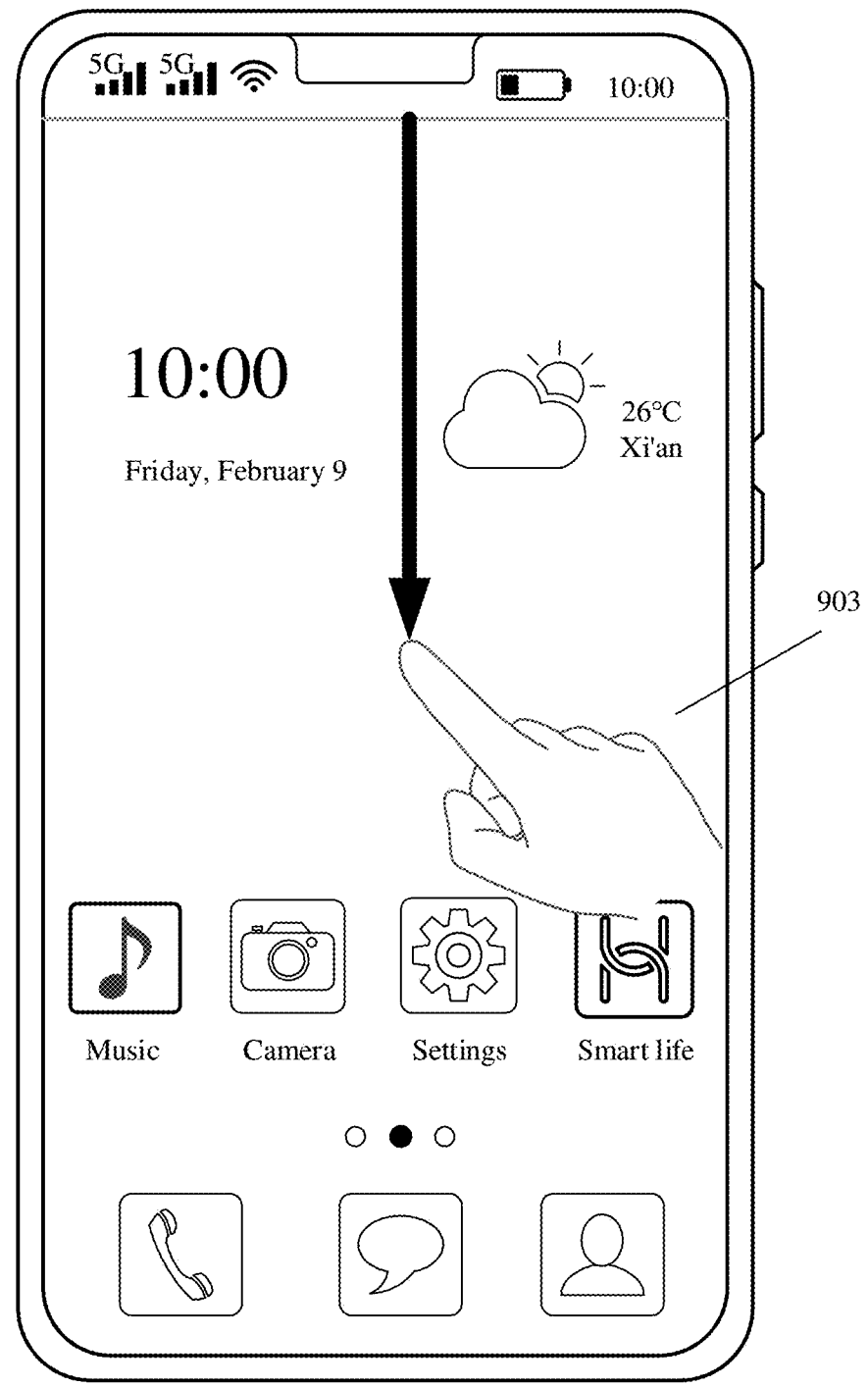
Figure 9D:
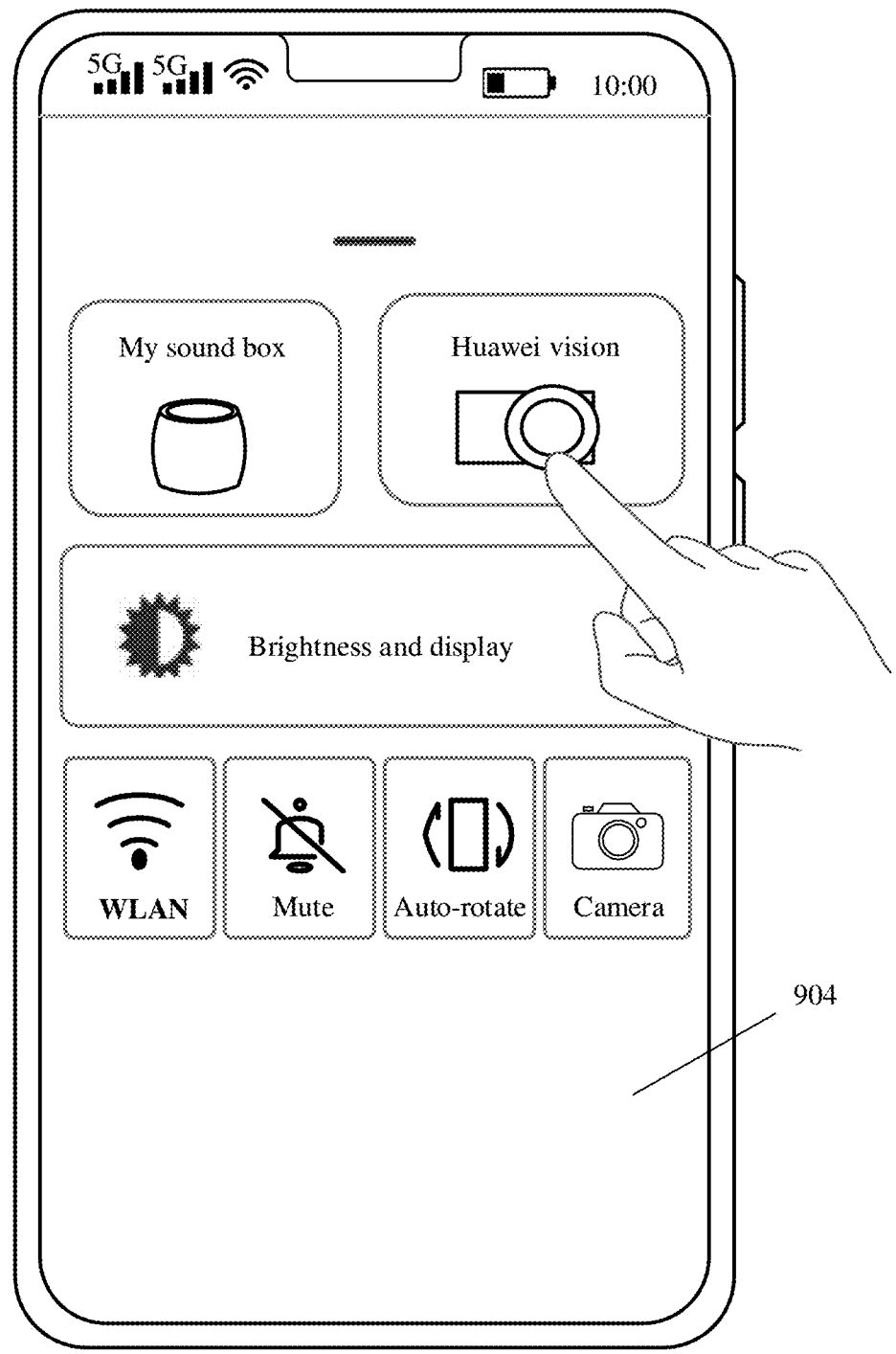

For example, as shown in FIG. 9C, on the main interface 903 of the mobile phone, the user performs a pull-down operation shown by a black arrow on the interface 903. In response to the pull-down operation of the user, the mobile phone displays a control center interface 904 shown in FIG. 9D. A my sound box card and a Huawei vision card that have been added in the home scenario may be displayed on the control center interface 904.

Figure 9E:
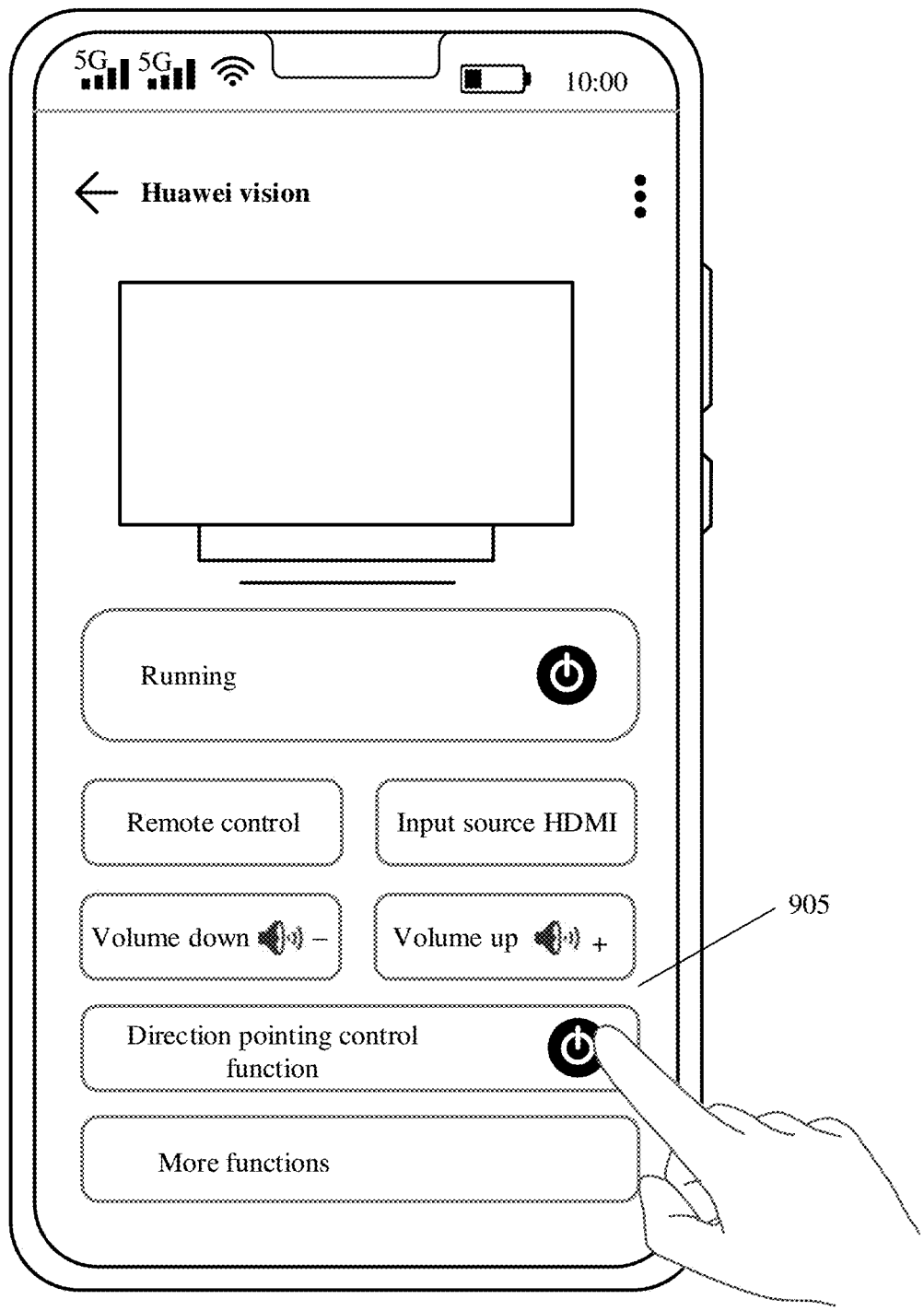

The user taps a region in which the Huawei vision card is located, and the mobile phone may open a Huawei vision details interface 905 shown in FIG. 9E. A "direction pointing control function" switch may be added on the Huawei smart screen details interface 905. The user taps the "direction pointing control function" switch to turn on the switch, so that the switch is in an on state, and the Huawei vision can be activated. In this case, the mobile phone positions the Huawei vision by using the foregoing three connected positioning components, determines a specific location of the Huawei vision in the home scenario, and agrees that when the mobile phone detects a direction pointing gesture of the user, the Huawei vision can be controlled by the mobile phone.

In still another possible implementation, after the user activates a device in the home scenario by using the handheld device, prompt information may be displayed to the user, where the prompt information is used to indicate that the device is successfully activated.

Optionally, when the mobile phone completes positioning of a device in the home scenario, the mobile phone may display the prompt information in a manner such as a pop-up window on a specific application or interface, to notify the user that the device has been positioned and successfully activated.

Optionally, in a process of activating a device, if the mobile phone finds that the device is very close to the mobile phone, the user may be prompted that "the mobile phone is close to the positioned XX device, and it is recommended that the mobile phone or the XX device be removed", or a plurality of possible devices may be displayed. In an actual operation, the user further selects a currently positioned device. This is not limited in embodiments of this application.

Similarly, the foregoing operations are repeated, and the mobile phone may position and activate any other device such as the Huawei vision in the home scenario. Details are not described herein again.

With reference to FIG. 9A to FIG. 9E, a plurality of possible methods are described. In the methods, in a specific application or interface (for example, the Smart life), a control center interface of a handheld device, a device details interface of a device, or the like, a preset operation (such as a touch and hold operation or a slide operation) is performed or a preset switch is tapped, so that another device that has been paired with the handheld device and that is pointed to by the user by using the handheld device in the home scenario enters an active state, to agree that when the handheld device detects a direction pointing gesture of the user, the device may be controlled by the handheld device.

In conclusion, based on the descriptions of FIG. 5A to FIG. 9E, in the current home scenario, at least three positioning components are already arranged, and the user already enables a function of controlling another device by the direction pointing function of the mobile phone, and activates a plurality of devices in the home scenario. It is agreed that when the mobile phone detects a direction pointing gesture of the user, the device pointed to by the user may be controlled by the mobile phone. With reference to FIG. 10 to FIG. 19B, the following describes in detail an implementation process in which a user controls another device in a home scenario by using a direction pointing operation.

Figure 10:
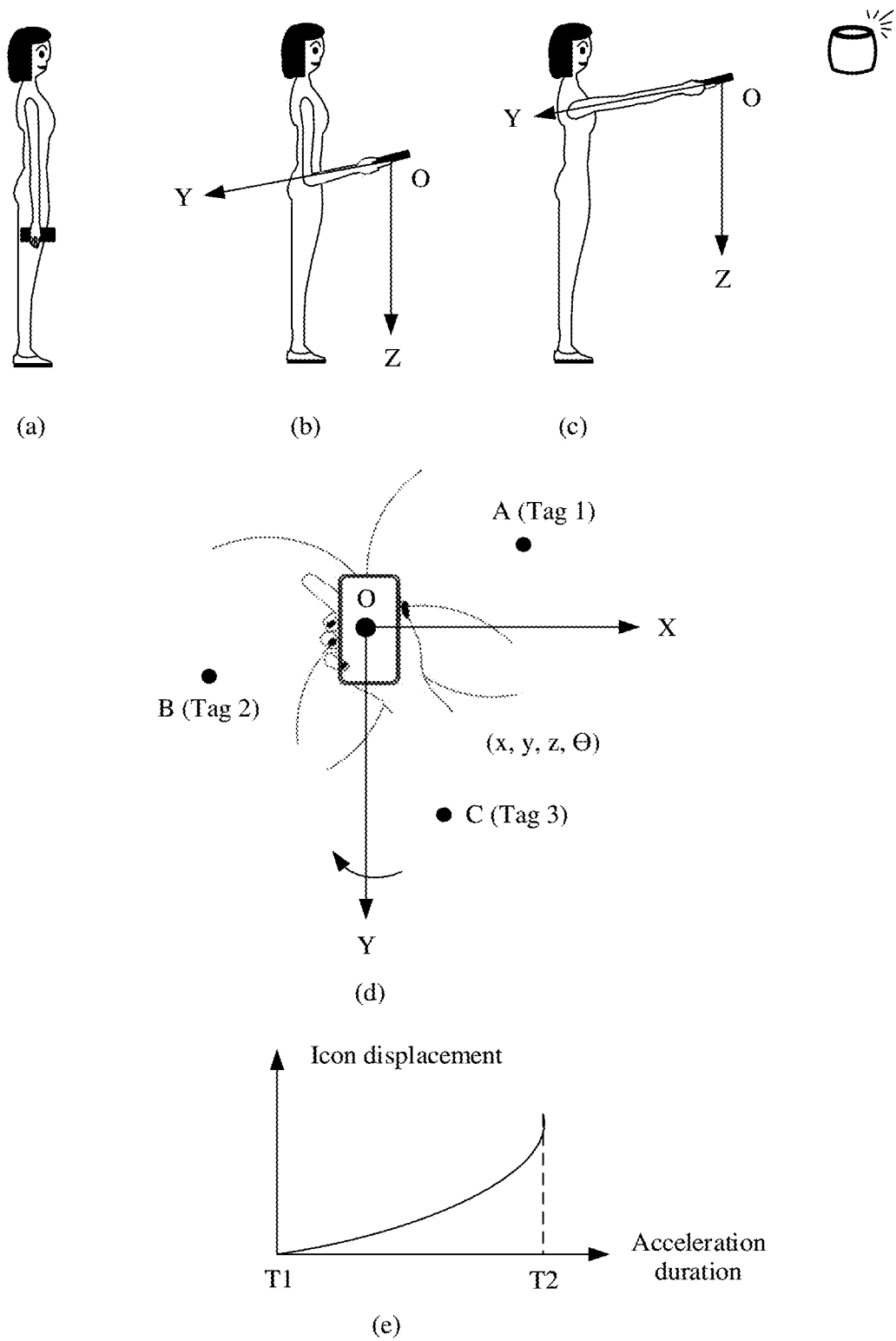
FIG. 10 is a schematic diagram of an example in which a user points to a sound box according to an embodiment of this application.

FIG. 10 is a schematic diagram of an example in which the user points to a sound box according to an embodiment of this application. A process of (a) to (c) in FIG. 10 shows a possible pointing operation process of the user.

For example, the user may hold the mobile phone with a posture shown in (a) in FIG. 10, and finally point to the sound box in the home scenario with a posture shown in (c) in FIG. 10 through the posture shown in (b) in FIG. 10. In addition, the mobile phone may detect that a displacement change process shown in the figure occurs when the user holds the mobile phone, and finally points to a location of the sound box.

In a possible implementation, as a handheld device of the user, the mobile phone may identify the pointing operation of the user by using one or more sensors of the mobile phone, a camera of the mobile phone, or the like. In descriptions of the subsequent embodiments, the pointing operation of the user may be referred to as a "direction pointing operation".

Optionally, the sensor of the mobile phone may include an acceleration sensor, a gyroscope, a magnetometer sensor (magnetometer sensor, M-sensor), an inertial measurement unit (inertial measurement unit, IMU), and the like. The camera of the mobile phone is not limited to a front-facing camera or a rear-facing camera of the mobile phone. Alternatively, the camera of the mobile phone is not limited to one or more of a primary camera, a wide-angle camera, and a long-focus camera of the mobile phone. The pointing operation of the user is identified based on a picture obtained by the camera. This is not limited in embodiments of this application.

In a process of determining that the user performs an action of pointing to the sound box, a coordinate system O-XYZ shown in (d) in FIG. 10 is established. Specifically, in the coordinate system O-XYZ, a center of gravity of the mobile phone is used as a coordinate origin O, a straight line on which a long frame of the mobile phone that passes through the coordinate origin O is located is a Y axis, a straight line on which a short frame of the mobile phone is located is an X axis, and a straight line perpendicular to the ground is a Z axis. In this case, when the user performs the pointing operation, a movement process of the coordinate system O-XYZ may be shown in (b) and (c) in FIG. 10.

For example, in an operation process of pointing to the sound box by the user, the following action change process may be included:

(1) A start location of the user may be a location in which the user holds the mobile phone with a hand in a natural stretching state shown in (a) in FIG. 10, or a location in which the user holds the mobile phone with a hand naturally putting in front of the chest as shown in (b) in FIG. 10.

In other words, the pointing operation performed by the user may be: from (a) directly to (c), including different tracks; or from (b) directly to (c); or a track through (a) to (b) to (c). This is not limited in this embodiment of this application.

(2) An arm of the user moves forward, the mobile phone accelerates along a straight line on which the Y axis is located, and the acceleration sensor of the mobile phone detects that an acceleration of the mobile phone along the straight line on which the Y axis is located is greater than or equal to a first preset threshold $a_A$. A change curve of the acceleration may be shown in (e) in FIG. 10. At a moment T2, the acceleration of the mobile phone along the straight line on which the Y axis is located is greater than or equal to the first preset threshold $a_A$.

In addition, it is detected that accelerations of the mobile phone on a straight line on which the X axis is located and on a straight line on which the Z axis is located are less than or equal to a second preset threshold $a_B$.

Optionally, accelerations of the mobile phone in different directions may be detected by the IMU of the mobile phone. Alternatively, accelerations of the mobile phone in different directions may be detected based on a picture collected by the front-facing camera of the mobile phone and an always-on optical flow algorithm. Specifically, the front-facing camera of the mobile phone is used to obtain adjacent frames in the picture, where a two-dimensional vector field of a feature point in the adjacent frame in a translation process indicates a velocity field of a three-dimensional motion of an object point by using a two-dimensional image. That is, an image change formed by motion of the object point within a specific time interval may be reflected based on the velocity field of the three-dimensional motion of the object point, to determine a motion direction and a motion rate of the object point on the image, and further determine whether a motion track of the mobile phone is a straight line or a quasi-linear line.

In a possible implementation, when the handheld device detects the motion of the mobile phone along the straight line on which the Y axis is located, and a value of the acceleration is greater than or equal to the first preset threshold $a_A$, as shown in (e) in FIG. 10, first prompt information may appear on the handheld device at a moment T2, to guide the user to continue acceleration along a direction of the Y axis.

(3) The IMU of the mobile phone detects that an acceleration time of the acceleration of the mobile phone along the straight line on which the Y axis is located reaches first preset duration $t_a$.

In a possible implementation, when the handheld device detects the motion of the mobile phone along the straight line on which the Y axis is located, the value of the acceleration is greater than or equal to the first preset threshold $a_A$, and the acceleration time of the acceleration reaches the first preset duration $t_a$, second prompt information may appear on the handheld device, to prompt the user that the handheld device has enabled a wireless positioning function.

(4) It is detected that the mobile phone is far away from the user's body.

Optionally, the mobile phone may detect, by using the magnetometer sensor, that the mobile phone is far away from the user's body or close to the user's body. Because a human body is a magnetic field, when the mobile phone is far away from or close to the human body, magnetic field strength detected by the magnetometer sensor changes significantly. Therefore, it may be determined, based on the magnetic field strength detected by the magnetometer sensor, that the mobile phone is in a state of being far away from the user's body or close to the user's body.

Alternatively, the mobile phone may detect, by using the image obtained by the camera, that the mobile phone is far away from the user's body or far away from the user's body. Specifically, the camera of the mobile phone may obtain an image in real time, and perform facial feature detection based on the obtained image. Within a specific time period, the mobile phone first detects face information in the obtained image, and determines that the mobile phone is in a state of being close to the user's body; and then, detects no face information in the obtained image, and determines that the mobile phone is in a state of being far away from the user's body. When the foregoing change process occurs, the mobile phone may be determined to gradually change from being close to the user's body to being far away from the user's body.

(5) The IMU of the mobile phone detects that when the acceleration of the mobile phone stops, a time for which the mobile phone hovers reaches second preset duration $t_{dwell}$.

When the mobile phone detects the foregoing action change processes (1), (2), (3), (4), and (5), it may be determined that the current user performs the pointing operation, and the mobile phone is triggered to determine, by using a wireless positioning technology, a location of a device pointed to by the user. In this process, with reference to data collected by a plurality of sensors, it may be more accurately determined that the user performs the pointing operation. It should be understood that when the mobile phone detects one or more of the foregoing action change processes (1), (2), (3), (4), and (5), the mobile phone may be triggered to determine, by using the wireless positioning technology, the location of the device pointed to by the user. This is not limited in this embodiment of this application.

In another possible implementation, to accurately identify the pointing operation of the user and reduce an accidental touch rate, in this embodiment of this application, the handheld device may be triggered to detect the pointing operation of the user only in a preset scenario. The preset scenario includes: The handheld device is in a screen-on state; and/or the handheld device is in an unlocked state; and/or the handheld device displays a main interface; and/or it is detected that there is a specific angle between a direction of the normal perpendicular to the display of the handheld device and the ground. That there is the specific angle between the direction of the normal of the display of the handheld device and the ground may be understood as that the direction of the normal of the display is not perpendicular to the ground.

In still another possible implementation, when the IMU of the mobile phone detects that the mobile phone stops acceleration, and the duration in which the mobile phone hovers reaches the second preset duration $t_{dwell}$, third prompt information may appear on the handheld device. The third prompt information is used to prompt the user of a target device that is pointed to, and when at least two devices are detected in a direction pointed to by the user, the third prompt information may be information about the at least two devices displayed by the user. The user may select the target device from the at least two devices.

Alternatively, optionally, in this case, fourth prompt information may also appear on the pointed device, to prompt a correct pointing operation that the user points to the device. For example, if the user points to a smart screen by using the mobile phone, because the user watches the smart screen in a pointing process, a pop-up window may appear on the smart screen. The pop-up window includes the fourth prompt information, used to indicate a correct pointing operation required to be performed by the user to control the smart screen.

In the foregoing, guidance and feedback of the pointing operation are performed on the handheld device and the pointed target device in visual and non-visual prompt manners, to improve a success rate of the pointing operation and improve user experience.

In the foregoing embodiment, a possible case in which prompt information is displayed on a handheld device or a target device is described. It should be understood that, in a process in which the user points to the target device, a hand-eye separation phenomenon, namely, a case in which eyes cannot see an interface of the mobile phone, occurs. Therefore, a prompt manner of any one of the foregoing prompt information (the first prompt information, second prompt information, third prompt information, fourth prompt information, and the like) is not limited in this embodiment of this application. For example, the prompt manner may be a visual or non-visual prompt that can be identified by the user and has a difference, for example, a plurality of prompt manners such as a different interface prompt, a vibration, an indicator, or a voice.

Optionally, a prompt effect of the prompt information on the handheld device may be matched with a direction of a direction pointing action of the user, an acceleration of the handheld device, and the like.

By setting the foregoing preset scenario, it is specified that the mobile phone may identify whether the user performs the pointing operation only when one preset scenario is met or a plurality of scenarios are met at the same time. For example, the mobile phone identifies whether the user performs the pointing operation only when the mobile phone is in the screen-on state and/or the unlocked state. Alternatively, it is specified that the mobile phone identifies whether the user performs the pointing operation only when the mobile phone displays the main interface. Alternatively, it is specified that the mobile phone identifies whether the user performs the pointing operation only when the mobile phone is in the screen-on state and the unlocked state and displays the main interface of the mobile phone. Setting of the preset scenario can improve accuracy of identifying the pointing operation of the user, and avoid detection in a possible scenario in which the user only hands over the mobile phone to another person, thereby reducing an accidental touch rate and improving user experience.

In another possible implementation, when the mobile phone determines that the user currently performs the pointing operation on the sound box, when the user performs the operation shown in (c) in FIG. 10 and the time in which the mobile phone hovers reaches the second preset duration $t_{dwell}$, the user may press a physical button, or perform a preset screen gesture, an air gesture, or the like, to send a signal to the mobile phone to determine a current detection result of the mobile phone.

For example, when the operation shown in (c) in FIG. 10 and the time in which the mobile phone hovers reaches second preset duration $t_{dwell}$, the user presses a power button or a volume button. After receiving the pressing operation of the user, the mobile phone may determine that the currently detected operation is the pointing operation of the user. It should be understood that, in this embodiment of this application, a quantity of times that the user presses the physical button, a type of physical button to be pressed, a preset screen gesture, an air gesture, or the like is not limited.

Through the foregoing process, accuracy of identifying the pointing operation of the user by the mobile phone may be improved. The process may be understood as: The user sends confirmation information to the mobile phone by using the foregoing pressing operation or the preset gesture, and confirms that an action currently detected by the mobile phone is an operation of pointing to the sound box by the user, so that a process of positioning the sound box by the mobile phone may be more accurately triggered. On the contrary, if the mobile phone detects that the user performs the operation shown in (c) in FIG. 10 and the time in which the mobile phone hovers reaches the second preset duration $t_{dwell}$, the user does not press the physical button or perform the preset gesture, and the mobile phone does not receive a confirmation signal of the user. In this way, the process of positioning the sound box may not be triggered.

Based on the foregoing steps, after the mobile phone has identified the current operation of pointing to the sound box by the user, the mobile phone further enables the wireless positioning function of the mobile phone, searches for a peripheral device of the mobile phone, determines a location of the peripheral device, and a distance between the peripheral device and the mobile phone, and determines whether a device exists in a pointing direction of the user. For example, as shown in (c) in FIG. 10, when the mobile phone detects the pointing operation of the user shown in the figure, the wireless positioning technology of the mobile phone may be triggered.

In a possible implementation, when a positioning structure is disposed on the target device pointed to by the user, the mobile phone may perform wireless positioning based on a bidirectional connection between the mobile phone and the target device. For example, the target device pointed to by the user may be disposed with one or more of a Bluetooth positioning chip, a UWB positioning chip, a GPS positioning structure, a Wi-Fi positioning structure, a laser sensor with a positioning function, an infrared sensor, and the like, so that the target device may be positioned based on the bidirectional connection between the target device and the mobile phone.

For example, if the device such as the smart screen, the air conditioner, or the sound box has a UWB chip, positioning of any device in the home scenario may be implemented through interaction between the mobile phone and the device such as the smart screen, the air conditioner, or the sound box.

It should be understood that both the mobile phone and the pointed target device have hardware that can transmit or receive a wireless positioning signal, and a distance and an angle between the mobile phone and the pointed target device are calculated and determined based on the wireless positioning signal transmitted or received between the mobile phone and the pointed target device.

In another possible implementation, when three positioning components are arranged in the home scenario, the mobile phone may determine the distance and a direction between the mobile phone and the pointed target device with reference to a three-point positioning capability of the three positioning components.

For example, according to the method described in FIG. 6, after the three positioning components are disposed in the home scenario, connections between the handheld device and the three positioning components are established according to the method shown in FIG. 7A to FIG. 7F, so that the handheld device may interact with the three positioning components. Further, according to the three-point positioning method described in FIG. 8, a location of each device in the home scenario and a distance between the handheld device and each device are determined, and the like. Details are not described herein again.

In conclusion, the mobile phone may determine a distance and an angle between the mobile phone and a pointed target device by performing triangulation between a plurality of devices. It should be understood that the mobile phone can transmit or receive a wireless positioning signal, provided that three or more fixed positioning components that can transmit or receive a wireless positioning signal are included in space of the home scenario, for example, a Tag 1, a Tag 2, and a Tag 3 shown in (d) in FIG. 10. Further, the mobile phone calculates absolute positioning (x, y, z, θ) of the mobile phone by using a time difference of arrival (time difference of arrival, TDOA). That is, a location of each device in the home scenario and a distance between the handheld device and each device may be determined by using the three-point positioning method.

Optionally, when there are enough positioning components that can transmit or receive a wireless positioning signal in the home scenario, positioning of a mobile phone with a six degrees of freedom (six degrees of freedom, 6DoF) may be determined. Details are not described herein again.

It should be understood that the positioning component may exist independently, or may be disposed on another device in the home scenario, and is a component of a device such as a smart screen, an air conditioner, or a sound box. This is not limited in this embodiment of this application.

According to the foregoing process, the mobile phone has identified the current operation of pointing to the sound box of the user, further enables the wireless positioning function of the mobile phone, and determines a location of the sound box pointed to by the user. After responding to the pointing operation of the user, the mobile phone may control the sound box pointed to by the user.

Figure 11:
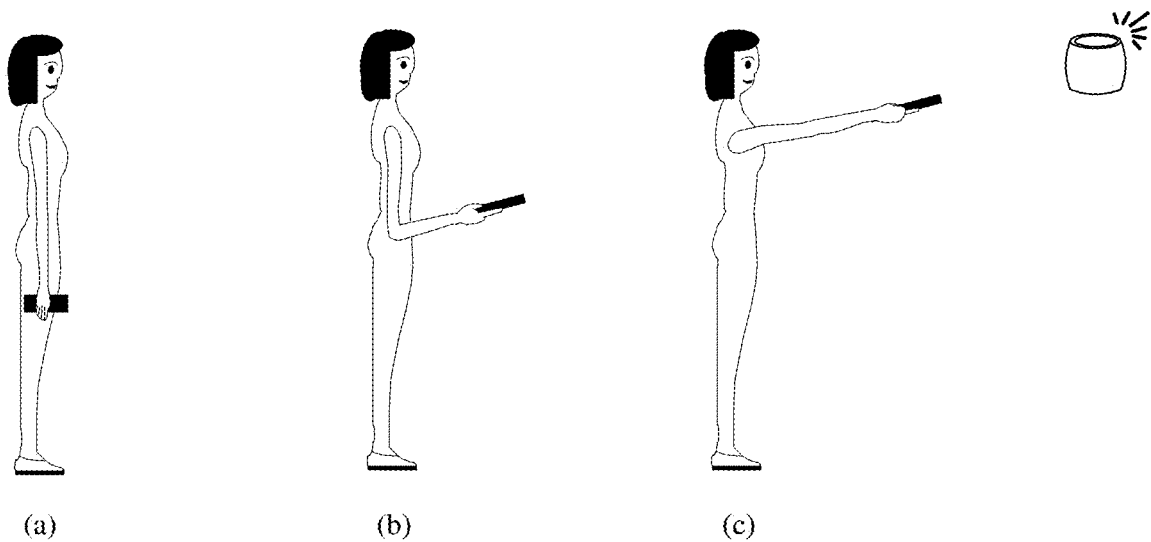
FIG. 11 is a schematic diagram of an example in which a user points to a sound box according to an embodiment of this application.
Figure 12A:
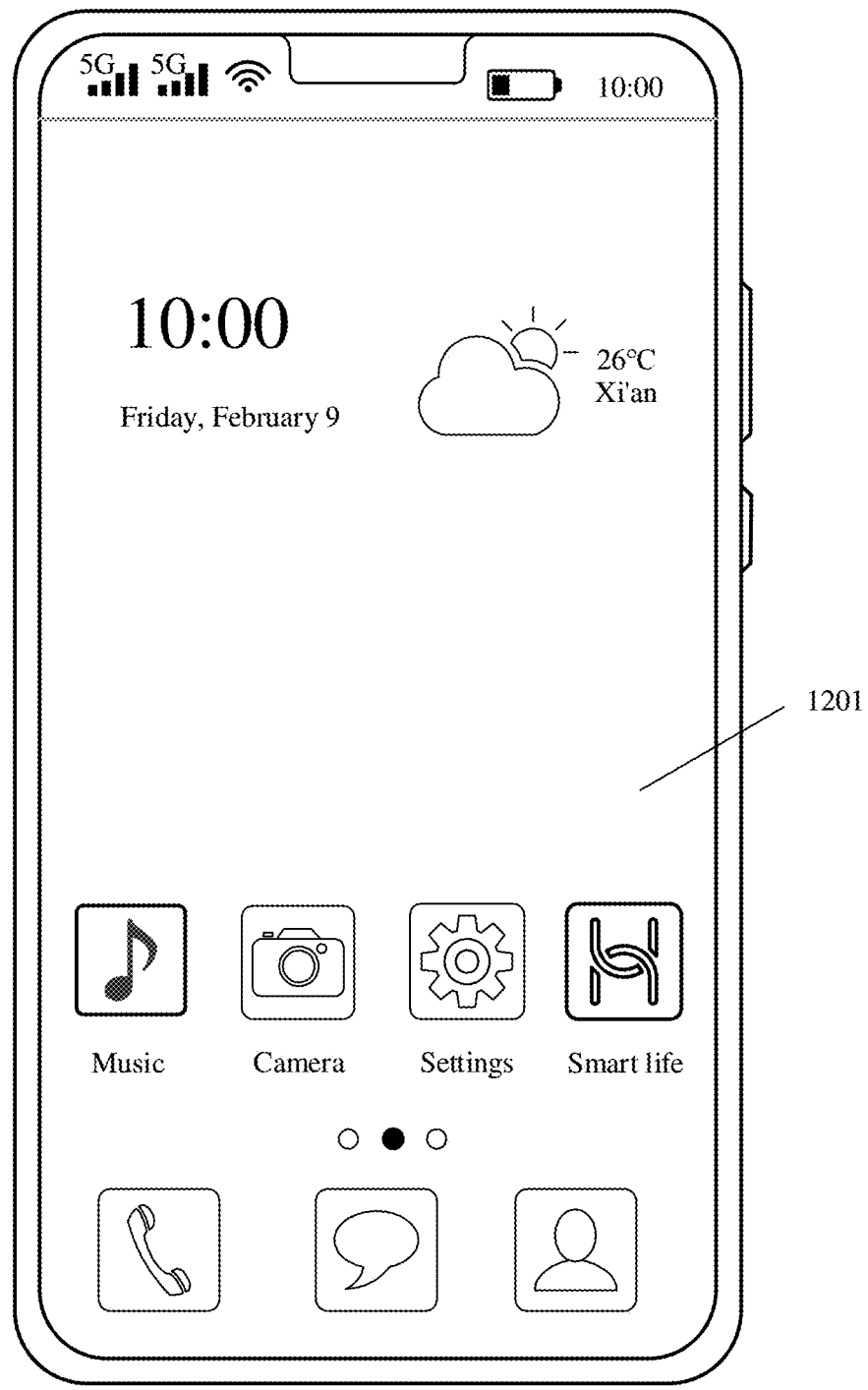
FIG. 12A and FIG. 12B each are a schematic diagram of an example in which a user controls a sound box by using a handheld device according to an embodiment of this application.
Figure 12B:
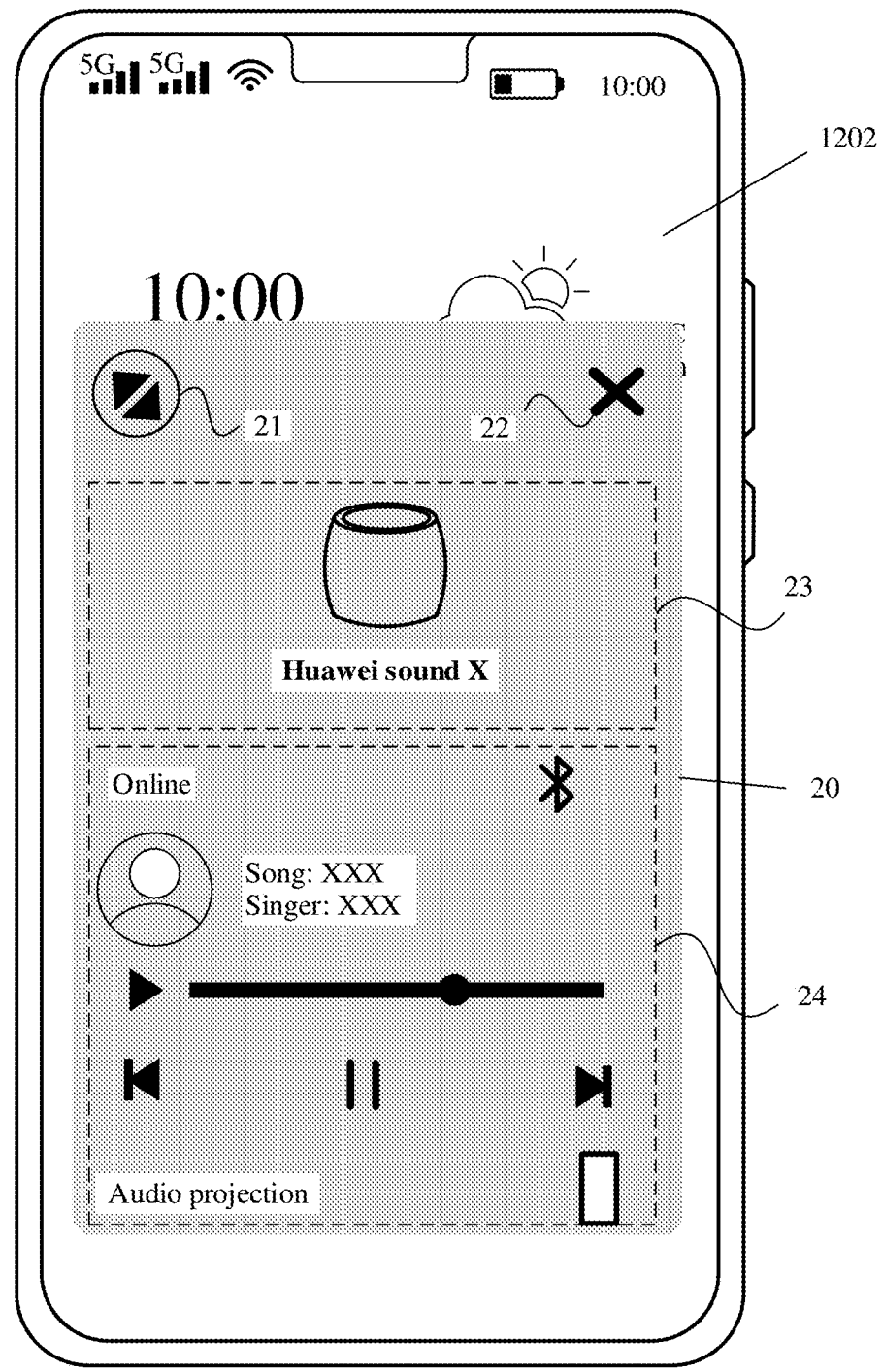

FIG. 11 is a schematic diagram of an example in which a user points to a sound box according to an embodiment of this application. FIG. 12A and FIG. 12B each are a schematic diagram of an example in which a user controls a sound box by using a handheld device according to an embodiment of this application.

For example, a process in (a), (b), and (c) in FIG. 11 shows a possible pointing operation process of the user. Specifically, FIG. 12A shows a main interface 1201 of the mobile phone. When the mobile phone is in a screen-on state and displays the main interface of the mobile phone, if the user uses the mobile phone to perform the foregoing operation of pointing to the sound box, the mobile phone may display an interface 1202 shown in FIG. 12B. In the interface 1202, a sound box control window 20 is automatically popped up, and the sound box control window 20 may be suspended on the main interface of the mobile phone.

Optionally, the sound box control window 20 may include a window zooming option 21, a window closing option 22, a sound box icon and name display region 23, and a song playback control region 24. The user may tap the window zooming option 21 to zoom in the sound box control window 20 for full screen display or zoom out for floating display. Buttons such as a singer, a singer photo, an album picture, a song name, a play switch, a play progress bar, a previous song, and a next song may be displayed on the song playback control region 24. The user may tap any button according to a requirement of the user to control playing of the sound box. The song playback control region 24 further includes an audio projection button, configured to control playing of music of the mobile phone by using the sound box. Details are not described herein.

It should be understood that the sound box control window 20 may include the control options, menus, buttons, or other function regions listed above, or the sound box control window 20 may further include other display content that is not listed above, for example, a region for displaying lyrics. Different styles and content may be displayed on the sound box control window 20 based on a type and a screen size of the handheld device. Details are not described herein again.

Figure 13:
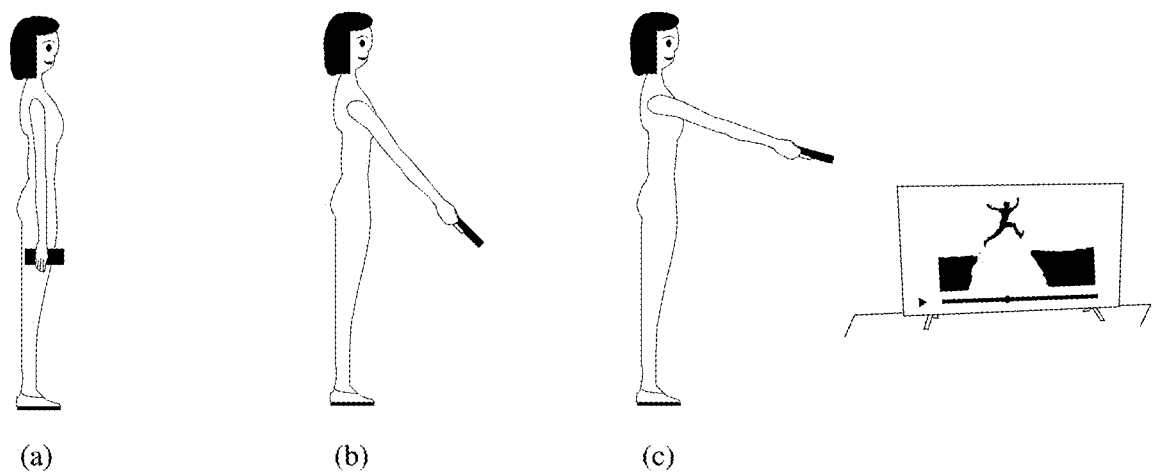
FIG. 13 is a schematic diagram of an example in which a user points to a smart screen according to an embodiment of this application.
Figure 14A:
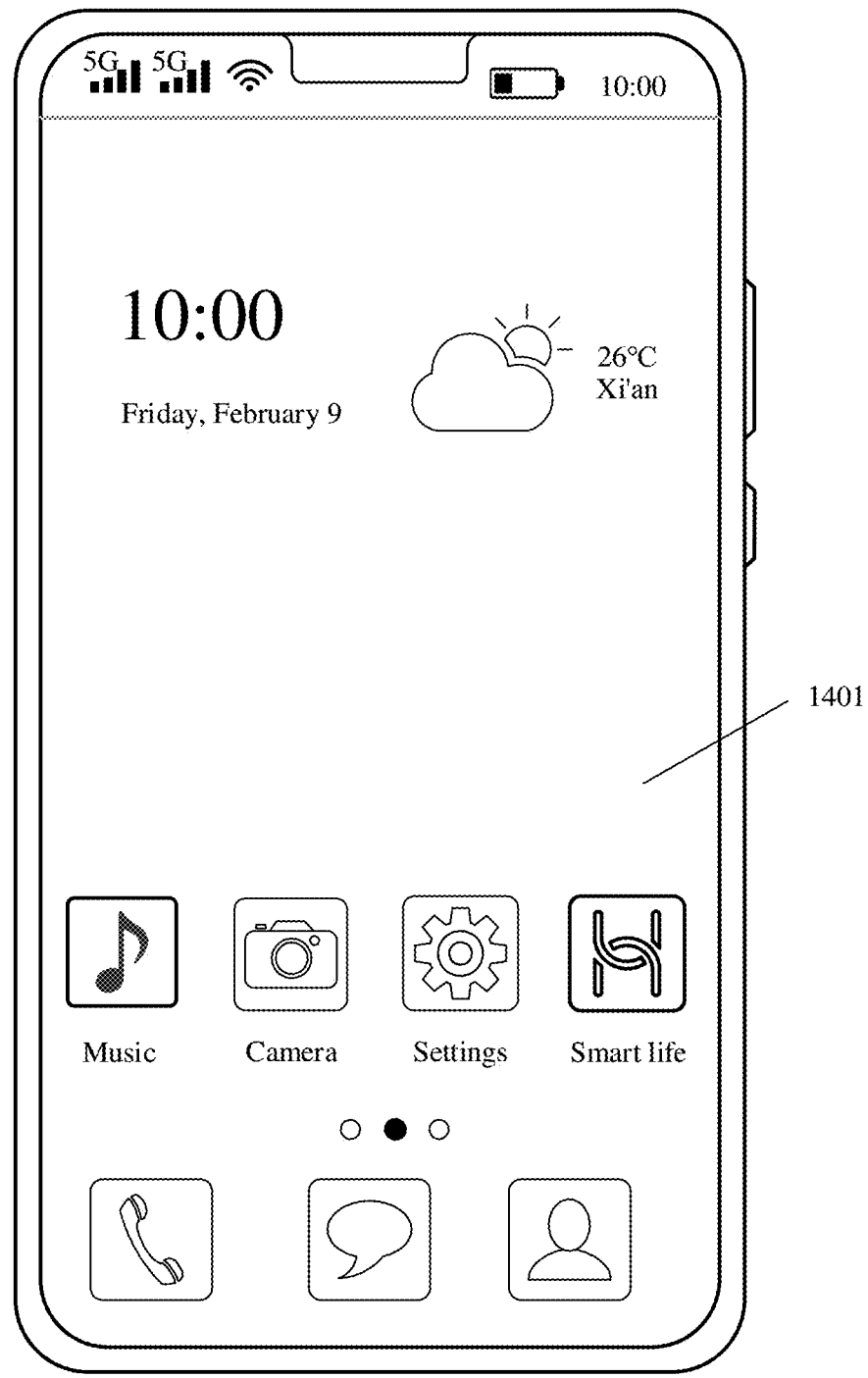
FIG. 14A and FIG. 14B each are a schematic diagram of an example in which a user controls a smart screen by using a handheld device according to an embodiment of this application.
Figure 14B:
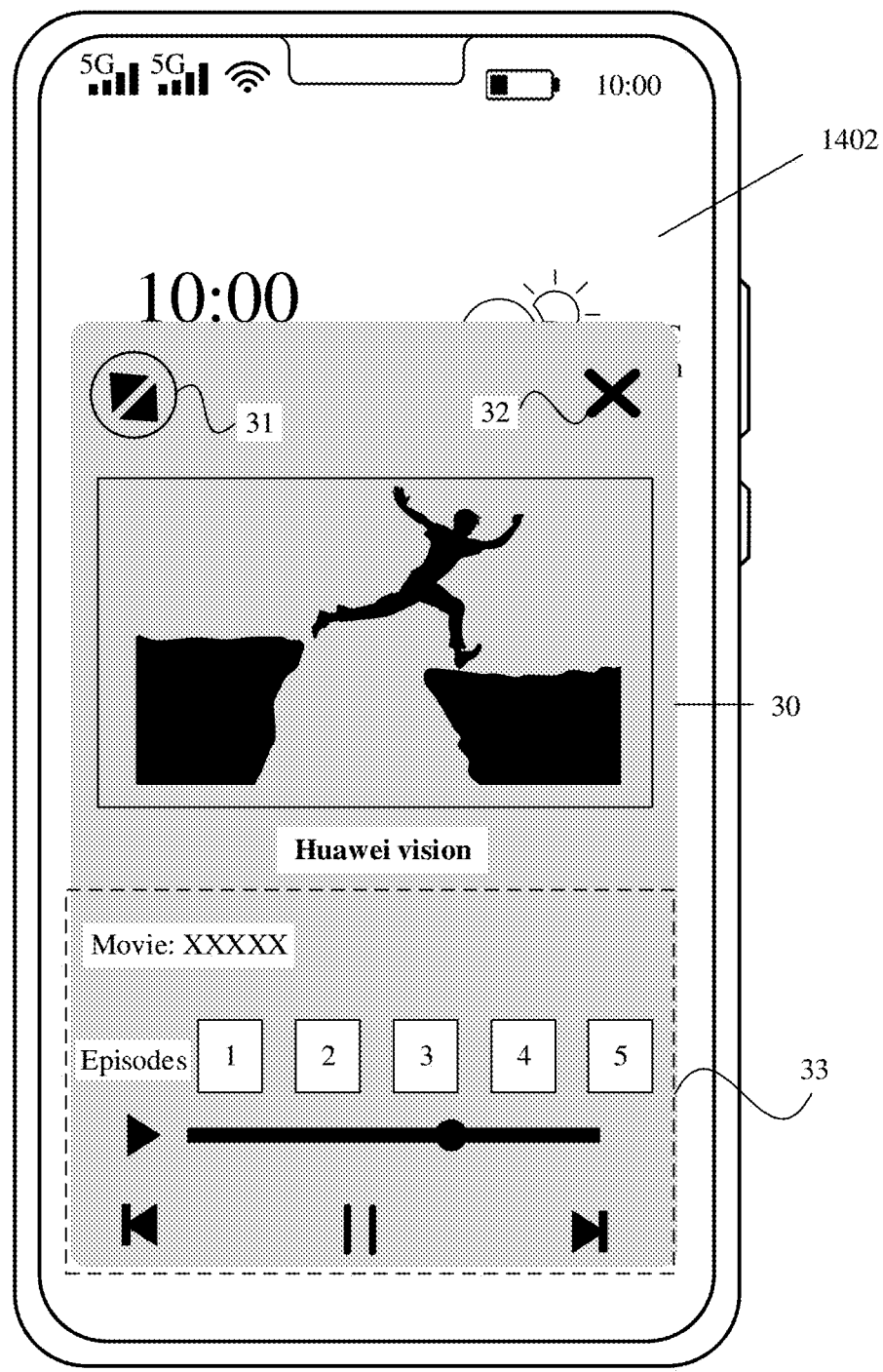

FIG. 13 is a schematic diagram of an example in which a user points to a smart screen according to an embodiment of this application. FIG. 14A and FIG. 14B each are a schematic diagram of an example in which a user controls a smart screen by using a handheld device according to an embodiment of this application.

For example, a process in (a), (b), and (c) in FIG. 13 shows a possible pointing operation process of the user. Specifically, FIG. 14A shows a main interface 1401 of the mobile phone. When the mobile phone is in a screen-on state and displays the main interface of the mobile phone, if the user uses the mobile phone to perform the foregoing operation of pointing to the smart screen, the mobile phone may display an interface 1402 shown in FIG. 14B. In the interface 1402, a smart screen control window 30 is automatically popped up, and the smart screen control window 30 may be suspended on the main interface of the mobile phone.

Optionally, in this embodiment, a track of the user pointing to the smart screen in FIG. 13 may be different from or the same as the track of the user pointing to the sound box in FIG. 11. This is not limited in this embodiment of this application.

Optionally, the smart screen control window 30 may include a window zooming option 31, a window closing option 32, a smart screen icon and name display region, and a smart screen playback control region 33. The user may tap the window zooming option 31 to zoom in the smart screen control window 30 for full screen display or zoom out for floating display. Buttons such as a movie name, an episode selection list, a playback switch, a playback progress bar, a previous episode, and a next episode may be displayed on the smart screen playback control region 33. The user may tap any button according to a requirement of the user to control playing of a movie on the smart screen.

It should be understood that the smart screen control window 30 may include the control options, menus, buttons, or other function regions listed above, or the smart screen control window 30 may further include other display content that is not listed above. This is not limited in this embodiment of this application. Different styles and content may be displayed on the smart screen control window 3o based on a type and a screen size of the handheld device. Details are not described herein again.

Figure 15:
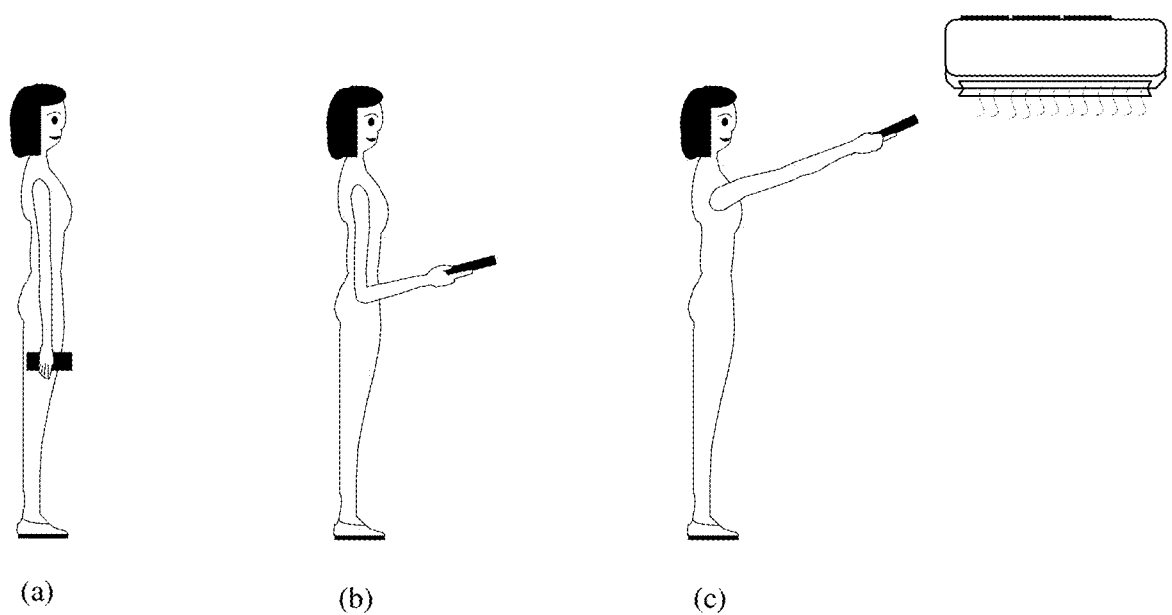
FIG. 15 is a schematic diagram of an example in which a user points to an air conditioner according to an embodiment of this application.
Figure 16A:
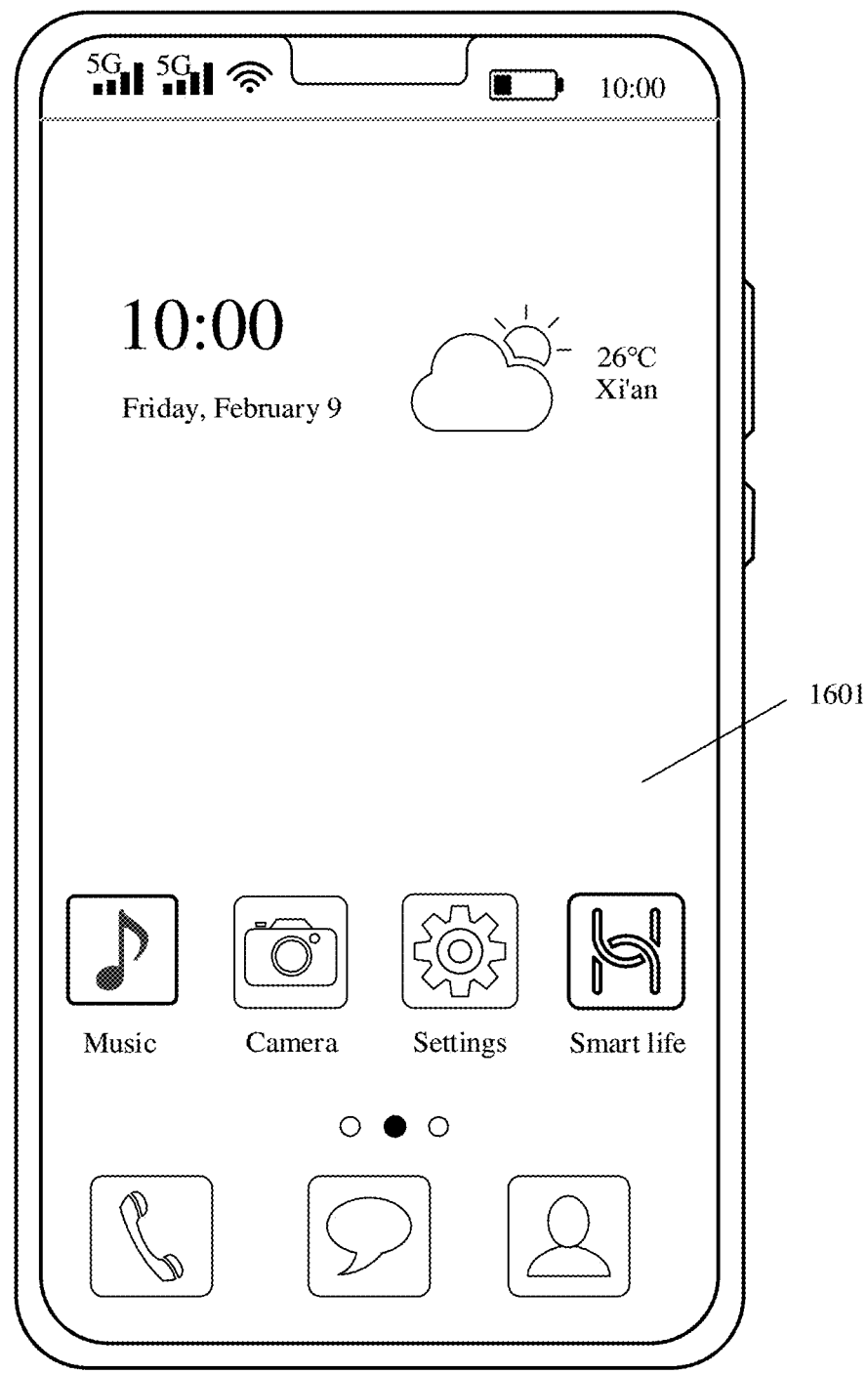
FIG. 16A and FIG. 16B each are a schematic diagram of an example in which a user controls an air conditioner by using a handheld device according to an embodiment of this application.
Figure 16B:
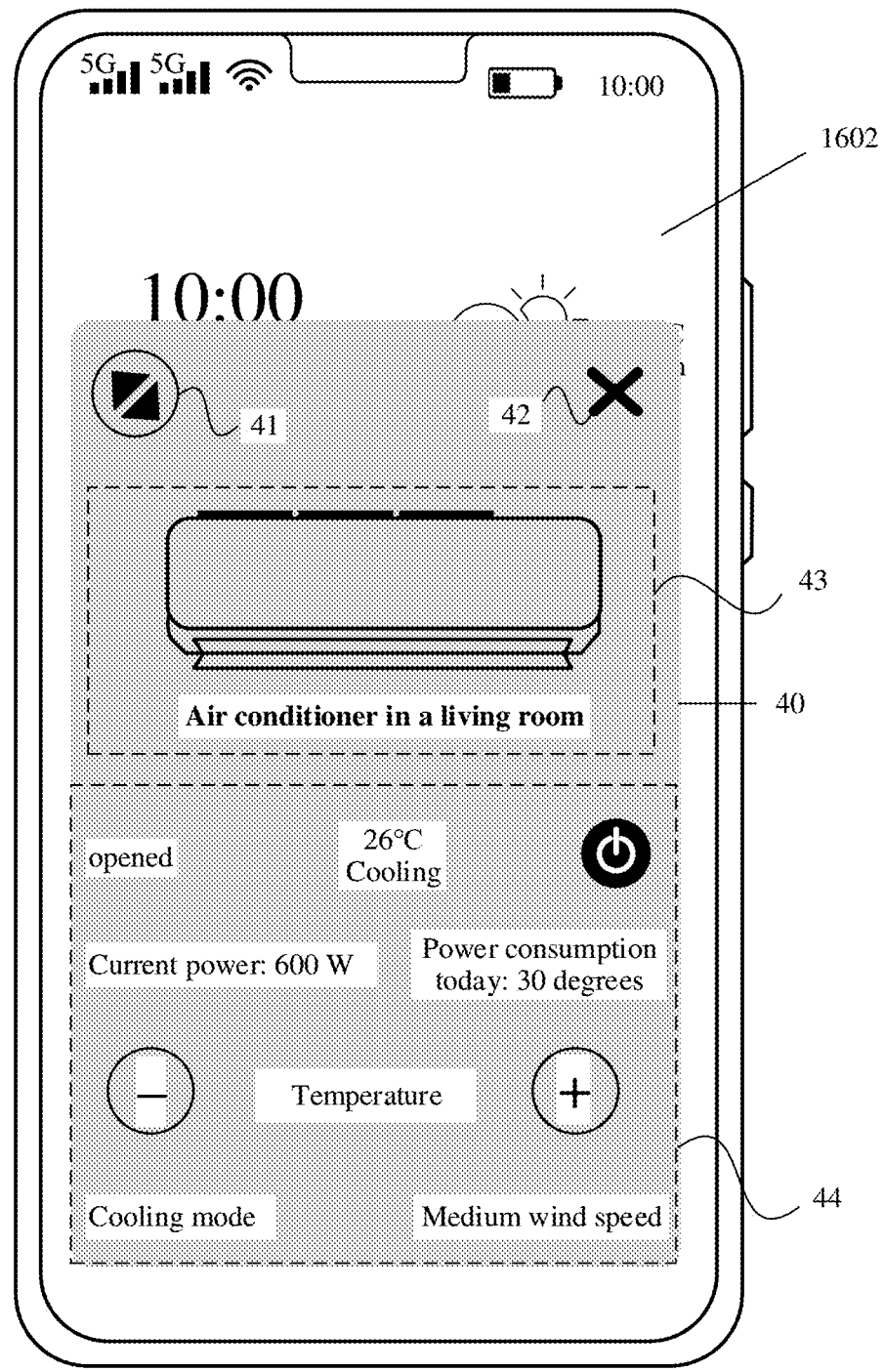

FIG. 15 is a schematic diagram of an example in which a user points to an air conditioner according to an embodiment of this application. FIG. 16A and FIG. 16B each are a schematic diagram of an example in which a user controls an air conditioner by using a handheld device according to an embodiment of this application.

For example, a process in (a), (b), and (c) in FIG. 15 shows a possible pointing operation process of the user. Specifically, FIG. 16A shows a main interface 1601 of the mobile phone. When the mobile phone is in a screen-on state and displays the main interface of the mobile phone, if the user uses the mobile phone to perform the foregoing operation of pointing to the air conditioner, the mobile phone may display an interface 1602 shown in FIG. 16B. In the interface 1602, an air conditioner control window 40 is automatically popped up, and the air conditioner control window 40 may be suspended on the main interface of the mobile phone.

Optionally, the air conditioner control window 40 may include a window zooming option 41, a window closing option 42, an air conditioner icon and name display region 43, and an air conditioner control region 44. The user may tap the window zooming option 41 to zoom in the air conditioner control window 40 for full screen display or zoom out for floating display. Whether the air conditioner is opened, a working mode such as cooling, an indoor temperature, a working power, a temperature increase/decrease button, a wind speed setting button, and the like may be displayed on the air conditioner control region 44. The user may tap any button according to a requirement of the user to control the air conditioner to be started, to set a temperature, to set a working mode, and the like.

It should be understood that the air conditioner control window 4o may include the control options, menus, buttons, or other function regions listed above, or the air conditioner control window 40 may further include other display content that is not listed above. This is not limited in this embodiment of this application. Different styles and content may be displayed on the air conditioner control window 40 based on a type and a screen size of the handheld device. Details are not described herein again.

According to the foregoing method, based on the identification function and the positioning function of the handheld device, when the handheld device detects an operation that the user points to the target device, a window for controlling the target device may be displayed on the handheld device, and the user may control the target device through the window. The method is easy to operate, and reduces steps of operating the target device by the user. In addition, the method selects the target device based on the pointing operation of the user, and may help the user select a distant device. In this way, a distance limitation is reduced, and user experience is improved.

In another possible implementation, in an operation process in which the user points to the target device by using the handheld device, prompt information may be displayed on the handheld device. The prompt information is used to guide the user to perform a correct pointing operation, so as to control the target device by using the pointing operation in this embodiment of this application.

Optionally, the prompt information may be displayed through a window displayed on the handheld device, or may be displayed on the handheld device in a form of an icon, or may guide the user to perform the correct pointing operation in another visual guidance manner, so as to control the target device by using the pointing operation in this embodiment of this application.

FIG. 17A to FIG. 17G each are a schematic diagram of another example in which a user controls a sound box by using a handheld device according to an embodiment of this application.

Figure 17A:
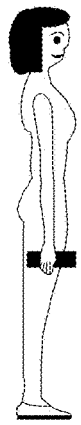
FIG. 17A to FIG. 17G each are a schematic diagram of another example in which a user controls a sound box by using a handheld device according to an embodiment of this application.
Figure 17B:
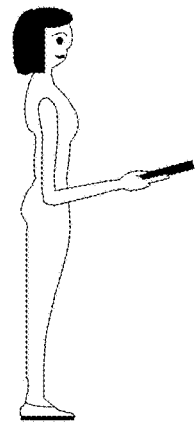
Figure 17C:
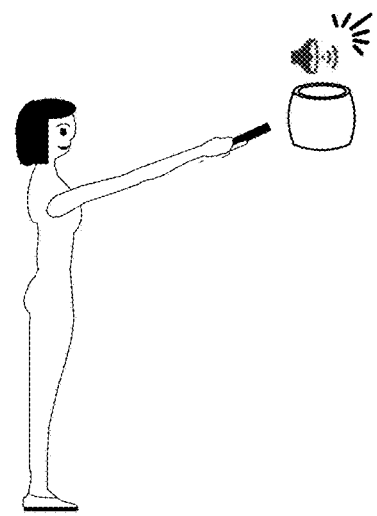
Figure 17D:
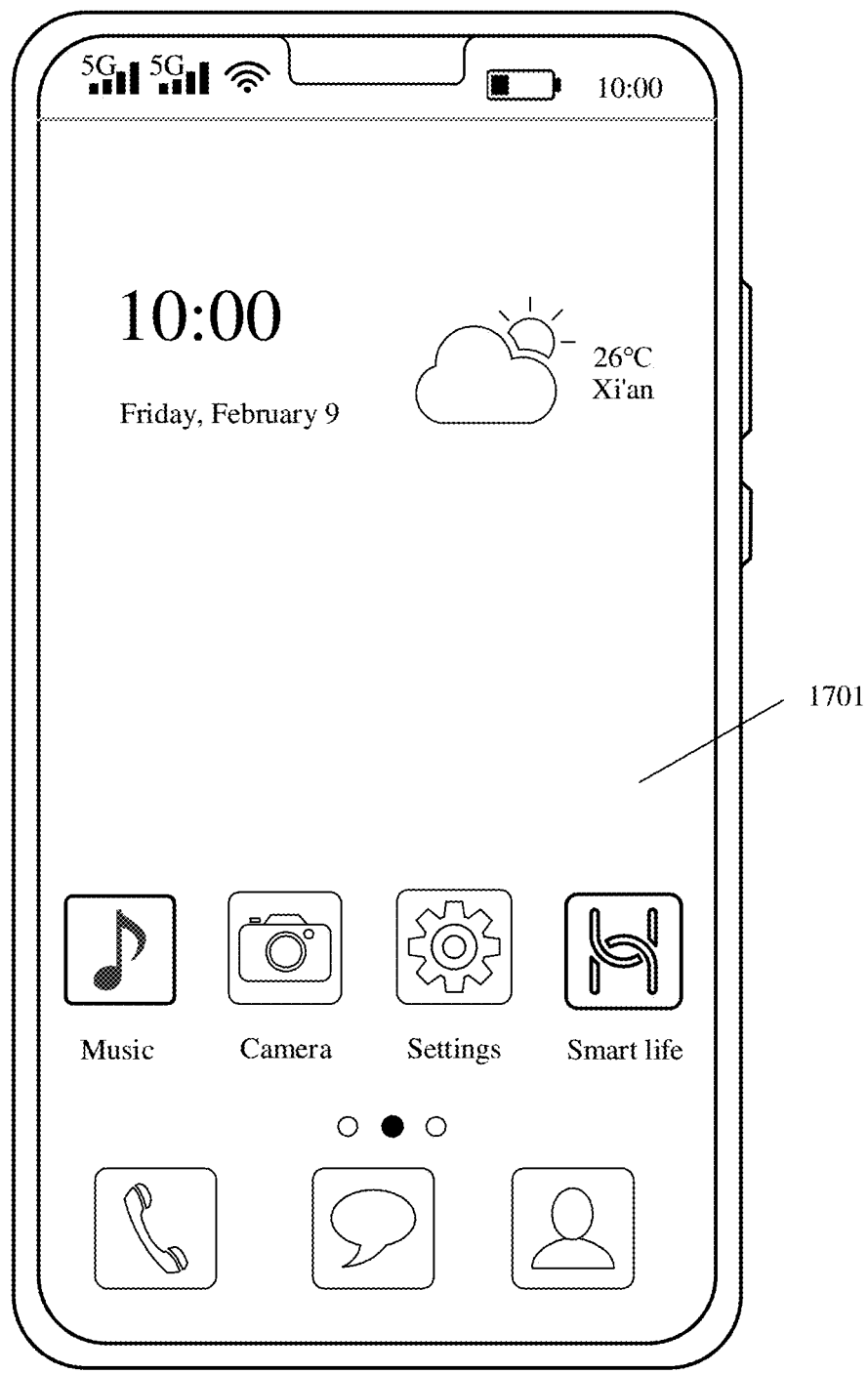

For example, a process in FIG. 17A, FIG. 17B, and FIG. 17C shows a possible pointing operation process of the user. Specifically, FIG. 17D shows a main interface 1701 of the mobile phone. When the mobile phone is in a screen-on state and displays the main interface 1701 of the mobile phone, if the user uses the mobile phone to perform operations shown in FIG. 17A and FIG. 17B, the mobile phone does not detect an operation of pointing to the sound box, hovering, or the like shown in FIG. 17C in a specific time period, and an interface 1702 shown in FIG. 17E may be displayed on the main interface of the mobile phone. In the interface 1702, a guide icon 50 is automatically displayed, and the guide icon 5o may be suspended on the main interface of the mobile phone in a form of an arrow.

Figure 17E:
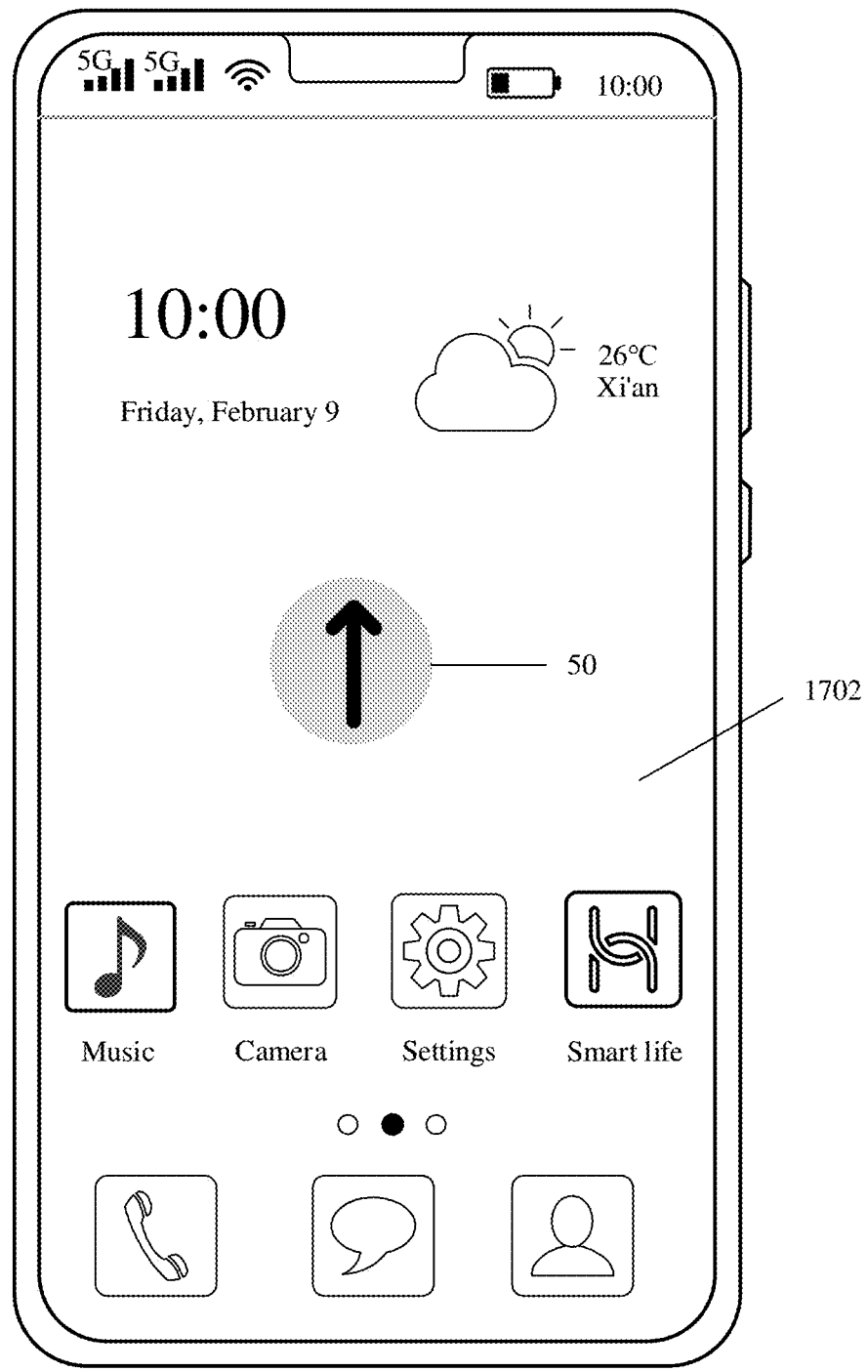
Figure 17F:
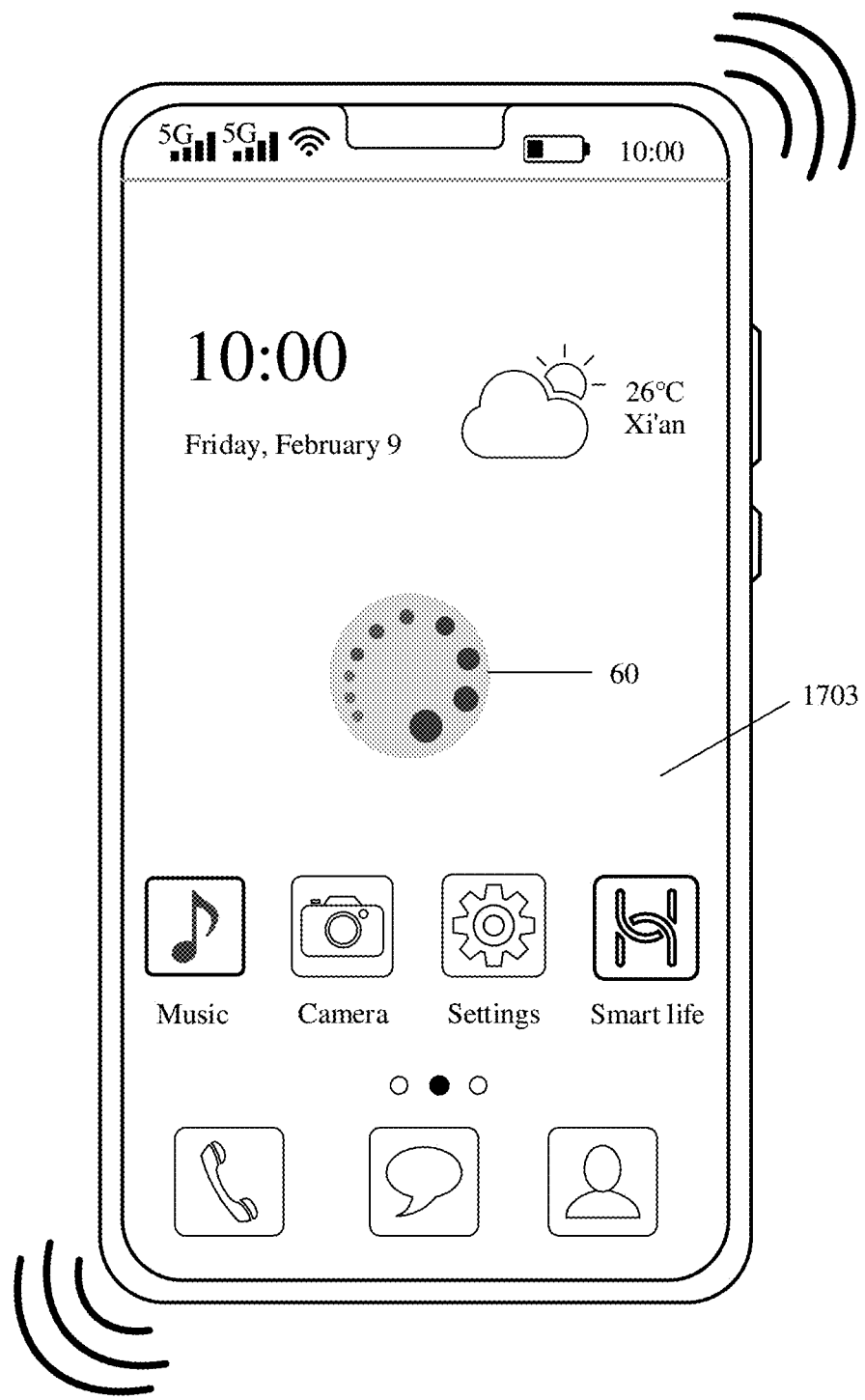

When the user continues to perform, based on the guide icon 50, the pointing operation shown in FIG. 17C, an interface of the mobile phone may be displayed as an interface 1703 shown in FIG. 17F. An icon 60 is displayed on the interface 1703, and is used to indicate the current mobile phone to detect the pointing operation of the user again. When the operation of pointing to the sound box by the user as shown in FIG. 17C is detected, the sound box control window 20 may be displayed on the handheld device. Details are not described herein again.

In still another possible implementation, in an operation process in which the user uses the handheld device to point to the target device, in addition to the guide icon shown in FIG. 17E, the user may be guided to perform the correct pointing operation in a non-visual manner such as a sound feedback or a vibration feedback, so as to control the target device by using the pointing operation in this embodiment of this application.

Optionally, the sound feedback may be sent by the handheld device, or may be sent by the pointed target device. For example, the mobile phone prompts the user in a voice manner "please move rightward".

Optionally, the vibration feedback may be sent by the handheld device, to be more quickly and more sensitively perceived by the user. It should be understood that this is not limited in this embodiment of this application.

Alternatively, after the user successfully points to the target device by using the handheld device, a feedback may be further provided on the handheld device or the pointed target device. The feedback is used to notify the user that the pointing operation succeeds. The feedback information may include one or more of a visual feedback, a sound feedback, a vibration feedback, and the like. For example, as shown in FIG. 17F, after the user successfully points to the sound box by using the mobile phone, the mobile phone may vibrate to notify the user that the pointing operation is completed.

Figure 17G:
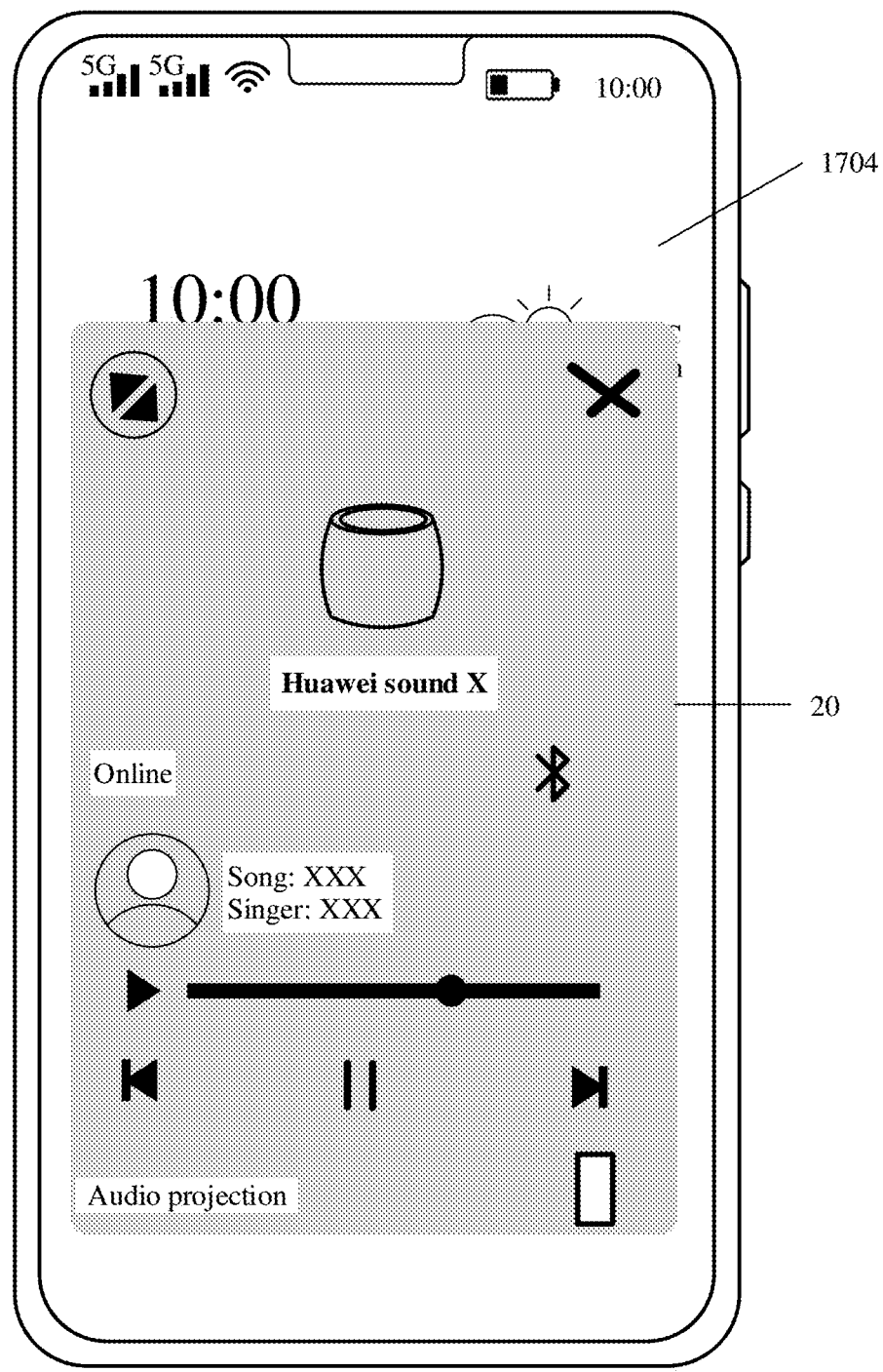

It should be understood that, after the user successfully points to the target device by using the handheld device, the target device may transmit current login account information and device information to the handheld device, to display, on the handheld device, a target device control window shown in FIG. 17G.

It should be further understood that, in a process of determining whether the handheld device points to the target device, when it is identified that an axis of the handheld device and a location of the target device fall within a preset range, the target device pointed to by the user may be determined. Specifically, when it is identified that the axis of the handheld device basically intersects with the physical location of the target device with specific predetermined precision, or it is identified that the handheld device is aligned with the target device, the target device pointed to by the user may be determined, that is, the feedback may be provided on the handheld device or the pointed target device, the login account information and the device information of the target device are transmitted to the handheld device, and the target device control window 20 or an interface related to the target device is displayed on the handheld device.

In conclusion, according to the method for interaction across devices based on a pointing operation provided in this embodiment of this application, the user may point to the target device by using the handheld device, and detect a pointing operation of the user via one or more sensors such as an acceleration sensor, a gyroscope, and an IMU, and/or a camera of the handheld device, to trigger a wireless positioning function of the handheld device. The handheld device determines a distance between the handheld device and another device, and a location and a direction of the another device based on the wireless positioning function. When it is identified that the axis of the handheld device intersects or basically intersects with the physical location of the target device based on predetermined precision, at least one type of feedback such as a visual feedback, a sound feedback, and vibration may be further provided on the handheld device and/or the target device, and the login account information and the device information of the target device are transmitted to the handheld device, and the target device control window is displayed on the handheld device. The user may control the target device through the control window on the handheld device. When it is identified that the axis of the handheld device does not intersect with the physical location of the target device, at least one guidance manner such as visual guidance, sound guidance, and vibration may be further provided on the handheld device and/or the target device, to guide the user to perform a correct pointing operation, and further display the target device control window on the handheld device and further implement a control function for the target device.

In another possible implementation, when the user performs an action of pointing to the target device, two or more adjacent devices may exist at a same location. In other words, an axis of a y axis in a moving process of the mobile phone may be located between two devices, and an angle between the axis and physical locations of the two devices is within predetermined precision. When the axis of the y axis of the mobile phone is determined to intersect or basically intersect with the device 1 or the device 2 at the same time, that is, the pointing operation of the user holding the device may be identified as pointing to the device 1 or the device 2. For this scenario, an embodiment of this application further provides a method, so that in a process of detecting the pointing operation of the user, a selection window may be provided for the user, and the user selects a target device on the selection window.

Figure 18A:
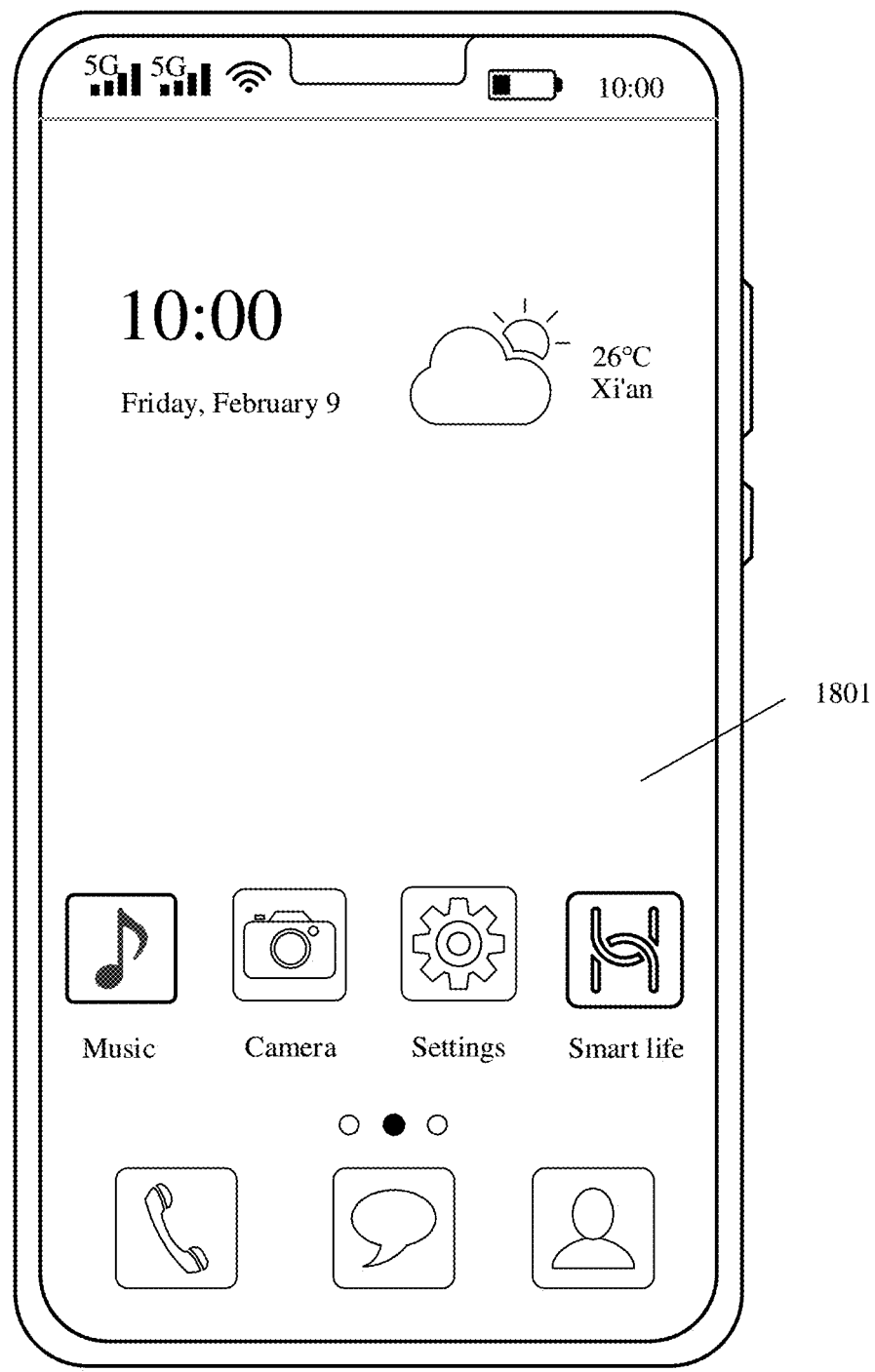
FIG. 18A to FIG. 18D each are a schematic diagram of another example in which a user controls a sound box by using a handheld device according to an embodiment of this application.
Figure 18B:
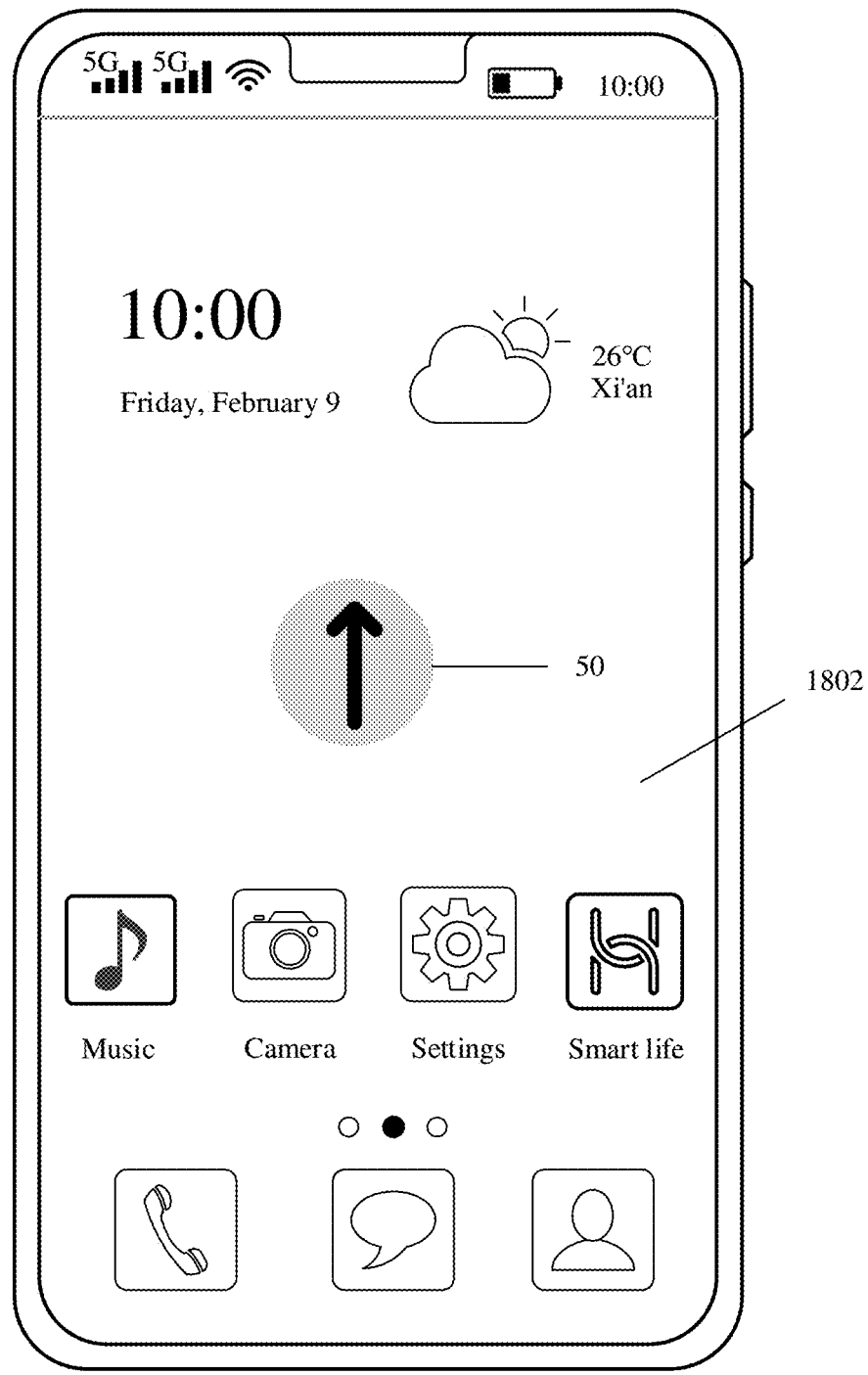

FIG. 18A to FIG. 18D each are a schematic diagram of another example in which a user controls a sound box by using a handheld device according to an embodiment of this application. For example, FIG. 18A shows a main interface 1801 of the mobile phone. When the mobile phone is in a screen-on state and displays the main interface 1801 of the mobile phone, when detecting a pointing operation of the user, the mobile phone may display an interface 1802 shown in FIG. 18B. The guide icon 50 that guides the user to perform a correct pointing operation is displayed on the interface 1802.

If the user uses the mobile phone to point to an air conditioner in a living room, because the air conditioner and the sound box are close to each other, when detecting the pointing operation of the user, the mobile phone determines that the pointing operation can trigger both the air conditioner and the sound box to be controlled by the mobile phone.

Figure 18C:
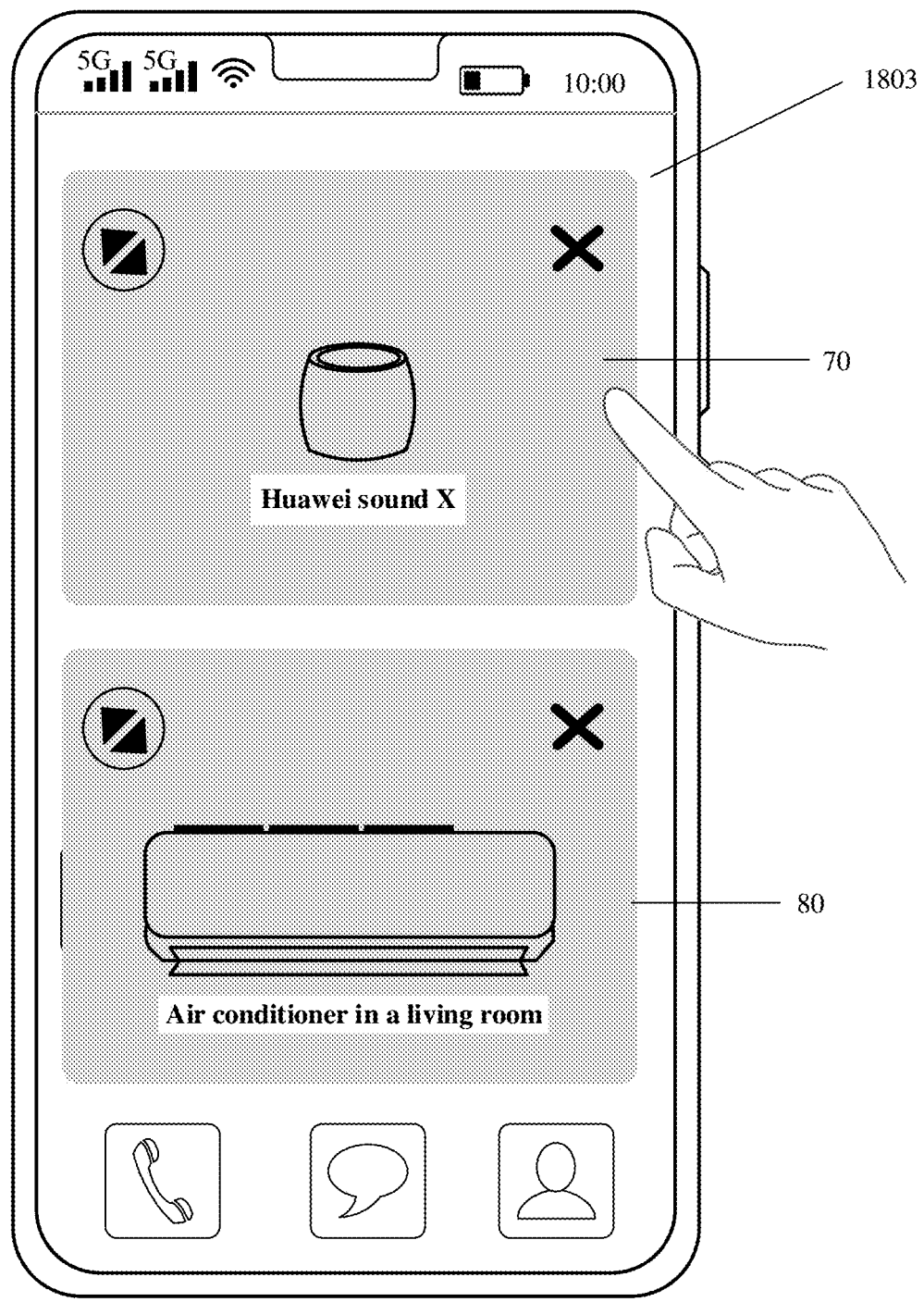
Figure 18D:
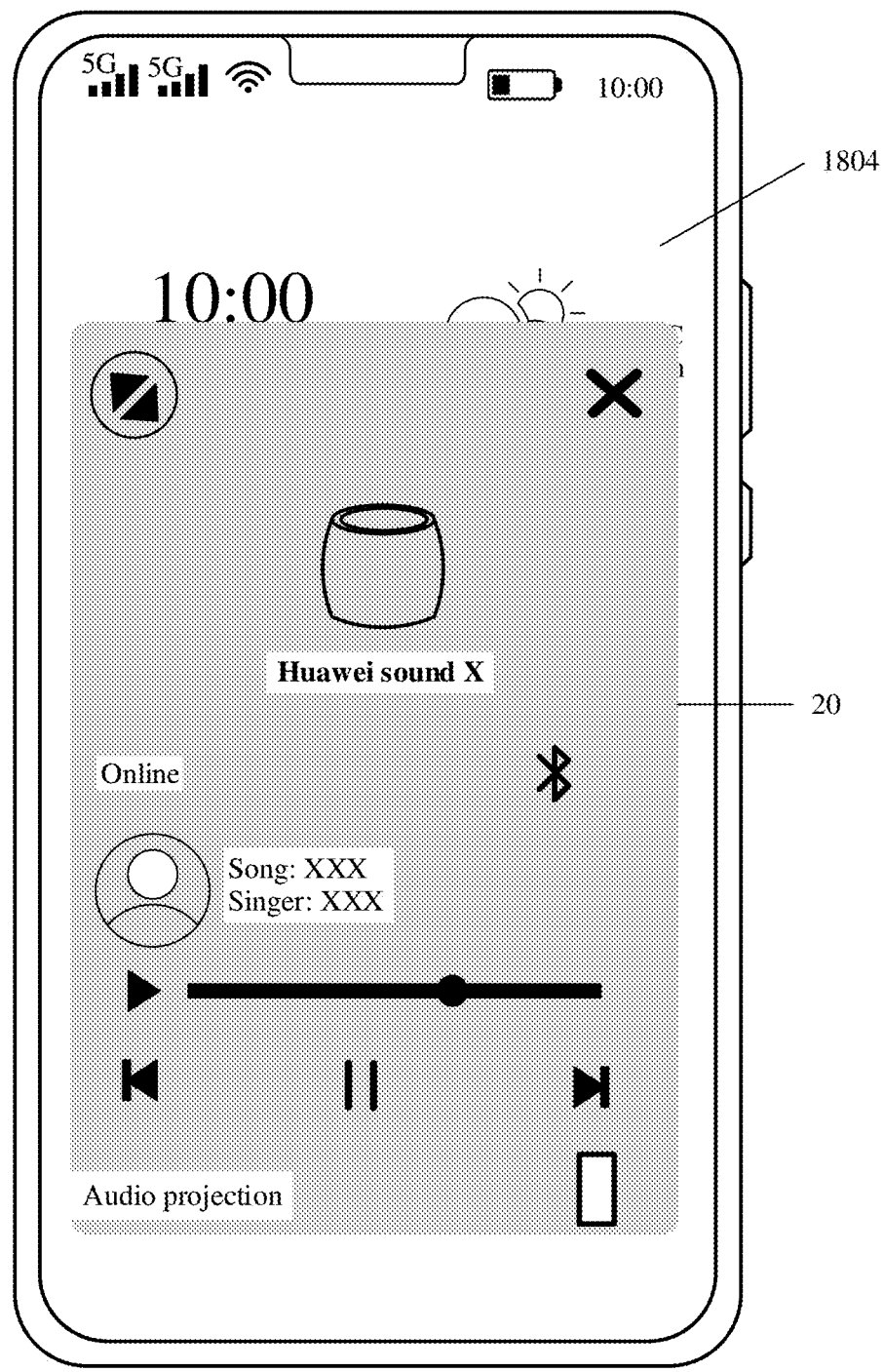

In this scenario, the mobile phone may further display an interface 1803 shown in FIG. 18C. A sound box card 70 corresponding to the sound box and an air conditioner card 80 corresponding to the air conditioner that are identified and that are currently pointed to by the user are simultaneously displayed on the interface 1803. Optionally, the sound box card 70 may display only some content, for example, a device name, an icon, a zooming option, and a window closing option. Likewise, the air conditioner card 80 may display only some content, for example, a device name, an icon, a zooming option, and a window closing option. This is not limited in this embodiment of this application.

The user may perform an operation shown in FIG. 18C, and tap any region of the sound box card 70 that is currently expected to be operated or controlled. In response to the tap operation of the user, the mobile phone displays an interface 1804 shown in FIG. 18D. The sound box control window 20 is displayed on the interface 1804. Details are not described herein again.

The foregoing describes an implementation process in which the mobile phone identifies that the user points to two devices. When the mobile phone identifies that the user points to more devices, the mobile phone may also display cards of a plurality of devices for the user according to the method, so that the user selects at least one target device of the devices according to a requirement of the user. In addition, the user may also tap and select a plurality of devices as target devices at the same time, and then a plurality of device control windows may be displayed on the interface 1804. The user may change different device control windows in a sliding switching manner. Details are not described herein again.

According to the foregoing process, for a plurality of adjacent devices, the handheld device may identify a plurality of devices pointed to by the user, or when the user expects to control the plurality of adjacent devices, the handheld device may display cards of the plurality of devices for the user, so that the user selects at least one target device of the devices according to a requirement of the user. This design is more user-friendly, and can better meet different requirements of users, thereby improving user experience.

With reference to FIG. 5A to FIG. 18D, the foregoing embodiment describes, from a user interaction layer, a method for interaction between devices based on a pointing operation. The following describes, from a software implementation policy layer with reference to FIG. 19A and FIG. 19B, a method for interaction between devices provided in an embodiment of this application. It should be understood that the method may be implemented in a structural electronic device (for example, a mobile phone or a tablet computer) that is shown in FIG. 1 and FIG. 2 and that has a touchscreen, a positioning chip, a camera assembly, and the like.

Figure 19A:
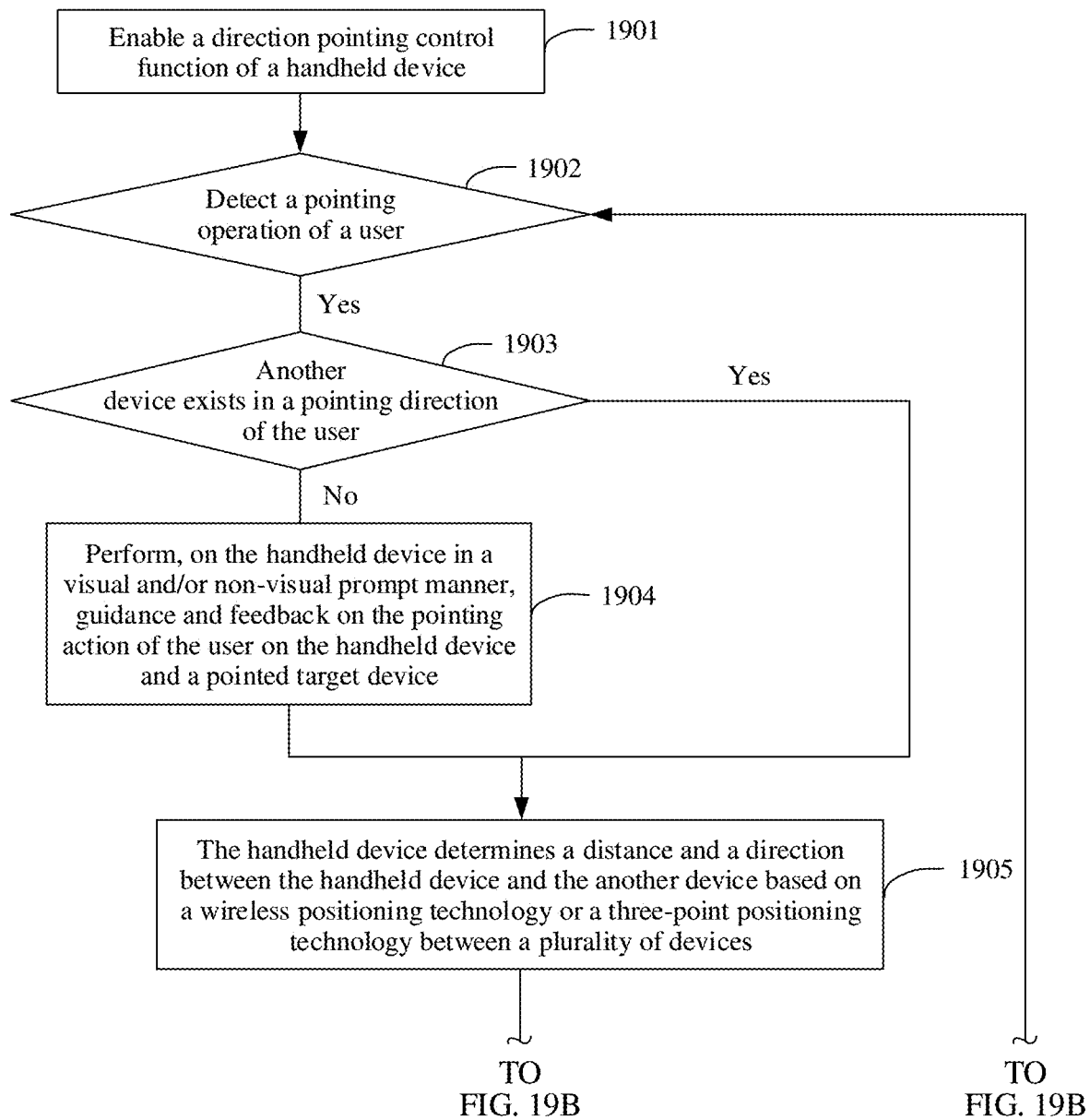
FIG. 19A and FIG. 19B are a schematic flowchart of an example of a method for interaction between devices based on a pointing operation according to an embodiment of this application.
Figure 19B:
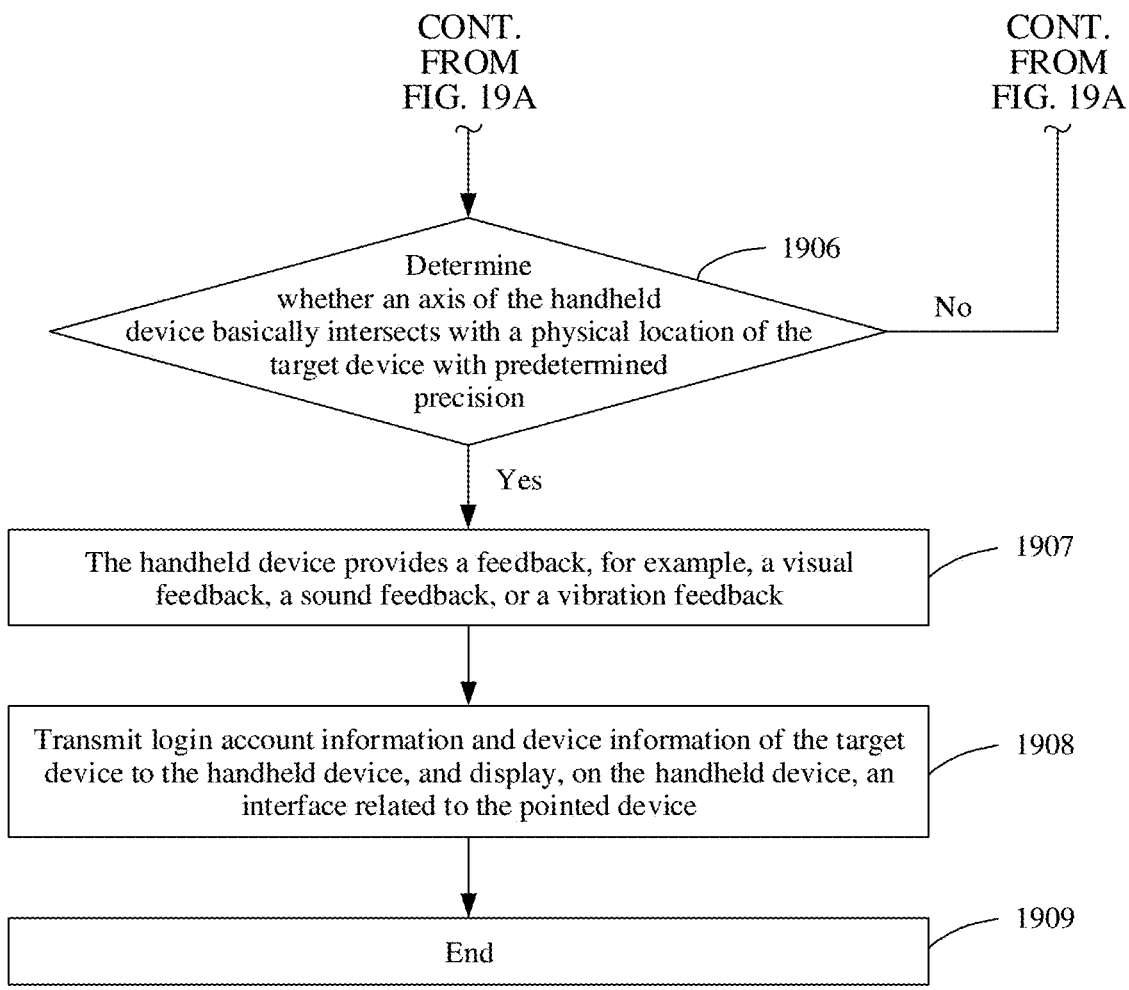

FIG. 19A and FIG. 19B are a schematic flowchart of an example of a method for interaction between devices based on a pointing operation according to an embodiment of this application. A mobile phone is used as a handheld device. As shown in FIG. 19A and FIG. 19B, the method may include the following steps:

1901: A user enables a direction pointing control function of the handheld device.

For example, according to the method described in FIG. 5A to FIG. 5C, the user may turn on the "direction pointing control function" switch in the Settings application, to further enable a function, of the mobile phone, of implementing interaction between the devices by using a shortcut gesture.

Alternatively, the "direction pointing control function" switch may be added to another application. For example, the "direction pointing control function" switch is added to the Smart life application. The user may enable, by using the "direction pointing control function" switch of the Smart life, a function, of the mobile phone, of implementing interaction between the devices by using a shortcut gesture.

Alternatively, in addition to enabling a function of quick interaction between the devices in the Settings application and the Smart life application disposed on the mobile phone, the "direction pointing control function" switch may be added to a notification bar of the mobile phone. For example, the user may perform a pull-down operation from the top of the mobile phone on any interface of the mobile phone, and the mobile phone displays a notification interface in response to the pull-down operation of the user. The user may tap a "direction pointing control function" switch in the notification interface, to enable the mobile phone to implement the function of interaction between the devices by using the shortcut gesture. A manner of enabling the function of quick interaction between the devices is not limited in this embodiment of this application.

It should be understood that, as a handheld device of the user, the mobile phone further needs to position devices such as a smart television (smart screen), an air conditioner, a sound box, and a router in a home scenario. In other words, the mobile phone needs to determine a location of each device, so as to perform control more accurately through the shortcut gesture.

In a possible implementation, in a home scenario, at least three fixed positioning components are disposed, and it is ensured that the three positioning components are in a power-on working state, and the at least three positioning components may communicate with the handheld device of the user.

Optionally, the at least three positioning components may be disposed according to the method and the rule described in FIG. 6, and a connection is established between the mobile phone and the positioning component according to the method shown in FIG. 7A to FIG. 7F, that is, the mobile phone may send a signal to the positioning component or receive a signal sent by the positioning component. The mobile phone may determine a location of any device in the home scenario according to the process described in FIG. 8 with reference to the at least three positioning components.

Optionally, the positioning component may be a sensor having a positioning function, a structure having a positioning function, or the like. For example, the sensor may be a laser sensor, an infrared sensor, or the like. The structure having the positioning function may be a chip. For example, the structure having the positioning function may be a Bluetooth module-based positioning structure, a positioning chip based on an ultra-wideband UWB wireless sensing capability, a GPS-based positioning structure, a Wi-Fi module-based positioning structure, or the like.

Optionally, in addition to the foregoing listed positioning component pre-arranged in the home scenario, the positioning component may be disposed on a device such as a smart television (smart screen), an air conditioner, a sound box, or a router in the home scenario. For example, if the device such as the smart screen, the air conditioner, or the sound box has a UWB chip, the at least three fixed positioning components do not need to be additionally arranged in the home scenario, and a positioning function of any device in the home scenario may be implemented through interaction between the mobile phone and the device such as the smart screen, the air conditioner, or the sound box.

1902: Detect a pointing operation of the user.

For example, in a possible implementation, as a handheld device of the user, the mobile phone may identify the pointing operation of the user by using one or more sensors of the mobile phone, a camera of the mobile phone, or the like.

Optionally, the sensor of the mobile phone may include an acceleration sensor, a gyroscope, a magnetometer sensor, an inertial measurement unit IMU, and the like. The camera of the mobile phone is not limited to a front-facing camera or a rear-facing camera of the mobile phone. Alternatively, the camera of the mobile phone is not limited to one or more of a primary camera, a wide-angle camera, and a long-focus camera of the mobile phone. The pointing operation of the user is identified based on a picture obtained by the camera. This is not limited in this embodiment of this application. For a specific detection process, refer to the specific description of the operation process in which the user points to the sound box in FIG. 10. Details are not described herein again.

1903: Another device exists in a pointing direction of the user.

1904: When no other device is detected in the pointing direction, perform, on the handheld device in a visual and/or non-visual prompt manner, guidance and feedback on the pointing operation of the user on the handheld device and a pointed target device.

It should be understood that, in a process in which the user points to the target device, a hand-eye separation phenomenon, namely, a case in which eyes cannot see an interface of the mobile phone, occurs. Therefore, a prompt manner of any one of the foregoing prompt information (the first prompt information, second prompt information, third prompt information, fourth prompt information, and the like) is not limited in this embodiment of this application. For example, the prompt manner may be a visual or non-visual prompt that can be identified by the user and has a difference, for example, a plurality of prompt manners such as a different interface prompt, a vibration, an indicator, or a voice.

In a possible implementation, in a process in which the user points to the target device, as shown in FIG. 17E, the mobile phone may automatically display a guide icon on the interface, and the guide icon may be suspended on the interface of the mobile phone in a form of an arrow.

In still another possible implementation, in an operation process in which the user uses the handheld device to point to the target device, in addition to the guide icon, the user may be guided to perform a correct pointing operation in a non-visual manner such as a sound feedback or a vibration feedback, so as to control the target device by using the pointing operation in this embodiment of this application.

Optionally, the sound feedback may be sent by the handheld device, or may be sent by the pointed target device. For example, the mobile phone prompts the user in a voice manner "please move rightward".

Optionally, the vibration feedback may be sent by the handheld device, to be more quickly and more sensitively perceived by the user. It should be understood that this is not limited in this embodiment of this application.

1905: When another device is detected in the pointing direction, the handheld device determines a distance and a direction between the handheld device and the another device based on a wireless positioning technology or a three-point positioning technology between a plurality of devices.

For example, after the mobile phone identifies the operation of pointing to the target device by the user, the mobile phone further enables a wireless positioning function of the mobile phone, searches for a peripheral device of the mobile phone, determines a location of the peripheral device, and a distance between the peripheral device and the mobile phone, and determines whether a device exists in the pointing direction of the user. For example, as shown in (c) in FIG. 10, when the mobile phone detects the pointing operation of the user shown in the figure, the wireless positioning technology of the mobile phone may be triggered.

In a possible implementation, when a positioning structure is disposed on the target device pointed to by the user, the mobile phone may perform wireless positioning based on a bidirectional connection between the mobile phone and the target device. For example, the target device pointed to by the user may be disposed with one or more of a Bluetooth positioning chip, a UWB positioning chip, a GPS positioning structure, a Wi-Fi positioning structure, a laser sensor with a positioning function, an infrared sensor, and the like, so that the target device may be positioned based on the bidirectional connection between the target device and the mobile phone.

For example, if the device such as the smart screen, the air conditioner, or the sound box has a UWB chip, positioning of any device in the home scenario may be implemented through interaction between the mobile phone and the device such as the smart screen, the air conditioner, or the sound box.

It should be understood that both the mobile phone and the pointed target device have hardware that can transmit or receive a wireless positioning signal, and a distance and an angle between the mobile phone and the pointed target device are calculated and determined based on the wireless positioning signal transmitted or received between the mobile phone and the pointed target device.

In another possible implementation, when three positioning components are arranged in the home scenario, the mobile phone may determine the distance and a direction between the mobile phone and the pointed target device with reference to a three-point positioning capability of the three positioning components.

1906: Determine whether an axis of the handheld device basically intersects with a physical location of the target device with preset precision.

In a process of determining whether the handheld device points to the target device, when it is identified that the axis of the handheld device and the location of the target device fall within a preset range, the target device pointed to by the user may be determined. Specifically, when it is identified that the axis of the handheld device basically intersects with the physical location of the target device with specific predetermined precision, or it is identified that the handheld device is aligned with the target device, the target device pointed to by the user may be determined, that is, a feedback may be provided on the handheld device or the pointed target device, login account information and device information of the target device are transmitted to the handheld device, and the target device control window 20 or an interface related to the target device is displayed on the handheld device.

Optionally, the pointing operation of the user may be described as a pointing operation that the user holds the mobile phone to move from a first location as a start location to a second location, and at the second location, an axis on which a long side of the mobile phone is located intersects or approximately intersects with one or more other devices. Herein, the intersection may be understood as that another device exactly exists in a direction pointed to by the user. The approximate intersection may be understood as that another device exists in a preset precision range in a direction pointed to by the user. Both cases may be understood as that the pointing operation of the user is detected.

It should be understood that the axis of the mobile phone is related to an antenna layout of the mobile phone. When an antenna is arranged at a front-end frame of the mobile phone, the user may point the axis on which the long side is located to the target device. Alternatively, when an antenna is arranged inside a housing of the mobile phone, the mobile phone may be erected in a similar manner to a photographing posture, and a normal perpendicular to a display of the mobile phone is used as an axis, so that the axis on which the normal is located points to the target device. This is not limited in this embodiment of this application.

1907: A feedback, for example, a visual feedback, a sound feedback, or a vibration feedback is provided on the handheld device.

It should be understood that, the target device pointed to by the user is determined based on step 1906, that is, the user successfully points to the target device by using the handheld device. In this case, a feedback may be further provided on the handheld device or the pointed target device. The feedback is used to notify the user that the pointing operation succeeds. The feedback information may include one or more of a visual feedback, a sound feedback, a vibration feedback, and the like.

For example, as shown in FIG. 17F, after the user successfully points to the sound box by using the mobile phone, the mobile phone may vibrate to notify the user that the pointing operation is completed.

1908: Transmit the login account information and the device information of the target device to the handheld device, and display, on the handheld device, the interface related to the pointed device.

After the user successfully points to the target device by using the handheld device, the target device may transmit the current login account information and the device information to the handheld device, to display, on the handheld device, the target device control window shown in FIG. 17G.

1909: End.

In conclusion, according to the method for interaction across devices based on a pointing operation provided in this embodiment of this application, the user may point to the target device by using the handheld device, and detect a pointing operation of the user via one or more sensors such as an acceleration sensor, a gyroscope, and an IMU, and/or a camera of the handheld device, to trigger the wireless positioning function of the handheld device. The handheld device determines a distance between the handheld device and another device, and a location and a direction of the another device based on the wireless positioning function. When it is identified that the axis of the handheld device intersects or basically intersects with the physical location of the target device based on predetermined precision, at least one type of feedback such as a visual feedback, a sound feedback, and vibration may be further provided on the handheld device and/or the target device, and the login account information and the device information of the target device are transmitted to the handheld device, and the target device control window is displayed on the handheld device. The user may control the target device through the control window on the handheld device. When it is identified that the axis of the handheld device does not intersect with the physical location of the target device, at least one guidance manner such as visual guidance, sound guidance, and vibration may be further provided on the handheld device and/or the target device, to guide the user to perform the correct pointing operation, and further display the target device control window on the handheld device and further implement a control function for the target device.

It may be understood that, to implement the foregoing functions, the electronic device includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into function modules based on the foregoing method examples, for example, each function module may be obtained through division based on each corresponding function, or two or more functions may be integrated into one processing module. The integrated module may be implemented in a form of hardware. It should be noted that, in embodiments, division into modules is an example and is merely logical function division. During actual implementation, there may be another division manner.

When each function module is obtained through division based on a corresponding function, the electronic device in the foregoing embodiments may include a display unit, a detection unit, and a processing unit. The display unit, the detection unit, and the processing unit cooperate with each other, and may be configured to support the electronic device to perform the foregoing steps and the like, and/or used in another process of the technology described in this specification.

It should be noted that all related content of the steps in the foregoing method embodiments may be cited in function description of corresponding function modules. Details are not described herein again.

The electronic device provided in this embodiment is configured to perform the above method. Therefore, an effect same as the effect of the foregoing implementation methods can be achieved.

When an integrated unit is used, the electronic device may include a processing module, a storage module, and a communication module. The processing module may be configured to control and manage actions of the electronic device, for example, may be configured to support the electronic device to perform the steps performed by the display unit, the detection unit, and the processing unit. The storage module may be configured to support the electronic device to store program code, data, and the like. The communication module may be configured to support communication between the electronic device and another device.

The processing module may be a processor or a controller. The processing module may implement or perform various example logical blocks, modules, and circuits described with reference to content disclosed in this application. The processor may alternatively be a combination for implementing a computing function, for example, a combination including one or more microprocessors, or a combination of a digital signal processor (digital signal processor, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 1.

This embodiment further provides a computer-readable storage medium. The computer-readable storage medium stores computer instructions. When the computer instructions are executed on an electronic device, the electronic device is enabled to perform the foregoing related method steps to implement the method for interaction between devices based on a pointing operation in the foregoing embodiments.

This embodiment further provides a computer program product. When the computer program product is run on a computer, the computer is enabled to perform the foregoing related steps, to implement the method for interaction between devices based on a pointing operation in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the method for interaction between devices based on a pointing operation in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Based on descriptions about the foregoing implementations, a person skilled in the art may understand that, for a purpose of convenient and brief description, division into the foregoing function modules is used as an example for illustration. In actual application, the foregoing functions may be allocated to different function modules and implemented according to a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division. During actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in embodiments of this application. The storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a first electronic device, the method comprising:
    obtaining an acceleration of the first electronic device in a direction of a first axis, an acceleration of the first electronic device in a direction of a second axis, and an acceleration of the first electronic device in a direction of a third axis, wherein the first axis is parallel to a long side of the first electronic device, the second axis is parallel to a short side of the first electronic device, and the third axis is perpendicular to a plane in which the first axis and the second axis extend;
    in a motion process in which a user holds the first electronic device and moves from a first location as a start location to a second location, determining as follows:
        the acceleration in the direction of the first axis is greater than or equal to a first threshold, or a duration in which the acceleration in the direction of the first axis is greater than or equal to the first threshold is greater than or equal to a first preset duration;
        the acceleration in the direction of the second axis is less than or equal to a second threshold; and
        the acceleration in the direction of the third axis is less than or equal to a third threshold;
    detecting that at the second location, the first axis of the first electronic device intersects with a second electronic device, or the first axis of the first electronic device intersects with the second electronic device within a preset precision range;
    receiving login account information and device information of the second electronic device that are sent by the second electronic device; and
    displaying a first window based on the login account information and the device information of the second electronic device, wherein the first window displays an interface that is usable to control the second electronic device.

2. The method according to claim 1, wherein obtaining the acceleration of the first electronic device in the direction of the first axis, the acceleration of the first electronic device in the direction of the second axis, and the acceleration of the first electronic device in the direction of the third axis comprises:
    obtaining the acceleration in the direction of the first axis, the acceleration in the direction of the second axis, and the acceleration in the direction of the third axis via one or more of an acceleration sensor, an inertial measurement unit (IMU), or a gyroscope.

3. The method according to claim 1, wherein before detecting that at the second location, the first axis of the first electronic device intersects with the second electronic device, or the first axis of the first electronic device intersects with the second electronic device within the preset precision range, the method further comprises:
    collecting a plurality of pictures in the motion process using a camera of the first electronic device; and
    determining that a first picture collected at the first location by the first electronic device comprises facial feature information of the user, and a second picture collected at the second location does not comprise any facial feature information of the user.

4. The method according to claim 1, wherein before detecting that at the second location, the first axis of the first electronic device intersects with a second electronic device, or the first axis of the first electronic device intersects with a second electronic device within a preset precision range, the method further comprises:
  collecting a magnetic induction intensity in the motion process using a magnetometer sensor of the first electronic device; and
  determining that the magnetic induction intensity collected at the first location by the first electronic device is greater than or equal to a fourth threshold, the magnetic induction intensity collected at the second location is less than or equal to a fifth threshold, and the fourth threshold is greater than the fifth threshold.

5. The method according to claim 1, wherein before detecting that at the second location, the first axis of the first electronic device intersects with the second electronic device, or the first axis of the first electronic device intersects with the second electronic device within the preset precision range, the method further comprises:
  determining that a duration in which the first electronic device hovers at the second location is greater than or equal to second preset duration.

6. The method according to claim 1, further comprising:
  when the acceleration in the direction of the first axis is greater than or equal to the first threshold, displaying first prompt information, wherein the first prompt information is used to guide the user to continue to accelerate along the direction of the first axis, and the first prompt information comprises one or more of a text, an icon, a sound, or vibration.

7. The method according to claim 1, further comprising:
  when the duration in which the acceleration in the direction of the first axis is greater than or equal to the first threshold is greater than or equal to the first preset duration, displaying second prompt information, wherein the second prompt information is used to prompt the user that acceleration duration in direction of the first axis reaches the first preset duration, and the second prompt information comprises one or more of a text, an icon, a sound, or vibration.

8. The method according to claim 1, further comprising:
  when a duration in which the first electronic device hovers at the second location is greater than or equal to a second preset duration, displaying third prompt information, wherein the third prompt information indicates to the first electronic device to detect whether the first axis intersects with the second electronic device at the second location, and the third prompt information comprises one or more of a text, an icon, a sound, or vibration.

9. The method according to claim 1, wherein after detecting that at the second location, the first axis of the first electronic device intersects with the second electronic device, or the first axis of the first electronic device intersects with the second electronic device within the preset precision range, the method further comprises:
  displaying fourth prompt information, wherein the fourth prompt information indicates that the first electronic device points to the second electronic device, and the fourth prompt information comprises one or more of a text, an icon, a sound, or vibration.

10. The method according to claim 1, wherein detecting that at the second location, the first axis of the first electronic device intersects with the second electronic device, or the first axis of the first electronic device intersects with the second electronic device within the preset precision range comprises:
  detecting, via a positioning component, that at the second location, the first axis of the first electronic device intersects with the second electronic device, or the first axis of the first electronic device intersects with the second electronic device within the preset precision range, wherein
  the positioning component is an independently disposed positioning sensor, or the positioning component is positioning chips that are respectively disposed on the first electronic device and the second electronic device, and each positioning chip comprises any one of a Bluetooth positioning chip, an ultra-wideband (UWB) positioning chip, or a wireless fidelity (Wi-Fi) positioning chip.

11. The method according to claim 1, further comprising:
  when the first axis of the first electronic device intersects with one or more second electronic devices, displaying a second window, wherein the second window comprises information about the one or more second electronic devices, and the one or more second electronic devices includes the second electronic device;
  detecting a first operation in the second window; and
  displaying the first window by the first electronic device in response to the first operation.

12. The method according to claim 1, further comprising:
  detecting a second operation in the first window; and
  sending a control instruction to the second electronic device by the first electronic device in response to the second operation, wherein the control instruction instructs to control a behavior of the second electronic device.

13. The method of claim 1, wherein the second threshold is equal to the third threshold.

14. A first electronic device, comprising:
  a processor; and
  a non-transitory memory, wherein the a non-transitory memory stores one or more instructions, and when the one or more instructions are executed by the processor, the first electronic device is enabled to perform the following:
    obtaining an acceleration in a direction of a first axis, an acceleration in a direction of a second axis, and an acceleration in a direction of third axis, wherein the first axis is parallel to a long side of the first electronic device, the second axis is parallel to a short side of the first electronic device, and the third axis is perpendicular to a plane in which the first axis and the second axis extend;
    in a motion process in which a user holds the first electronic device to move from a first location as a start location to a second location, determining as follows:
      the acceleration in the direction of the first axis is greater than or equal to a first threshold, or a duration in which the acceleration in the direction of the first axis is greater than or equal to the first threshold is greater than or equal to a first preset duration;
      the acceleration in the direction of the second axis is less than or equal to a second threshold; and
      the acceleration in the direction of the third axis is less than or equal to a third threshold;
    detecting that at the second location, the first axis of the first electronic device intersects with a second electronic device, or the first axis of the first electronic device intersects with a second electronic device within a preset precision range;

receiving login account information and device information of the second electronic device that are sent by the second electronic device; and displaying a first window based on the login account information and the device information of the second electronic device, wherein the first window displays an interface usable for controlling the second electronic device.

15. The first electronic device according to claim 14, wherein when the one or more instructions are executed by the processor, the first electronic device is enabled to perform the following:

obtaining the acceleration in the direction of the first axis, the acceleration in the direction of the second axis, and the acceleration in the direction of the third axis via one or more of an acceleration sensor, an inertial measurement unit (IMU), or a gyroscope.

16. The first electronic device according to claim 14, wherein when the one or more instructions are executed by the processor, the first electronic device is enabled to perform the following:

collecting a plurality of pictures in the motion process using a camera of the first electronic device; and determining that a first picture collected at the first location comprises facial feature information of the user, and a second picture collected at the second location does not comprise any facial feature information of the user.

17. The first electronic device according to claim 14, wherein when the one or more instructions are executed by the processor, the first electronic device is enabled to perform the following:

collecting a magnetic induction intensity in the motion process using a magnetometer sensor of the first electronic device; and determining that the magnetic induction intensity collected at the first location is greater than or equal to a fourth threshold, the magnetic induction intensity collected at the second location is less than or equal to a fifth threshold, and the fourth threshold is greater than the fifth threshold.

18. The first electronic device according to claim 14, wherein when the one or more instructions are executed by the processor, the first electronic device is enabled to perform the following:

determining that a duration in which the first electronic device hovers at the second location is greater than or equal to a second preset duration.

19. The first electronic device according to claim 14, wherein when the one or more instructions are executed by the processor, the first electronic device is further configured to perform the following:

when the acceleration in the direction of the first axis is greater than or equal to the first threshold, displaying first prompt information, wherein the first prompt information is used to guide the user to continue to accelerate along the direction of the first axis, and the first prompt information comprises one or more of a text, an icon, a sound, or vibration.

20. The first electronic device according to claim 14, wherein when the one or more instructions are executed by the processor, the first electronic device is further configured to perform the following:

when the duration in which the acceleration in the direction of the first axis is greater than or equal to the first threshold is greater than or equal to the first preset duration, displaying second prompt information, wherein the second prompt information prompts the user that an acceleration duration in the direction of the first axis reaches the first preset duration, and the second prompt information comprises one or more of a text, an icon, a sound, or vibration.

* * * * *